(12) United States Patent
Yamamoto et al.

(10) Patent No.: US 6,323,473 B1
(45) Date of Patent: Nov. 27, 2001

(54) PACKED FOOD PASTEURIZING DEVICE AND PASTEURIZING METHOD

(75) Inventors: Yasuji Yamamoto, Takarazuka; Yoshio Akesaka, Yamatotakada; Junichi Kodama, Sakai, all of (JP)

(73) Assignee: Yamamoto Vinita Co., Ltd., Osaka-fu (JP)

( * ) Notice: Subject to any disclaimer, the term of this patent is extended or adjusted under 35 U.S.C. 154(b) by 0 days.

(21) Appl. No.: 09/284,494

(22) PCT Filed: Aug. 14, 1998

(86) PCT No.: PCT/JP98/03624

§ 371 Date: Apr. 13, 1999

§ 102(e) Date: Apr. 13, 1999

(87) PCT Pub. No.: WO99/08552

PCT Pub. Date: Feb. 25, 1999

(30) Foreign Application Priority Data

Aug. 14, 1997 (JP) .................................................. 9-219601
Aug. 14, 1997 (JP) .................................................. 9-219602
Aug. 14, 1997 (JP) .................................................. 9-219603

(51) Int. Cl.$^7$ ............................... H05B 6/54; H05B 6/60
(52) U.S. Cl. ...................... 219/771; 219/777; 219/780; 219/775; 99/451; 99/358; 426/244
(58) Field of Search .................................... 219/771, 777, 219/780, 775; 426/241, 243, 244; 99/451, 358; 422/21, 22, 23

(56) References Cited

U.S. PATENT DOCUMENTS

| | | |
|---|---|---|
| 2,413,003 | * 12/1946 | Sherman ............................ 219/771 |
| 3,809,845 | 5/1974 | Stenstrom . |
| 4,775,770 | 10/1988 | Fritz . |
| 4,910,371 | * 3/1990 | Brun et al. ........................... 219/771 |
| 4,980,530 | * 12/1990 | Butot ................................... 219/771 |
| 5,055,312 | * 10/1991 | Hildebrand ............................ 99/358 |
| 6,023,055 | 2/2000 | Yamamoto .......................... 219/771 |

FOREIGN PATENT DOCUMENTS

| | | |
|---|---|---|
| 731272 | 2/1943 | (DE) . |
| 269073 | 6/1988 | (EP) . |
| 257166 | 2/1990 | (JP) . |
| 3183461 | 8/1991 | (JP) . |
| 3206872 | 9/1991 | (JP) . |
| 2539778 | 4/1997 | (JP) . |
| 9-163961 | * 6/1997 | (JP) . |

* cited by examiner

*Primary Examiner*—Philip H. Leung
(74) *Attorney, Agent, or Firm*—Jordan and Hamburg LLP

(57) ABSTRACT

A prepackaged food sterilizing apparatus for sterilizing a prepackaged food P has a high frequency generator 71. A high frequency is supplied from the high frequency generator 71 to the prepackaged food P to sterilize the prepackaged food P by dielectric heating. The apparatus includes a food loading container 2x constituted by a pair of opposing electrodes 20 consisting of a lower electrode 210 and an upper electrode 220 to which the high frequency is supplied and an annular insulator 23 interposed between the opposing electrode pair 20. The food loading container 2x has at least one food loading chamber 21 in which the prepackaged food P is loaded with an inner shape thereof substantially equal to an outer shape of the prepackaged food P.

18 Claims, 37 Drawing Sheets

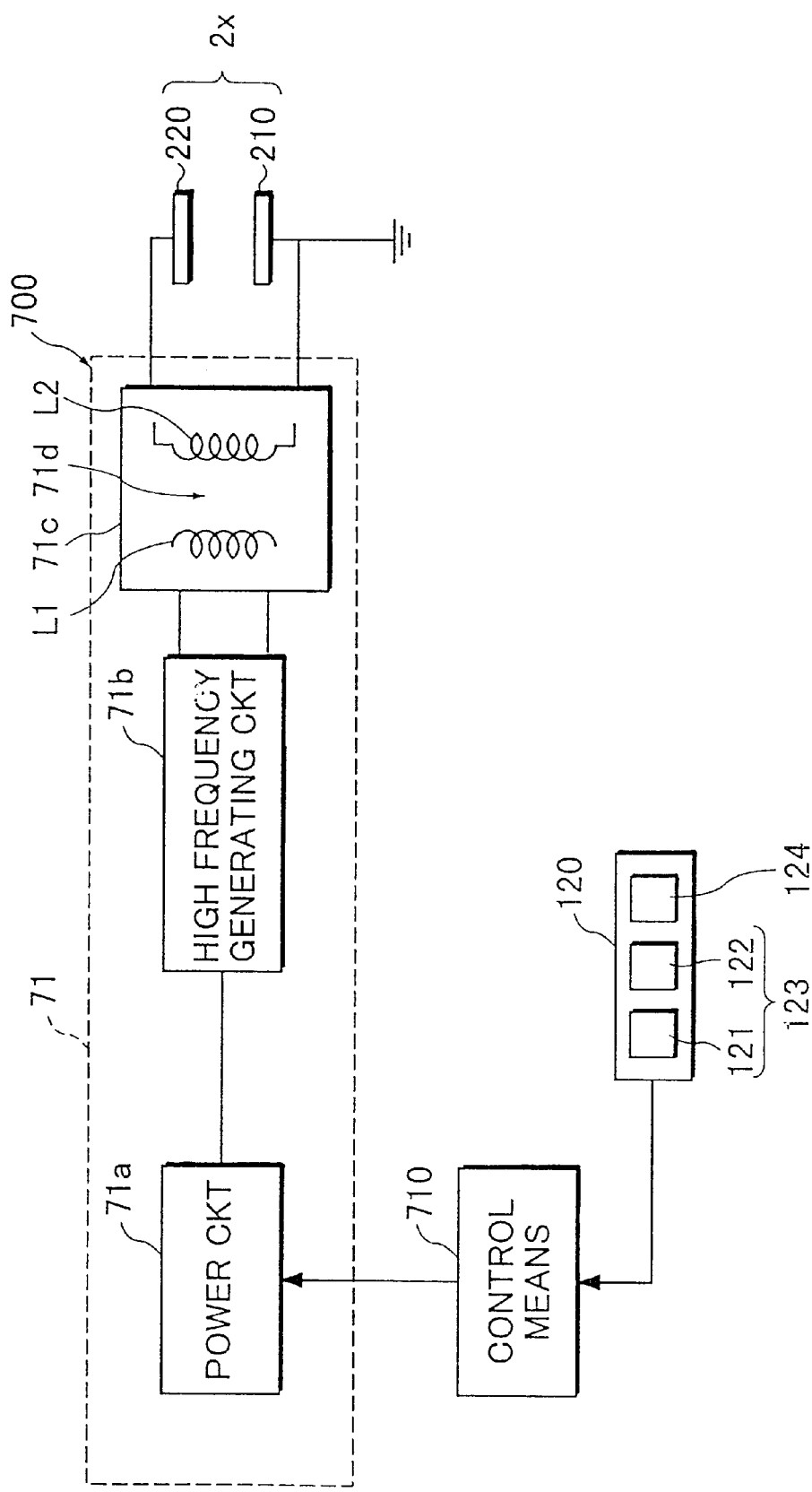

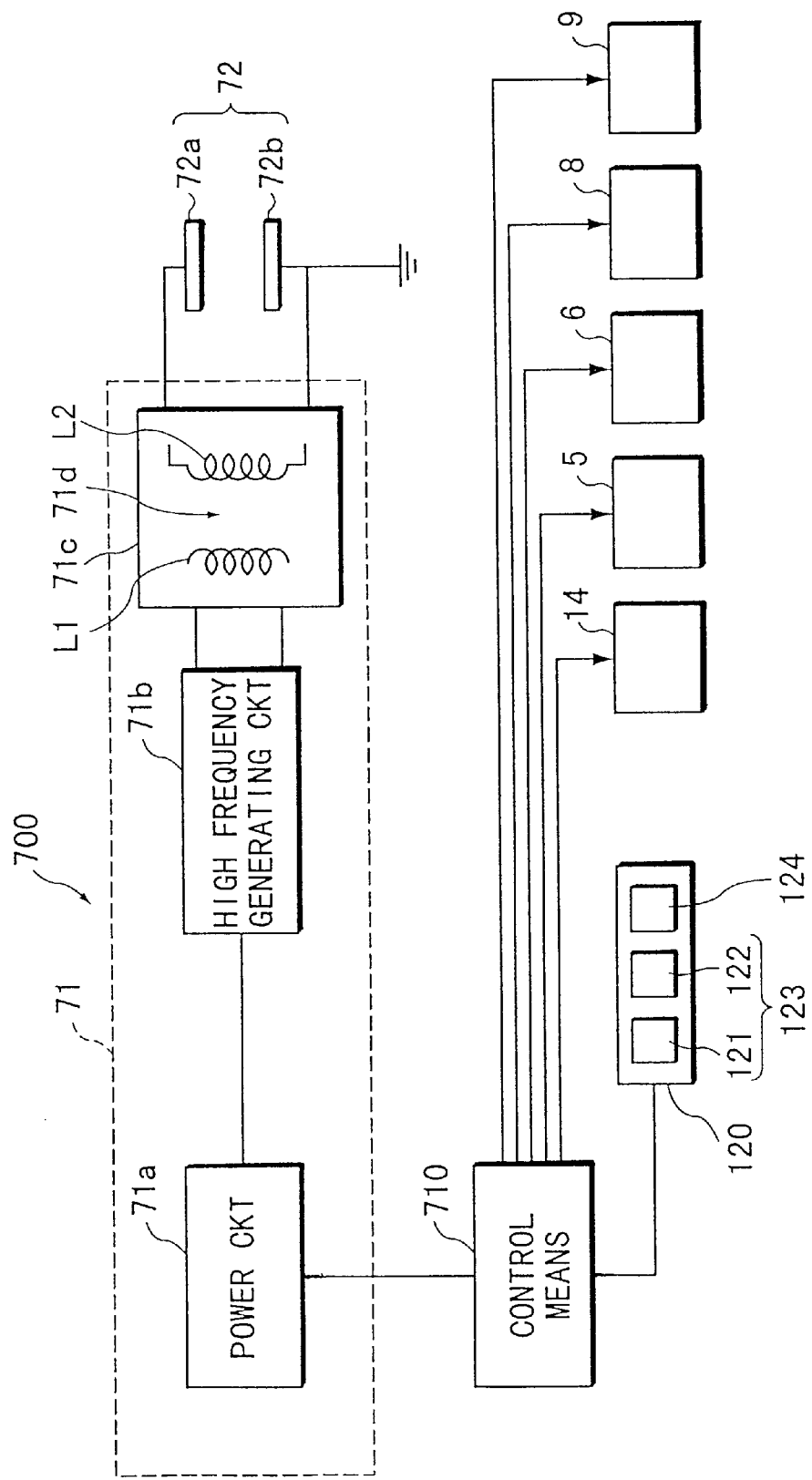

PACKED FOOD PASTEURIZING DEVICE AND PASTEURIZING METHOD

FIELD OF THE INVENTION

The present invention relates to a prepackaged food sterilizing apparatus and a sterilizing method for sterilizing a so-called prepackaged food obtained by sealably packing various foods in a packaging container such as a plastic bag and a plastic tray by application of a high frequency.

BACKGROUND ART

So-called prepackaged foods are rapidly widespread such that various foods are sealably packed in a packaging container such as a plastic bag and a plastic tray, and it is true to say that such prepackaged foods contribute to the food style of modem society to a great extent. It has been a common practice to heat the prepackaged foods for sterilization after a food is sealed in a packaging container. A certain heating process (heat maturation process) is also applied to a certain kind of food, combined with heat sterilization, to improve tastes and flavors of the food.

At a last stage of heat sterilization, boiling and steaming are generally performed. However, boiling and steaming require a long time for processing, which lowers sterilization efficiency, and in addition, the flavors of the food may be degraded. The applicants of this invention have proposed a high frequency heating apparatus in which plural prepackaged foods are loaded in a flat sealed container and a high frequency power is supplied to the container by way of opposing electrodes in a pressurized state (Japanese Patent Application No. HEI 7-329296).

In the above high frequency heating apparatus, inside the container where the prepackaged food is loaded is brought to a sealed state by the opposing electrodes in contact with a peripheral portion of the container. Accordingly, it is possible to heat the inside of the sealed container (food loading chamber) at a temperature of 100° C. or higher to sterilize the food in a short time.

In the above high frequency heating apparatus, pressurizing means for pressurizing the inside of the container is necessary. Particularly, since plural prepackaged foods are loaded in the cylindrical shape container in the above apparatus, large size pressurizing means is necessary, which would raise the installation cost for the apparatus. Further, it is difficult to uniformly apply a high frequency to the plural prepackaged foods loaded in the container. Specifically, the heated temperature may vary depending on the loaded position of the prepackaged food which hinders uniform heating, and there may occur a situation that sterilization is not completed with respect to the prepackaged food that has been loaded at a lower temperature heating position. Incomplete sterilization eventually leads to non-sterilization due to growth of bacteria.

To enhance sterilizing ability, there is an idea of applying a high frequency to a prepackaged food for a longer time. However, this idea leads to energy cost rise which is not desirable in the economic viewpoint. Further, a new problem may be raised that the flavor of the prepackaged food is degraded due to over heating.

There have been proposed various sterilizing apparatuses by microwave radiation in which a prepackaged food is accommodated in a support housing member made of a synthetic resin having an inner configuration substantially equal to the outer shape of the prepackaged food (European Patent No. 0269073 (European Patent Application No. 8711732B.2), Japanese Examined Patent Publication No. HEI 7-51060, Japanese Examined Patent Publication No. HEI 7-114672, Japanese Utility Model Registrar No. 2539778, and Japanese Patent No. 2778165).

In view thereof, an object of this invention is to provide a prepackaged food sterilizing apparatus and a sterilizing method that enables assured sterilization to a prepackaged food while suppressing process cost for sterilization.

DISCLOSURE OF THE INVENTION

An aspect of this invention is directed to a prepackaged food sterilizing apparatus provided with a high frequency generating section to supply a high frequency voltage in order to sterilize a prepackaged food by dielectric heating. The apparatus is equipped with a food loading container including a pair of opposing electrodes having a first electrode and a second electrode to which the high frequency is applied, and an annular frame interposed between the pair of first and second electrodes. The container has at least one food loading chamber for loading the prepackaged food therein. The food loading chamber has such an inner shape as to substantially match an outer shape of the prepackaged food.

In this arrangement, the food loading chamber of the container defined by the opposing electrode pair and the annular frame is adapted for loading one prepackaged food. Unlike the conventional case where a large number of prepackaged foods are loaded in a food loading chamber of a large capacity to sterilize the foods by dielectric heating using a pair of opposing electrodes which may result in a drawback that the heated temperature of the prepackaged foods varies depending on the loaded position and the prepackaged foods with incomplete sterilization may be discharged, according to the inventive apparatus, performing serial process such that a certain number of prepackaged foods are loaded in the food loading chamber(s) one after another and taken out therefrom successively after dielectric heating enables reliable sterilization onto the prepackaged foods.

Further, since the food loading chamber has such an inner shape as to substantially match the outer shape of the prepackaged food, expansion of the food due to dielectric heating is prevented by an inner wall of the food loading chamber which obstructs breaking of a bag/tray constituting the container. This arrangement eliminates a necessity of pressurizing the inside of the food loading chamber on a large scale, as performed conventionally, with an attempt to prevent burst-out of the food, thereby contributing to installation cost reduction.

As another aspect of this invention, the first electrode and the second electrode may be each formed with an opposing plane shaped into a flat surface parallel to each other, and the annular frame may have such an inner shape as to substantially match a side surface of the prepackaged food. Thereby, the construction of the container can be simplified. Further, at least one of the opposing planes of the first and second electrodes may be formed with a recess of an inner shape substantially matching the outer shape of the prepackaged food, and the annular frame may be so shaped as to come into contact with an outer surface of the prepackaged food. In this case, the container can contain various types of prepackaged foods.

As a still another aspect of this invention, the annular frame may include a plurality of annular frame segments (first and second segments) placed one over another, and each of the annular frame segments may have such an inner shape as to match the side surface of the prepackaged food. Thereby, two prepackaged foods can be loaded in the container at once. The first and second annular frame segments may be dividably or integrally constructed.

As a yet another aspect of this invention, the prepackaged food sterilizing apparatus may further comprise a holding means operable to the opposing electrode pair to hold the shape of the food loading chamber. The holding means securely holds the closed state of the food loading chamber even if the inside of the chamber is pressurized by heating to prevent burst-out of the food. The holding means may include a pressing means for pressing the first electrode against the second electrode. The pressing means may preferably include a cylinder device.

As a still another aspect of this invention, the holding means may include an engaging means for restricting the first electrode away from the second electrode. Preferably, the engaging means may include an engaging portion and an operable tab to alter the position of the engaging portion between an engaged position of rendering the first and second electrodes in a pressingly held state and a release position of releasing the held state.

As a yet another aspect of this invention, the engaging means may include a band member for fastening the first and second electrodes.

Preferably, the apparatus may further comprise a heating means to promote heating of the container. In this case, it is possible to preheat the container to a certain temperature prior to dielectric heating. Preheating of the container enables heating the food to be loaded or that has been loaded therein to a certain temperature, which improves dielectric heating efficiency. Further, the heating means may be used during dielectric heating which contributes to uniform heating.

As a still another aspect of this invention, the apparatus may further comprise a cooling means for cooling the heated container. This arrangement enables rapid cooling of the heated and sterilized prepackaged food. Thereby, suppressed is overheating of the prepackaged food which consequently suppresses degraded flavors and tastes of the food.

As a further aspect of this invention, the apparatus may further comprise a transport path for transporting the container and a high frequency apply section provided on the way of the transport path to apply a high frequency from the high frequency generating section to the first and second electrodes with respect to at least one of the containers transported along the transport path.

Also, constituting the transport path by a conveyor belt that circulatively moves between a pair of rollers enables efficient transport of the container along with the circulative movement of the conveyor belt.

As a yet another aspect of this invention, the apparatus may further comprise a prepackaged food loading mechanism provided upstream of the transport path from the high frequency apply section for loading the prepackaged food into the container, and a prepackaged food take-out mechanism provided downstream of the transport path from the high frequency apply section for taking out the prepackaged food from the container. This arrangement enables automatic sterilization of prepackaged food while facilitating handling operation.

This invention also provides a prepackaged food sterilizing method of sterilizing a prepackaged food comprising the steps of: loading a prepackaged food in a food loading chamber of a food loading container with an inner shape thereof substantially equal to the shape of the prepackaged food, the food loading chamber defined by a pair of opposing electrodes and a frame member composed of an insulating material for holding the electrode pair in a spaced relation; and applying a high frequency from a high frequency generating section to the space defined by the opposing electrode pair while holding the prepackaged food in the food loading chamber to sterilize the prepackaged food by dielectric heating.

The above sterilizing method may further comprise the step of applying a high frequency from the high frequency generating section to the first and second electrodes with respect to at least one of the containers while circulatively moving the containers along a transport path.

BRIEF DESCRIPTION OF THE DRAWINGS

FIG. 4 is a block diagram showing an example of a high frequency generating means used in the apparatus of this invention;

FIG. 26 is a block diagram showing an example of a control system of the tenth food sterilizing apparatus;

BEST MODE FOR CARRYING OUT THE INVENTION

Figure 1:
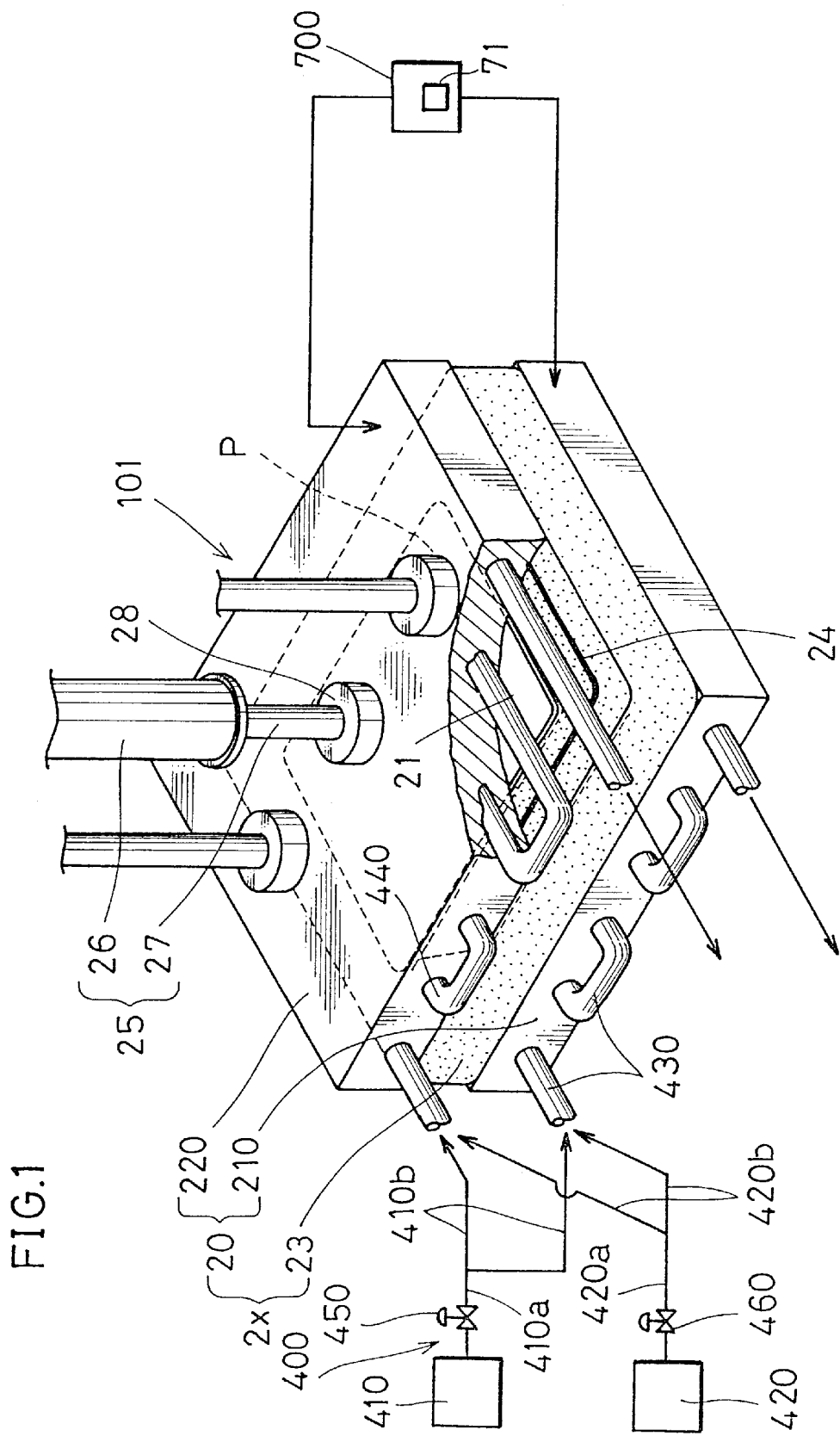
FIG. 1 is a partially cutaway perspective view of a food sterilizing apparatus as a first embodiment according to this invention.
Figure 2:
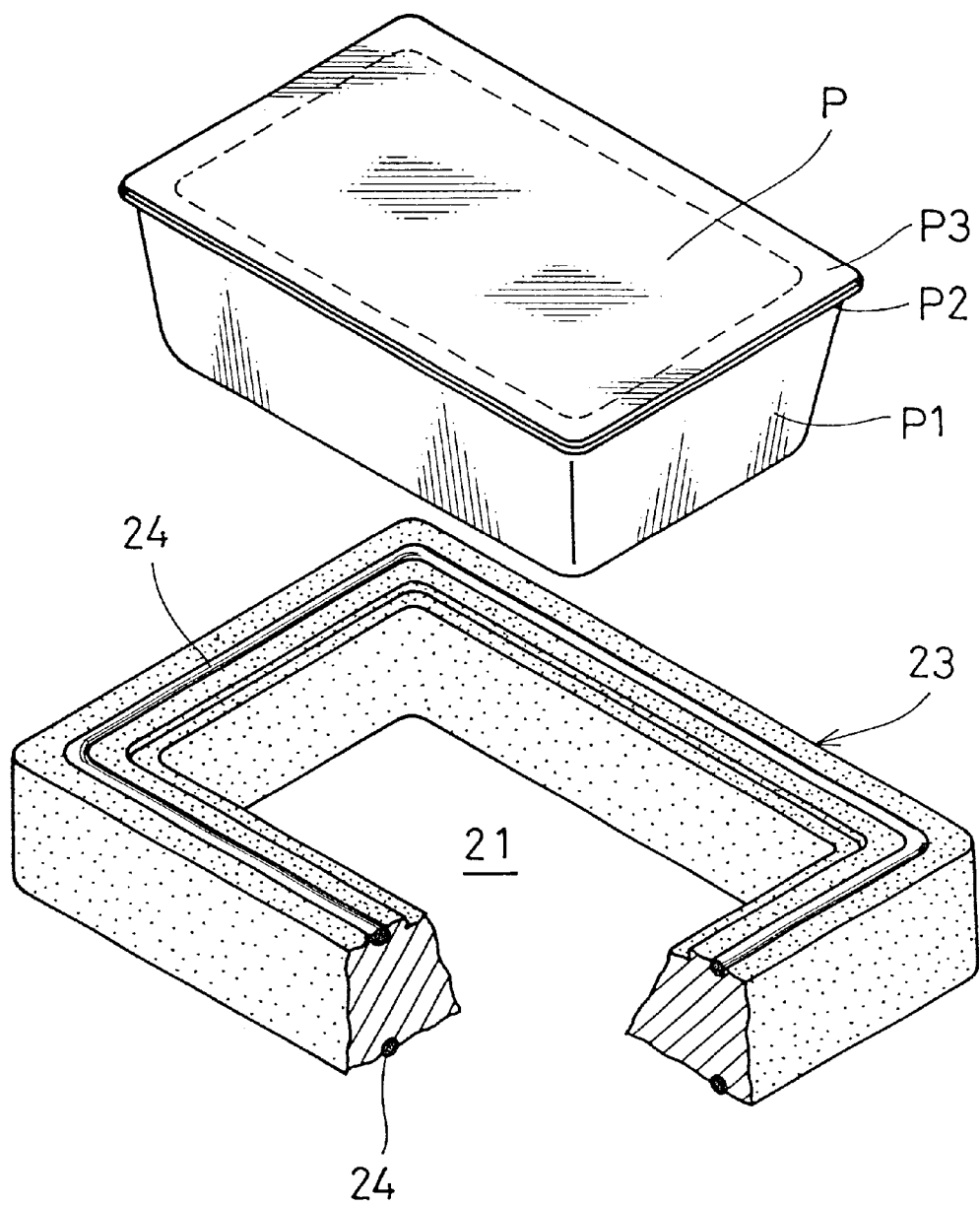
FIG. 2 is a partially cutaway perspective view of an example of an annular insulator 23.
Figure 3A:
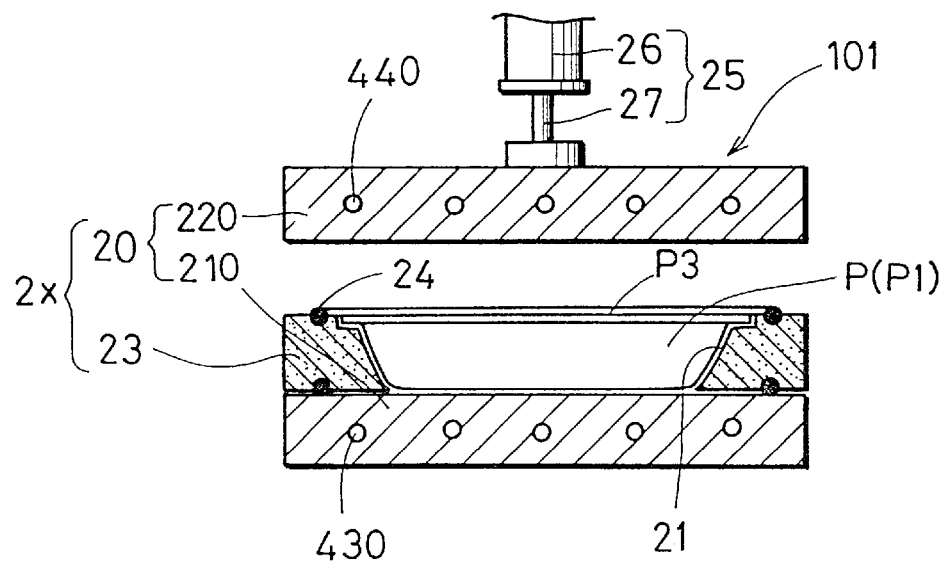
FIGS. 3A and 3B are cross sections of the food sterilizing apparatus in FIG. 1, FIG. 3A showing a state that a container is opened, FIG. 3B showing a state that the container is closed.
Figure 3B:
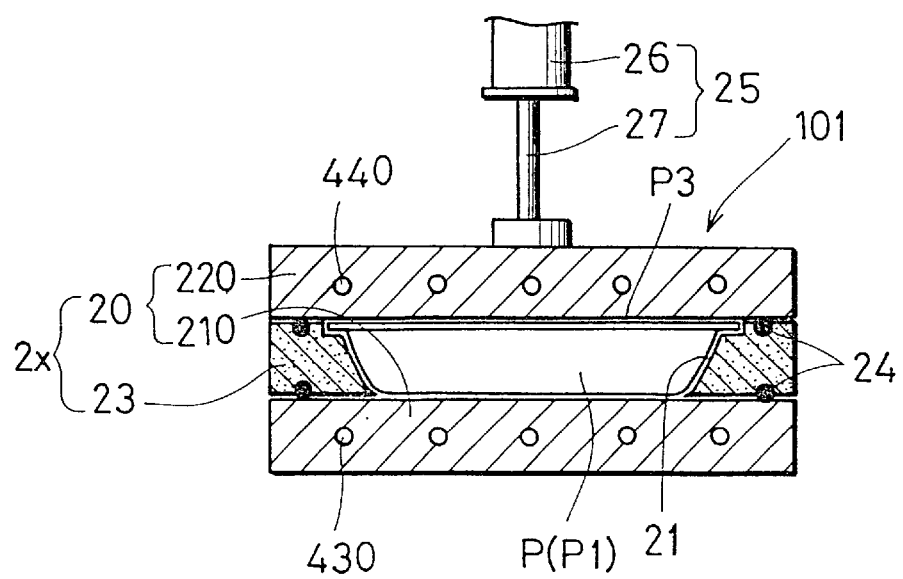

FIG. 1 is a partially cutaway perspective view showing a first embodiment of a food sterilizing apparatus according to this invention. FIG. 2 is a partially cutaway perspective view showing an example of an annular insulator (annular frame) 23. FIGS. 3A and 3B are cross sections of the food sterilizing apparatus in FIG. 1, FIG. 3A showing a state that a container is opened, and FIG. 3B showing a state that the container is closed. As shown in these drawings, the food sterilizing apparatus 101 includes a food loading container 2x in which a prepackaged food P is accommodated, a control system 700 provided with a high frequency generator (high frequency power generator) 71 for applying a high frequency to the prepackaged food P in the food loading container 2x, and a temperature adjusting means 400 for adjusting the temperature of the food loading container 2x.

In this embodiment, the prepackaged food P is such that a certain kind of food is packed in a rectangular-shape tray in plan view, as shown in FIG. 2. The tray-type prepackaged food P is formed with an annular rim P2 projecting outward from an upper end portion thereof. After the food is put in the tray, a synthetic resin sheet P3 is adhered to the annular rim P2 by, for instance, thermal fusion to sealably pack the food in the tray-type prepackaged food P.

The food loading container 2x includes an opposing electrode pair 20 consisting of a lower electrode 210 and an upper electrode 220 opposite the lower electrode 210, each formed of a rectangular shape metallic plate in plan view, and an annular insulator 23 interposed between the opposing electrode pair 20. A food loading chamber 21 encased by the annular insulator 23 is defined on the upper electrode 220. One of the electrodes 210, 220 corresponds to a first electrode, and the other corresponds to a second electrode in this invention. The prepackaged food P is accommodated in the food loading chamber 21, held by the opposing electrode pair 20, and heated by application of a high frequency. A high frequency in the range of several KHz to several hundreds MHz is usable in this invention. A high frequency in the range of 3 MHz to 300 MHz may be preferably used depending on the kind of prepackaged food.

In this embodiment, the annular insulator 23 is made of a polytetrafluoroethylene excellent in heat resistance and durability. An O-ring 24 made of a synthetic rubber is attached to upper and lower surfaces of the annular insulator 23 at a widthwise center thereof to securely keep the sealed state of the food loading chamber 21 with the O-rings 24 pressingly held between the opposing electrode pair 20. As far as the sealability of the food loading chamber 21 is ensured by holding of the annular insulator 23 by the opposing electrode pair 20, the O-ring 24 may be omitted.

The annular insulator 23 has such a size as to make the three-dimensional configuration of the food loading chamber 21 defined in the center of the food loading container $2x$ substantially equal to that of the tray-type prepackaged food P. In this arrangement, an outer side surface of the tray-type prepackaged food P is rendered into a close contact with an inner side wall of the food loading chamber 21, as shown in FIG. 3, when the prepackaged food P is loaded in the annular insulator 23 to prevent a thermal expansion of the tray-type prepackaged food P in a transverse direction.

Upon loading of the prepackaged food P in the annular insulator 23 on the lower electrode 210 as shown in FIG. 3A, the upper electrode 220 is lowered to render a ceiling of the upper electrode 220 in pressing contact with the synthetic resin sheet P3 of the prepackaged food P, as shown in FIG. 3B when the upper electrode 220 comes into contact with the annular insulator 23. Thus, the prepackaged food P is held by the opposing electrode pair 20 at a certain pressure (e.g., 3 kg/cm$^{20}$, to prevent a thermal expansion of the prepackaged food P in a vertical direction.

In this embodiment, a pressing means (holding means) 25 is provided on an upper side of the upper electrode 220 to press the upper electrode 220 downward so as to secure the sealability of the food loading chamber 21. Specfically, the pressing means 25 includes a hydraulic cylinder 26 that is supportively held by an unillustrated support frame provided at the upper side of the upper electrode 220 and a piston rod 27 each projecting downward from the hydraulic cylinder 26.

An insulator 28 is provided between the piston rod 27 and the upper electrode 220 to connect the pressing means 25 and the upper electrode 220 in a mutually and electrically insulated state. In this embodiment, the insulator 28 is, for instance, made of a polyacetal resin or a silicon resin.

The temperature adjusting means 400 includes a steam generator 410 having a boiler and the like, a cooling water supply source 420 such as waterworks, a lower electrode temperature adjusting pipe 430 embedded in the lower electrode 210 in a winding manner, and an upper electrode temperature adjusting pipe 440 embedded in the upper electrode 220 also in a winding manner.

The steam generator 410 has a steam supply main pipe 410$a$ for drawing out steam generated therefrom. The steam supply main pipe 410$a$ is branched into two sub pipes 410$b$ at a downstream end thereof. The respective sub pipes 410$b$ are connected to an upstream end of the pipes 430, 440. Further, an upstream end of the cooling water supply main pipe 420 is connected to the cooling water supply source 420, and the cooling water supply main pipe 420$a$ is branched into two cooling water supply sub pipes 420$b$ at a downstream end thereof. Downstream ends of the respective sub pipes 420$b$ are connected to the pipes 430, 440. A flexible tube made of a synthetic resin (not shown) is provided at an appropriate position on the way of the sub pipes 410$b$, 420$b$ to insulate an upstream portion thereof from the opposing electrode pair 20.

A control valve 450 is provided on the steam supply main pipe 410$a$, and a control valve 460 is provided on the main pipe 420. Opening and closing the control valves 450, 460 switchingly supplies steam from the steam generator 410 and cooling water from the supply source 420 to the pipes 430, 440 to adjust the temperature of the container $2x$ and consequently the temperature of the prepackaged food P loaded in the chamber 21.

A downstream end of the pipes 430, 440 is formed into an open end opening outward. Steam and cooling water supplied through the pipes 430, 440 are drawn out of the pipe system through the open end after adjusting the temperature of the container $2x$.

An inner wall of the pipes 430, 440 is covered with an insulator to prevent the water and steam passing through the pipes 430, 440 from being adversely affected electrically.

FIG. 4 is a block diagram showing an example of the high frequency generating means according to this invention. As shown in FIG. 4, the control system 700 includes a control means 710 for centrally controlling the food sterilizing apparatus 101, an operating unit 120 for inputting various operation data to the control means 710, and the high frequency generator 71 for supplying a high frequency to the pair of opposing electrodes 20.

The control means 710 controls power supply to the high frequency generator 71 based on operation data inputted by way of the operating unit 120. The operating unit 120 has an operation button section 123 provided with a start-up button 121, a stop button 122, etc., as well as a data enter key 124 for inputting data such as the kind and weight of the prepackaged food P.

An operation signal from the start-up button 121 and the stop button 122 is outputted to the control means 710 as a control signal via the control means 710. When the start-up button 121 is operated, driving of the high frequency generator 71 starts, and when the stop button 122 is operated, the driving thereof is suspended.

The high frequency generator 71 includes a power circuit 71$a$, a high frequency generating circuit 71$b$ for generating a high frequency upon power supply from the power circuit 71$a$, and a rectifying circuit 71$c$ provided downstream of the high frequency generating circuit 71$b$. The power circuit 71$a$ is for transforming a power of e.g., 220V for commercial use to a direct current power of a predetermined level. The circuit 71$b$ is of a self-oscillating type which generates a high frequency energy of a desired level upon supply of a DC voltage of the predetermined level from the power circuit 71$a$. The circuit 71$b$ may be of an enforced oscillating type. The rectifying circuit 71$c$ is a circuit for rectifying a current balance between the high frequency generating circuit 71$b$ and a current passing through a load (prepackaged food P) disposed between the opposing electrode pair 20, and includes a transformer 71$d$ and an unillustrated capacitor for rectification. A coil, or a capacitor and a coil may be used for rectification, in place of the capacitor.

The control means 710 enables to set a desired power supply level that is obtained in advance based on experiments conducted under various conditions of differentiated kind, volume and thickness of the prepackaged food P. Setting of the power supply level is executed by operating the data enter key 124. Upon actuation of the data enter key 124, an output power from the power circuit 71$a$ is set based on a computation program stored in advance.

Figure 5A:
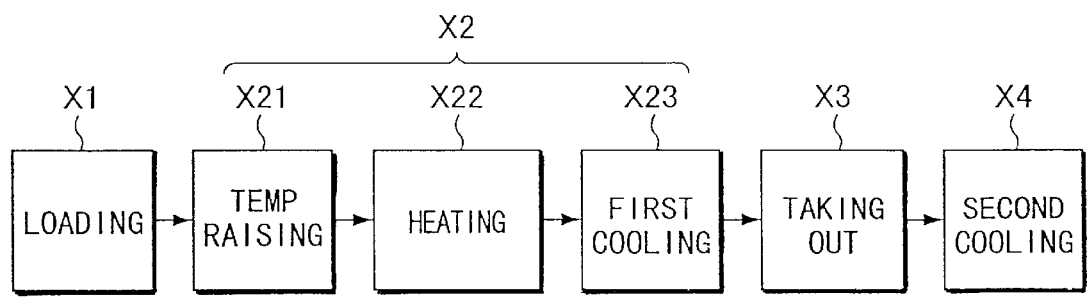
FIGS. 5A and 5B are diagrams showing an example of heat sterilization by the first food sterilizing apparatus, FIG. 5A showing a sequence of sterilization, FIG. 5B being a graph showing a relation between the temperature of a prepackaged food in a sealed state in each process for sterilization and time when the prepackaged food is loaded in a food loading container 2x.
Figure 5B:
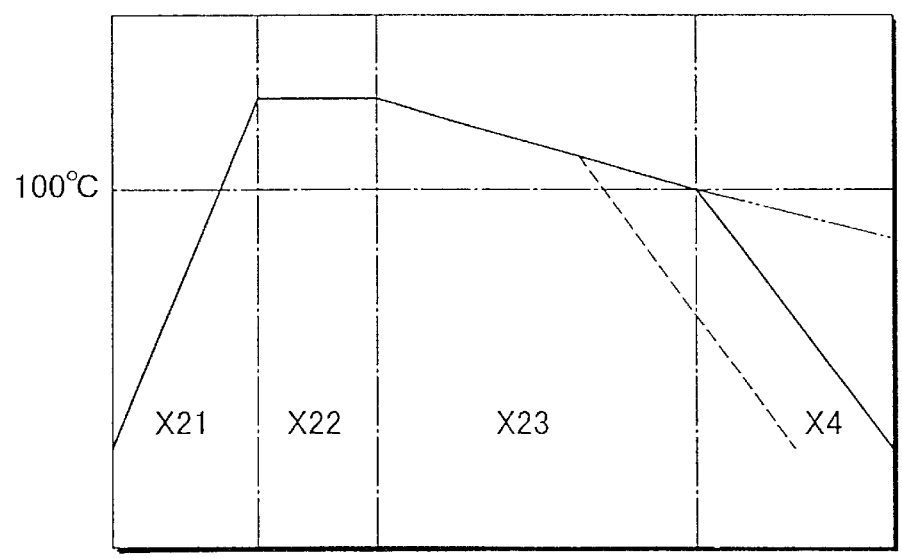

FIGS. 5A and 5B are diagrams showing an example of heat sterilization by the first food sterilizing apparatus. FIG. 5A shows a sequence of heat sterilization, and FIG. 5B is a graph showing a relation between the temperature of the sealed prepackaged food in each step for sterilization and time when the prepackaged food P is loaded in the food loading container 2x. As shown in FIG. 5A, the process of dielectric heat sterilization includes a loading step X1 where the prepackaged food P is loaded in the food loading chamber 21 of the food loading container 2x, a sterilizing step X2 where the prepackaged food P loaded in the chamber 21 is heated for sterilization, a take-out step X3 where the prepackaged food P completed with the heat sterilization in the sterilizing step X2 is taken out, and a secondary cooling step X4 where the taken out prepackaged food P is immersed in cooling water filled in an unillustrated water bath for cooling the prepackaged food P.

In the sterilizing step X2, a temperature raising step X21 where the temperature of the prepackaged food P is raised up to a sterilizing temperature of 100° C. or higher (e.g., in the range from 110° C. to 140° C.), a heating step X22 where the sterilizing temperature of the prepackaged food P obtained by the temperature raising step X21 is retained for a predetermined time to perform heat sterilization as well as heat maturation, and a primary cooling step X23 where the temperature of the prepackaged food P after retained for the predetermined time for heat sterilization is lowered to a substantially ambient temperature (temperature before the heating step X22) are performed sequentially. After the temperature of the prepackaged food P is lowered to a certain temperature (lowest point: 100° C.) in the primary cooling step X23, as shown in FIG. 4B, the prepackaged food P is immersed in cooling water filled in the unillustrated water bath in the secondary cooling step X4 after the take-out step X3 to lower the temperature thereof to an ambient temperature. In the case where the package of the prepackaged food P has a certain durability and there is no possibility of breaking the package even if the inner pressure of the prepackaged food P exceeds slightly over 1 atm (for instance, around 1.1 atm), as shown by the dotted line in the graph of FIG. 4B, it may be possible to execute the take-out step X3 before the temperature of the prepackaged food P lowers to 100° C. and then proceed to the secondary cooling step X4.

In the loading step X1, the prepackaged food P is loaded in the food loading chamber 21 on the lower electrode 210. Thereafter, driving the hydraulic cylinder 26 in such a manner as to lower the piston rod 27 lowers the upper electrode 220 downward to close a top opening of the food loading chamber 21.

When the top opening of the food loading chamber 21 is closed, as shown in FIGS. 1 and 3B, the ceiling of the upper electrode 220 is pressed against the upper side of the annular insulator 23 to securely hold the loading chamber 21 in a sealed state. In this state, the top and bottom side of the prepackaged food P loaded in the food loading chamber 21 respectively come into contact with the ceiling of the upper electrode 220 and the bottom of the lower electrode 210 in a state that the outer side surface of the prepackaged food P comes into close contact with the inner side wall of the annular insulator 23. In the loading step X1, the control valve 450 is kept in an opened state to continue heating the food loading container 2x by the steam supplied from the steam generator 410.

Next, the sterilizing step X2 is executed. In the sterilizing step X2, a high frequency starts to be supplied from the high frequency generator 71 to the opposing electrode pair 20. Upon application of the high frequency to the opposing electrode pair 20, the prepackaged food P loaded in the food loading chamber 21 is subject to dielectric heating, and the temperature raising step X21 where the temperature of the prepackaged food P is raised to a predetermined temperature is executed.

In the temperature raising step X21, the temperature of the prepackaged food P is, as shown in FIG. 5B, raised rapidly by dielectric heating. When the temperature of the prepackaged food P exceeds 100° C., water contained in the food packed in the tray vaporizes, which may lead to thermal expansion of the prepackaged food P. At this time, the expansion of the prepackaged food P is prevented due to close contact of the prepackaged food P with the inner circumferential side of the annular insulator 23 and the opposing electrode pair 20. Accordingly, the inside of the prepackaged food P is kept in a high-pressurized state which raises the boiling point of water. Then, water inside the prepackaged food P does not vaporize and stays as a liquid phase. When the temperature of the prepackaged food P reaches the predetermined temperature (e.g., in the range from 110 to 140° C.), the driving of the high frequency generator 71 is suspended, and the sequence proceeds to the heating step X22.

In the heating step X22, the temperature of the prepackaged food P is kept at the predetermined temperature (110 to 140° C.) for a predetermined time simply by steam supply from the steam generator 410 to substantially effect a heat sterilization process to the prepackaged food P by maintaining the temperature for the predetermined time. Upon completion of heat sterilization in the heating step X22, the primary cooling step X23 is executed.

In the primary cooling step X23, the control valve 450 is closed to stop supply of steam from the steam generator 410 to the food loading container 2x. Then, the control valve 460 is opened to supply cooling water from the supply source 420 to the pipes 430, 440. Thereby, as shown in FIG. 5B, the temperature of the prepackaged food P in the food loading chamber 21 is lowered down to the temperature at 100° C. or below. This cooling operation prevents long stay of the food at such a temperature that may cause growth of bacteria. This is effective in preventing re-growth of bacteria in the prepackaged food P.

After the temperature of the prepackaged food P is lowered to 100° C. or below in the primary cooling step X23, then, in the take-out step X3, the upper electrode 220 is raised followed by lifting up of the piston rod 27 by activation of the hydraulic cylinder 26 to open up the food loading chamber 21. Then, the prepackaged food P is taken out from the food loading chamber 21, put in the secondary cooling step X4 where the prepackaged food P is immersed in cooling water filled in the unillustrated water bath to lower the temperature thereof to an ambient temperature. The above-mentioned each step in accordance with batch processing is cyclically repeated in the food sterilizing apparatus 101 to sequentially perform heat sterilization to the prepackaged foods P.

In this invention, the prepackaged food P comes into contact with the inner wall of the food loading chamber 21 (namely, the inner side wall of the annular insulator 23 and the surface of the opposing electrode pair 20 in contact with the prepackaged food P). The inner wall of the food loading chamber 21 enables preventing the prepackaged food P from expanding due to heat application, and thus reliably preventing burst-out of the tray-type prepackaged food P which may be caused by expansion of the tray in the sterilizing step X2. Thus, the heat sterilization of the prepackaged food P at 100° C. or higher is securely performed, as well as carrying out heat maturation of the food to improve flavors and tastes of the food.

Also, even if the temperature of the prepackaged food P is raised over 100° C. in the sterilizing step X2, water contained in the food does not vaporize and stays as a liquid phase. In addition, the high-pressurized state quickly spreads inside the prepackaged food P to keep the inner pressure of the prepackaged food P at a constant value. In the course of setting the inner pressure of the prepackaged food P at the constant value, heat also propagates uniformly to set the temperature inside the prepackaged food P at a constant value in a short time. Thereby, variation of the heat sterilization over the entirety of the prepackaged food P is avoided.

Figure 6:
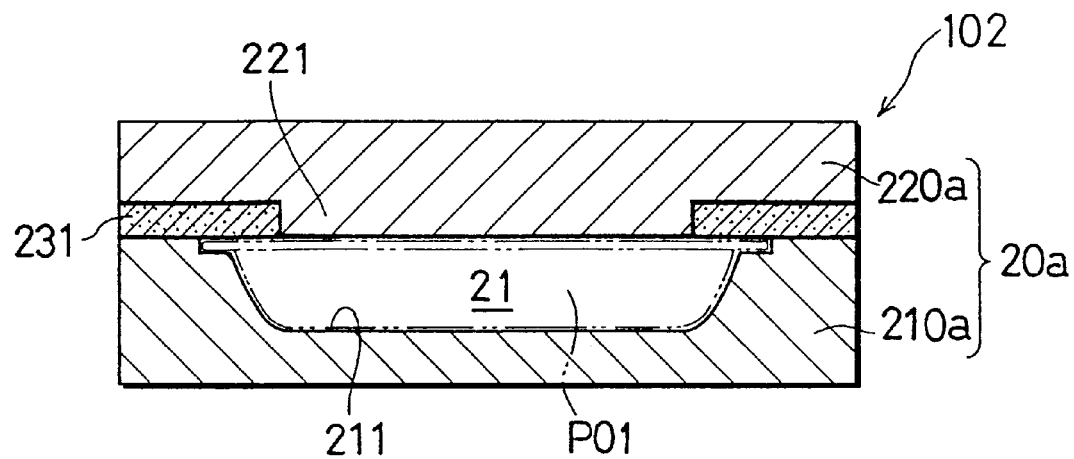
FIG. 6 is a schematic cross section of a food sterilizing apparatus as a second embodiment according to this invention.
Figure 7:
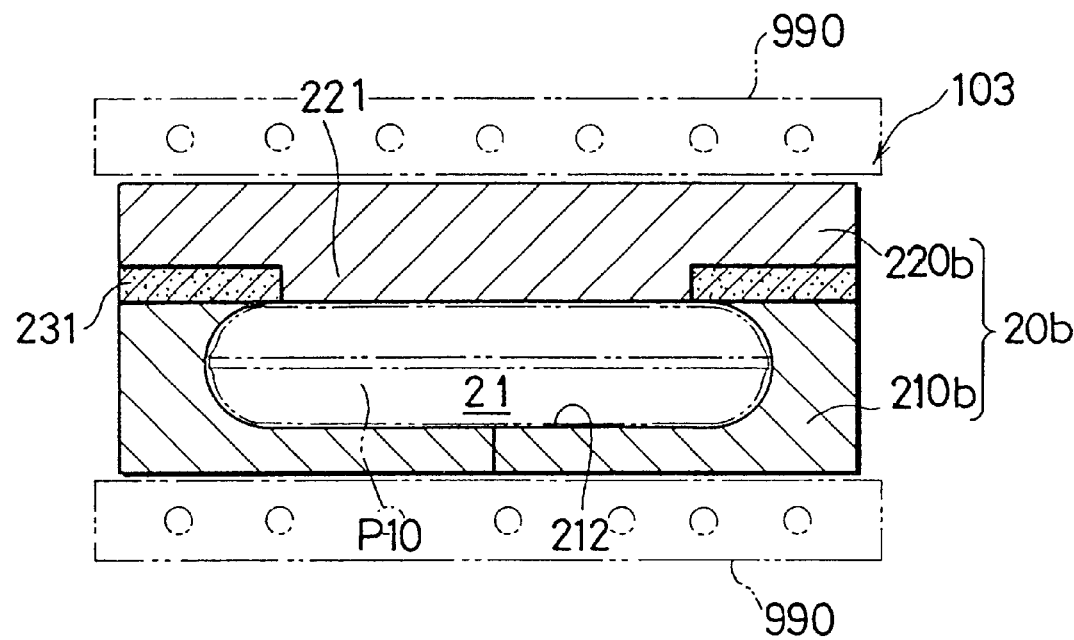
FIG. 7 is a schematic cross section of a food sterilizing apparatus as a third embodiment according to this invention.

FIG. 6 is a schematic cross section showing a second embodiment of a food sterilizing apparatus 102 according to this invention, and FIG. 7 is a cross section showing a third embodiment of a food sterilizing apparatus 103 according to this invention.

The food sterilizing apparatus 102 as the second embodiment is, as shown in FIG. 6, for sterilizing a tray-type prepackaged food P similar to the first embodiment. A lower electrode 210a and an upper electrode 220a constituting an opposing electrode pair 20a are formed with a recess/projection, in place of a flat surface, having such a shape as to match the configuration of a food loading chamber 21 and prepackaged food P.

Specfically, the upper electrode 220a is formed with a projection 221 projecting downward at a center on a bottom surface thereof, and the lower electrode 210a is formed with a housing recess 211 on a top surface thereof at a position corresponding to the projection 221 with a surface area larger than the projection 221. A bottom surface of the projection 221 is formed into a flat shape, and the housing recess 211 has such a dimension as to match the configuration of the bottom side and outer circumferential surface of the prepackaged food P.

An annular insulator (annular frame) 231 having a thickness (height) equal to the height of the projection 221 is mounted outside slidingly along an outer circumference of the projection 221 to set a bottom side thereof flush with the bottom surface of the upper electrode 220a. In this arrangement, when the upper electrode 220a is placed over the lower electrode 210a, a top surface of the lower electrode 210a comes into contact with the bottom side of the annular insulator 231 to make the lower electrode 210a and the upper electrode 220a mutually insulated from each other. At this time, the projection 221 and the housing recess 211 define the food loading chamber 21 for accommodating the prepackaged food P therein. The other arrangement of the second embodiment is the same as the first embodiment.

According to the food sterilizing apparatus 102 of the second embodiment, an inner wall of the food loading chamber 21 is formed integral with the metallic lower electrode 210a to make the food loading chamber 21 resistible against a higher pressure.

A prepackaged food loading container 20b in the third embodiment is, as shown in FIG. 7, for sterilizing a prepackaged food P10 packed in a bag. In the third embodiment, whereas an upper electrode 220b and an annular insulator 231 have the same arrangement as the embodiment in FIG. 6, a lower electrode 210b has an ellipse shape in side view, and is formed with a housing recess 212 having a configuration substantially identical to the outer shape of the bag-type prepackaged food P10. The lower electrode 210b has a two-pieces-make-one-unit arrangement in which halved left and right two pieces are joined together transversely to make a whole one unit. Placing the bag-type prepackaged food P10 on the lower electrode 210b in a state that the halved pieces are disposed apart and joining the pieces together enables fittingly accommodating the prepackaged food P inside the food loading chamber 21. The other arrangement of the third embodiment is the same as the second embodiment.

According to the food sterilizing apparatus 103 of the third embodiment, when the bag-type prepackaged food P10 is loaded in the food loading chamber 21, the outer surface thereof fittingly comes into contact with the inner wall of the food loading chamber 21 to prevent the bag-type prepackaged food P10 from being burst out with the bag tom out during the heat-sterilizing process.

The food loading container 20b in FIG. 7 is described as an example of container in the third embodiment. As an alternative, a pair of heat transmission plates 990 (shown by the block of imaginary line in FIG. 7) may be provided to hold the food loading chamber 20b therebetween. In this case, forming a passage for passing a fluid (heating medium or cooling medium) in the pair of heat transmission plates 990 desirably heats or cools the inside of the prepackaged food P10 from outward through the food loading container 20b. Alternatively, a heating conductor such as a nichrome wire may be embedded in the heat transmission plates 990 to heat the plates 990 by heat emission of the heating conductor.

Alternatively, it may be possible to make the configuration of the upper electrode and lower electrode opposite in the arrangement of the food sterilizing apparatus 102 of the second embodiment and the food sterilizing apparatus 103 of the third embodiment.

Figure 8:
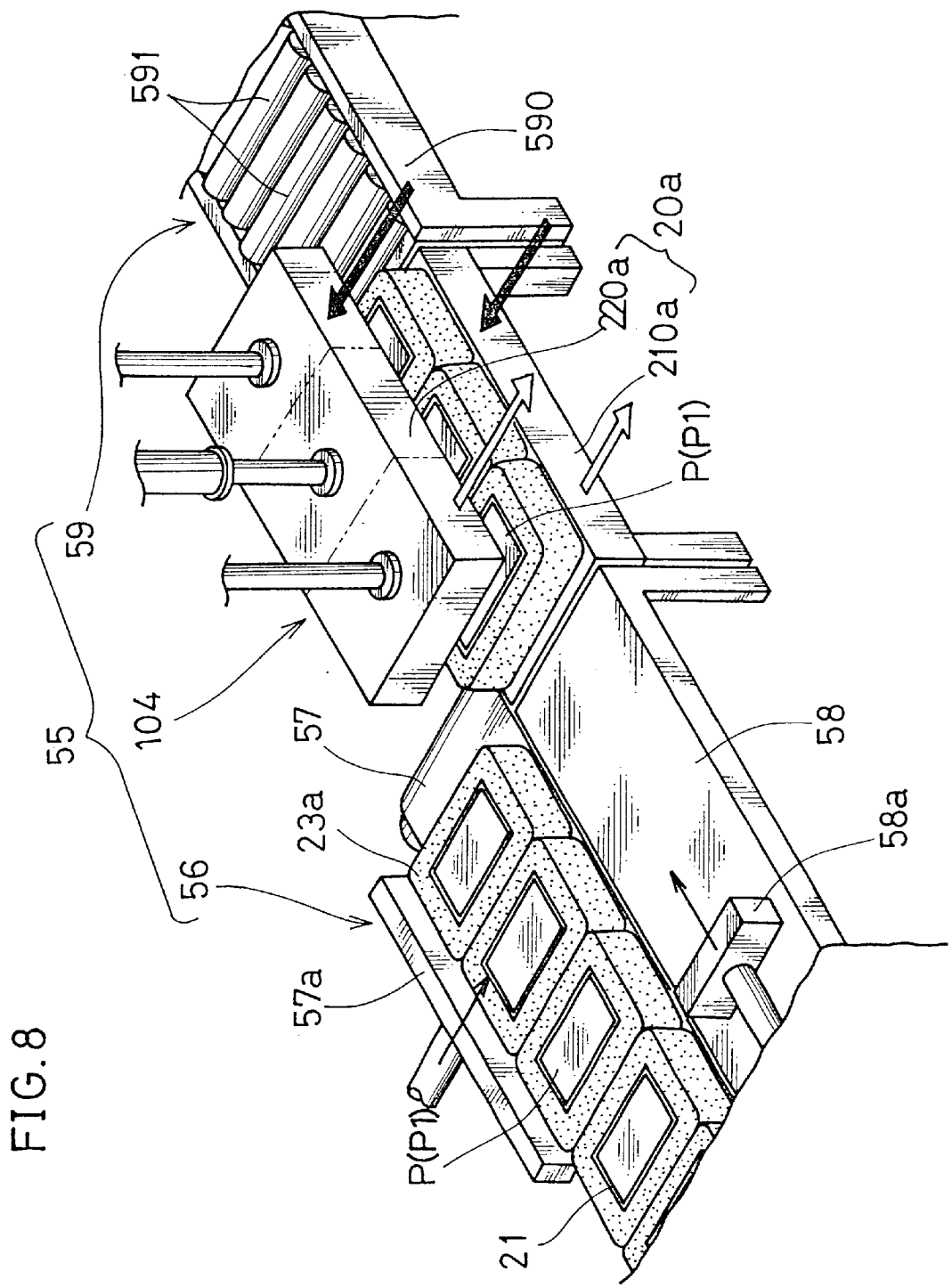
FIG. 8 is a perspective view of an example of an automatic heat sterilizing facility in which a heat sterilizing process by a food sterilizing apparatus as a fourth embodiment according to this invention is applied.

FIG. 8 is a perspective view of an example of an automatic heat sterilizing facility in which a heat sterilizing process of a fourth embodiment of the food sterilizing apparatus according to this invention is applied. As shown in FIG. 8, the automatic heat sterilizing facility 55 includes a food sterilizing apparatus 104, a container feed mechanism 56 provided upstream (left side in FIG. 8) of the apparatus 104, and a container discharge mechanism 59 provided downstream of the apparatus 104.

In this embodiment, an annular insulator 23 itself functions as a container for loading and transporting a prepackaged food P downstream. Accordingly, the annular insulator 23 is hereinafter referred to as a "transportable container 23a" in this embodiment. Prepackaged foods P are successively loaded in a corresponding one of the food loading chambers 21 of the transportable containers 23a and transported to the apparatus 104 by way of the container feed mechanism 56. After applied with a certain heat sterilization by the apparatus 104, the prepackaged foods P are successively fed to a next step by the container discharge mechanism 59.

The food sterilizing apparatus 104 is, in this embodiment, provided with an opposing electrode pair 20a consisting of a lower electrode 210a and an upper electrode 220a, having a larger size than the opposing electrode pair 20 in the aforementioned embodiments. In this arrangement, three transportable containers 23a are loadable on the lower electrode 210a serially in a row as a group, and a top opening of these three transportable containers 23a is altogether covered by the upper electrode 220a. The other arrangement of the opposing electrode pair 20a is the same as the first or second embodiment.

The container feed mechanism 56 includes a belt conveyor 57 for feeding a group of transportable containers 23a from a preceding process to a heat sterilizing process, and a setting table 58 provided upstream of the apparatus 104 in parallel with the belt conveyor 57 for setting the group of containers 23a in a line-up state prior to transport to the heat sterilizing process.

The belt conveyor 57, the setting table 58, and the lower electrode 210a are provided in such a height level as to set placing planes of the respective members for placing the transportable containers 23a at the substantially same height level with each other. In this arrangement, a group of containers 23a are slidably conveyed from the placing plane of the belt conveyor 57 to the setting table 58, and then from the placing plane of the setting table 58 to the lower electrode 210a.

A first pusher 57a for pushing the group of containers 23a from the belt conveyor 57 onto the setting table 58 is provided on a lateral side of the belt conveyor 57 opposite the setting table 58. A second pusher 58a for pushing the containers 23a from the setting table 58 onto the lower electrode 210a is provided on the setting table 58. The first and second pushers 57a, 58a reciprocate by driving an unillustrated driving means such as a hydraulic cylinder.

The container discharge mechanism 59 includes a base block 590 provided adjacent the lower electrode 210a downstream of the opposing electrode pair 20a, and a roller conveyor 591 provided on an upper surface of the base block 590. The roller conveyor 591 includes plural rollers, and each of the rollers is rotatable about an axis normal to the transport direction of the container 23a. Driving each roller of the roller conveyer 591 in the same rotating direction enables transport of the containers 23a from the apparatus 104 to a next process.

The belt conveyor 57 is intermittently driven in such a manner that the driving means is operated to forward a group of transportable containers 23a by a distance corresponding to the containers 23a and then the driving thereof is temporarily suspended. During the driving suspend state of the belt conveyor 57, the first pusher 57a reciprocates to move the group of containers 23a onto the setting table 58.

Then, the group of containers 23a placed on the setting table 58 are transported onto the lower electrode 210a by driving the second pusher 58a in the transport direction of the containers 23a. After transported onto the lower electrode 210a, the group of containers 23a are altogether pressingly held between the upper and lower electrodes 220a, 210a by lowering of the upper electrode 220a. Then, the heat sterilizing process described with reference to FIG. 5 is performed onto the prepackaged foods P respectively loaded in the transportable containers 23a.

After completion of the heat sterilizing process by the apparatus 104, the upper electrode 220a is lifted up, and then driving the second pusher 58a forward enables transport of the group of containers 23a placed on the lower electrode 210a onto the roller conveyor 591. Driving the roller conveyor 591 upon landing of the containers 23a thereon enables feeding the same forward to the next process.

In this way, by driving the belt conveyor 57, first pusher 57a, second pusher 58a and upper electrode 220a intermittently in mutually associated manner, the prepackaged foods P loaded in the group of containers 23a that have reached the belt conveyor 57 one after another are simultaneously applied with heat sterilization by the apparatus 104 and discharged out of the apparatus 104 by the container discharge mechanism 59. This sequence is performed cyclically.

As shown by the solid black arrows in FIG. 8, a heating medium is drawn into the lower electrode 210a and the upper electrode 220a, and as shown by the blank arrows, the heating medium is drawn out therefrom. In this arrangement, the electrodes 210a, 220a are heated to promote heating the inside of the prepackaged food P in addition to dielectric heating, thereby accelerating the sterilization by the apparatus. As an alternative, introducing a heating medium into the electrodes 210a, 220a during the dielectric heating and then introducing a cooling medium upon completion of the dielectric heating makes it possible to rapidly cool the prepackaged food P completed with the sterilization. This is effective in avoiding a situation that a certain temperature state, which may cause growth of bacteria, is continued for a long time.

Alternatively, the upper electrode 220a may be divided into three sections as shown by the imaginary lines in FIG. 8, and compact high frequency generators may be provided individually to the sections to supply a high frequency power to each section. This arrangement makes it possible to uniformly supply a high frequency power to the group of foods P between the opposing electrode pair 20a.

According to the above automatic heat sterilizing facility 55, a great number of prepackaged foods P can be subject to heat sterilization without manpower, which is effective in suppressing operating cost of the food sterilizing apparatus.

Figure 9:
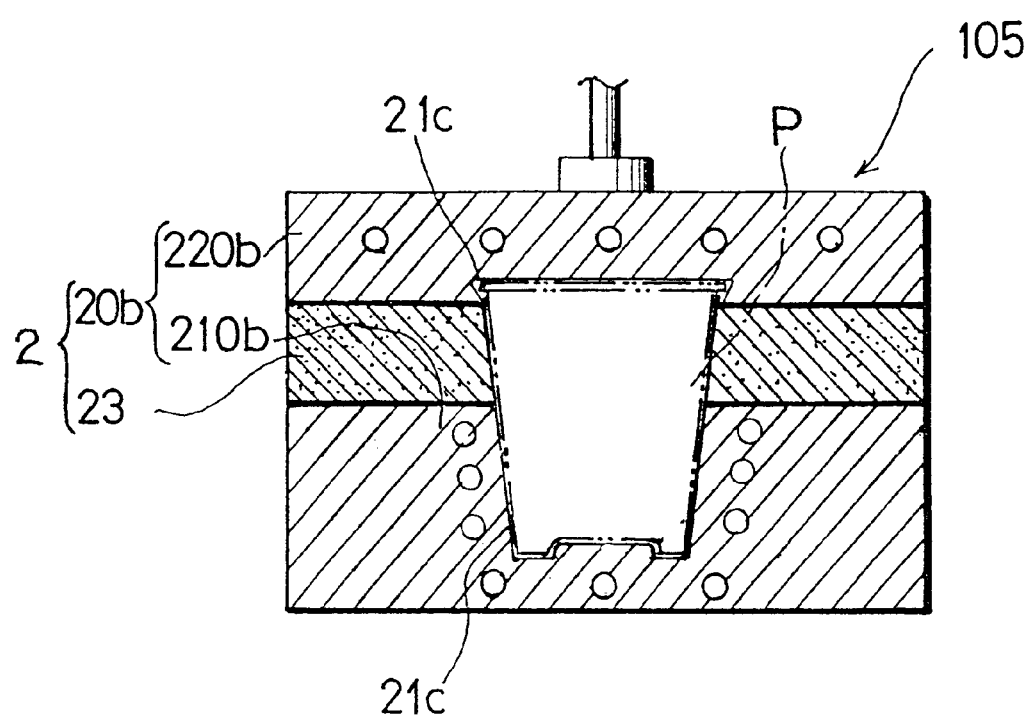
FIG. 9 is a schematic cross section showing a food sterilizing apparatus as a fifth embodiment according to this invention.

FIG. 9 is a schematic cross section of a food sterilizing apparatus as a fifth embodiment according to this invention. In this embodiment, the arrangement of a sealing member 23 is the same as the foregoing embodiments, except that an opposing electrode pair 20b (lower electrode 210b and upper electrode 220b) is formed with a recess 210c at a center thereof in opposing surfaces to fittingly receive upper and lower parts of a prepackaged food P packed in a cup-shape vessel. The other arrangement of the fifth embodiment is the same as the first embodiment.

Figure 10:
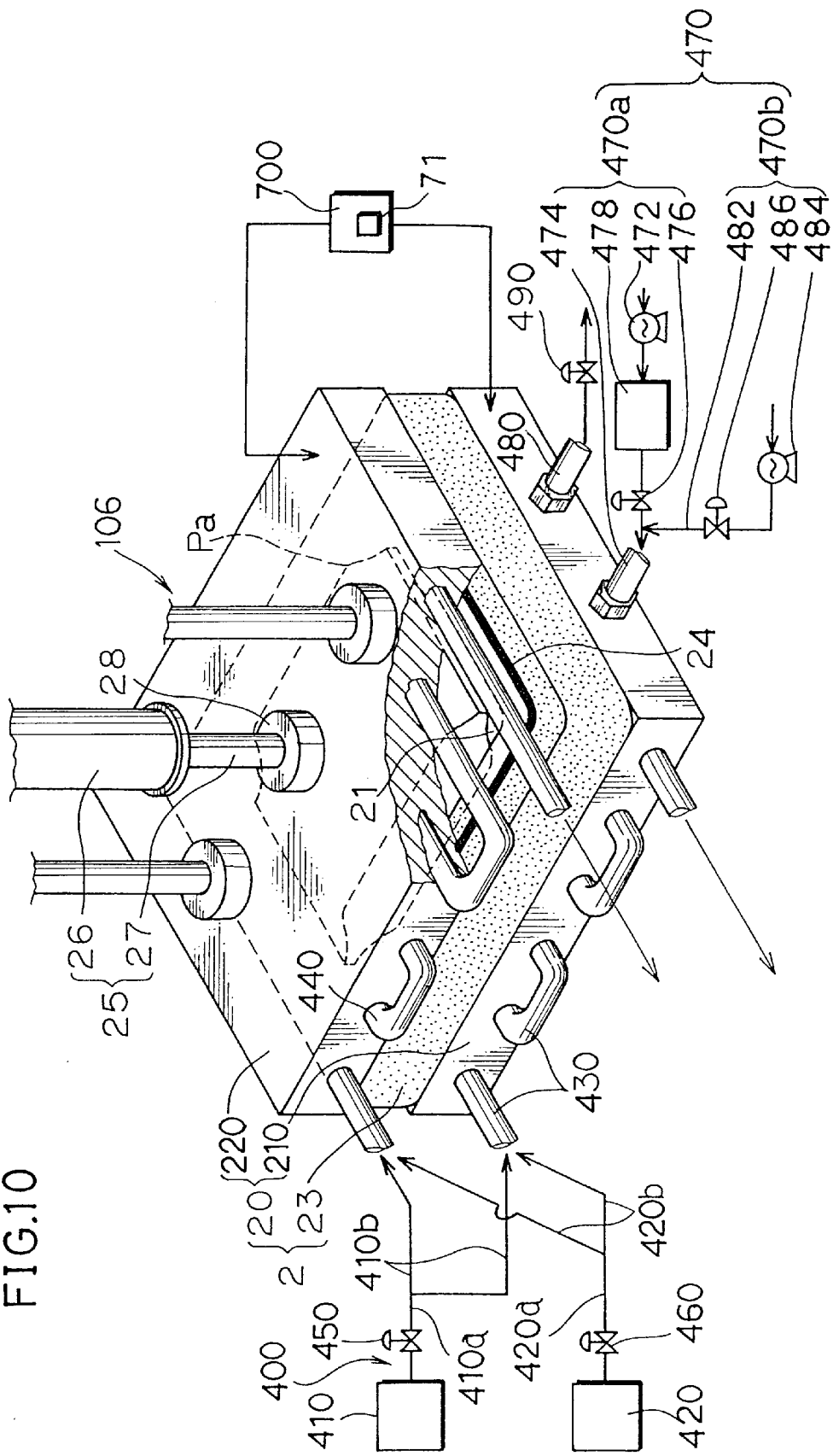
FIG. 10 is a partially cutaway perspective view showing a food sterilizing apparatus as a sixth embodiment according to this invention.
Figure 11A:
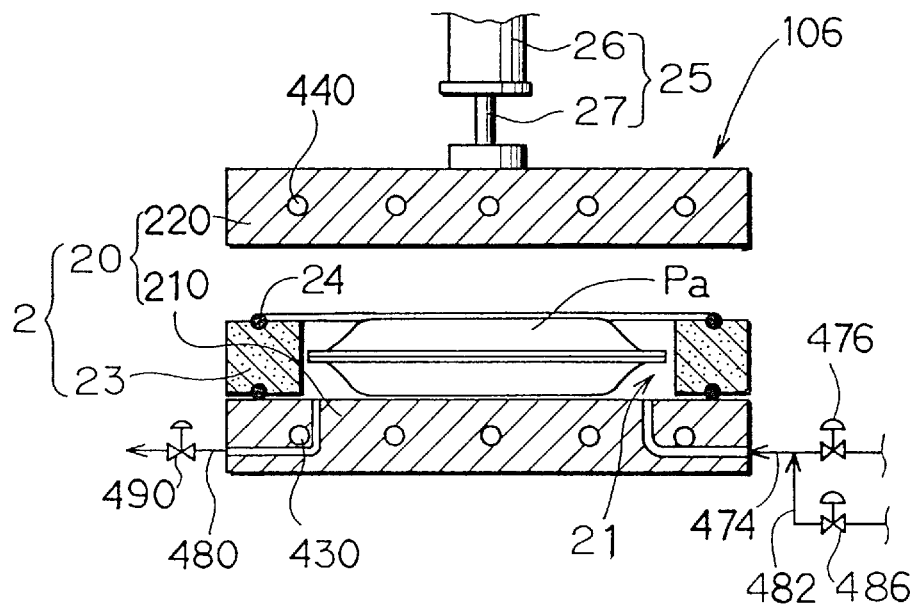
FIGS. 11A and 11B are cross sections of the food sterilizing apparatus shown in FIG. 10, FIG. 11A showing a state that a container is opened, and FIG. 11B showing a state that the container is closed.
Figure 11B:
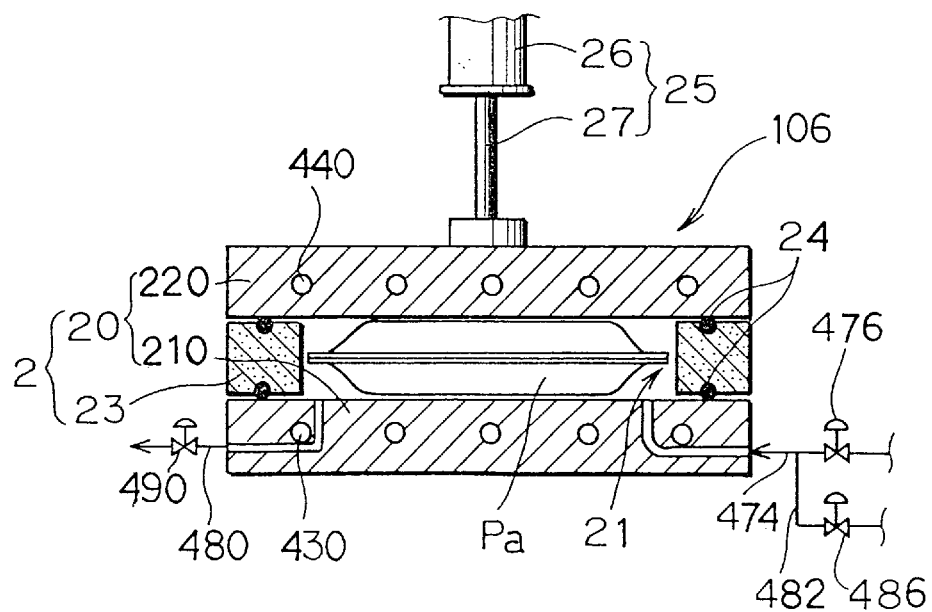

FIG. 10 is a partially cutaway perspective view of a food sterilizing apparatus as a sixth embodiment according to this invention, and FIGS. 11A and 11B are cross sections of the food sterilizing apparatus in FIG. 10, FIG. 11A showing a state that a container is opened, and FIG. 11B showing a state that the container is closed. As shown in these drawings, the apparatus 106 includes a food loading container 2y for housing a prepackaged food Pa, a high frequency generating means 3 for applying a high frequency to the prepackaged food Pa loaded in the container 2y, a heating medium supply means 470 for supplying heated air as a heating medium and cooling water as a cooling medium into the container 2y, and a temperature adjusting means 400 for adjusting the temperature of the container 2y. Although the heating medium may be steam, heated air is used as the heating medium in this embodiment.

The food loading container 2y includes, in this embodiment, an opposing electrode pair 20 each made of a metallic plate member with a rectangular shape in plan view and consisting of a lower electrode 210 and an upper electrode 220 opposing the lower electrode 210, and an annular sealing member 23x (corresponding to the annular insulator 23 shown in FIGS. 1 to 9) provided between the opposing electrode pair 20 along a perimeter thereof. A food loading chamber 21 encased by the sealing member 23x is defined on the upper electrode 220. The dimension of the sealing member 23x is set such that the height thereof is slightly smaller than the thickness of the prepackaged food P and the content volume thereof is slightly larger than the volume of the prepackaged food Pa The prepackaged food Pa is accommodated in the chamber 21, held by the opposing electrode pair 20, and heated by application of a high frequency. A high frequency in the range of several KHz to several hundreds MHz is usable in this invention. A high frequency in the range of 3 MHz to 300 MHz may be preferably used in this embodiment.

In this embodiment, the sealing member 23x is made of a polytetrafluoroethylene excellent in heat resistance and durability. An O-ring 24 made of a synthetic rubber is attached to upper and lower surfaces of the sealing member 23x at a widthwise center thereof to securely keep the sealed state of the food loading chamber 21 with the O-rings 24 pressingly held between the opposing electrode pair 20.

The thickness (height) of the sealing member 23x is set in such a manner that an upper surface of the prepackaged food Pa comes into contact with a ceiling of the upper electrode 220, as shown in FIG. 11B, with the upper electrode 220 in contact state with the sealing member 23x when the upper electrode 220 is lowered after loading of the prepackaged food Pa in the sealing member 23x as shown in FIG. 11A In this embodiment, a pressing means (holding means) 25 is provided on an upper side of the upper electrode 20 to press the upper electrode 220 downward so as to secure the sealability of the food loading chamber 21. Specifically, the pressing means 25 includes a hydraulic cylinder 26 that is supportively mounted on an unillustrated support frame provided at the upper side of the upper electrode 220 and a piston rod 27 each projecting downward from the hydraulic cylinder 26.

An insulator 28 is provided between the piston rod 27 and the upper electrode 220 to connect the pressing means 25 and the upper electrode 220 in a mutually and electrically insulated state. In this embodiment, the insulator 28 is, for instance, formed of a polyacetal resin or a silicon resin.

The heating medium supply means 470 includes a heated air supply unit 470a for supplying heated air into the food loading chamber 21, and a cooling water supply unit 470b for supplying cooling water into the food loading chamber 21. The supply unit 470a has an air compressor 472 for raising the air pressure at a level of about 3 kg/cm$^2$, a first high pressure pipe 474 provided between the air compressor 472 and the lower electrode 210, a control valve 476 provided at the first high pressure pipe 474, and a boiler 478 provided between the control valve 476 and the air compressor 472 for heating the air inside the food loading chamber 21 up to a temperature in the range of 110 to 140° C.

The boiler 478 is so constructed as to heat the pressurized air of about 3 kg/cm$^2$ supplied from the air compressor 472 up to a temperature in the range of 110 to 140° C. using electric power or heat of combustion obtained by burning a fuel such as gas or petroleum as a heat source. Feedback controlling the boiler 478 based on a detection value of an unillustrated temperature sensor and pressure sensor enables supplying heated air of the above-mentioned pressure and temperature into the food loading chamber 21 by opening the control valve 476.

The cooling water supply unit 470b includes a second high pressure pipe 482 connected to the first high pressure pipe 474 downstream of the control valve 476, a pressurizing pump 484 for feeding high-pressurized cooling water (of about 3 kg/cm$^2$) into the second high pressure pipe 482, and a control valve 48 provided at the second high pressure pipe 482 downstream of the pressurizing pump 484.

A drainage pipe 480 with a base end thereof communicated inside the food loading chamber 21 and a distal end thereof opened to the outside air is provided on the lower electrode 210. A control valve 490 is provided on the way of the drainage pipe 480. The food loading chamber 21 sealably closed by the upper electrode 220 communicates outside by opening the control valve 490. Opening the control valve 490 releases the sealed state of the food loading chamber 21 and ejects heated air or cooling water staying inside the chamber 21 out of the food loading container 2. The cooling water may be water, such as tap water, of ambient temperature or cool water with a temperature lower than the ambient temperature.

When the control valve 486 is closed and the air compressor 472 is driven in a state that the control valve 476 is opened, heated air is supplied into the food loading chamber 21 and drawn out of the food loading container 2 via the control valve 490. In this way, high-pressurized heated air of 1 atm or higher communicates in and out of the food loading chamber 21. On the other hand, when the control valve 476 is closed and the pressurizing pump 484 is driven with an opened state of the control valve 490, and then, the control valve 486 is opened, high-pressurized cooling water is supplied into the food loading chamber 21. Thereby, the heated air inside the food loading chamber 21 is replaced with the incoming cooling water while maintaining the high-pressurized state.

The temperature adjusting means 400 includes a steam generator 410 having a boiler and the like, a cooling water supply source 420 such as waterworks, a lower electrode temperature adjusting pipe 430 embedded in the lower electrode 210 in a winding manner, and an upper electrode temperature adjusting pipe 440 embedded in the upper electrode 220 also in a winding manner.

The steam generator 410 has a steam supply main pipe 410a for drawing out generated steam. The main pipe 410a is branched into two sub pipes 410b at a downstream end thereof. The respective sub pipes 410b are connected to an upstream end of the pipes 430, 440. Further, an upstream end of a cooling water supply source 420a is connected to the supply source 420, and the main pipe 420a is branched into two sub pipes 420b at a downstream end thereof. Downstream ends of the respective sub pipes 420b are connected to the pipes 430, 440. A flexible tube made of a synthetic resin (not shown) is provided at an appropriate position on the way of the sub pipes 410b, 420b to insulate an upstream portion thereof from the opposing electrode pair 20.

A control valve 450 is provided at the main pipe 410a, and a control valve 460 is provided at the supply source 420a. Opening and closing the control valves 450, 460 changeably supplies steam from the steam generator 410 and cooling water from the supply source 420 to the pipes 430, 440 to adjust the temperature of the container 2y and consequently the temperature of the prepackaged food Pa loaded in the chamber 21.

A downstream end of the pipes 430, 440 is formed into an open end opening outward. Steam and cooling water supplied through the pipes 430, 440 are drawn out of the pipe system through the open end after adjusting the temperature of the container 2y.

An inner wall of the pipes 430, 440 is covered with an insulator to prevent the water and steam passing through the pipes 430, 440 from being adversely affected electrically.

The food sterilizing apparatus 106 of the sixth embodiment is operated in the similar manner as the control sequence (FIG. 5) by the control system 700 (see FIG. 4) similar to the first embodiment except for the temperature raising step X21. Specfically, in the temperature raising step X21 of this embodiment, heated air is supplied to the chamber 21 simultaneously with driving of the high frequency generating means 3. Thereby, a high frequency power from the high frequency generating means 3 is supplied between the lower electrode 210 and the upper electrode 220, and the temperature of the prepackaged food Pa is, as shown in FIG. 4B, raised rapidly by dielectric heating, while a non-contact area of the prepackaged food Pa which is not rendered in contact with the opposing electrode pair 2 is heated with heated air. When the temperature of the prepackaged food Pa reaches a predetermined temperature (e.g., in the range of 110 to 140° C.), the driving of the high frequency generating means 3 is suspended, and the sequence proceeds to the heating step X22.

In the heating step X22, the temperature of the prepackaged food Pa is kept at a predetermined temperature (e.g., in the range of 110 to 140° C.) for a predetermined time period by steam supply from the steam generator 410 and heated air supply from the boiler 478 to substantially perform heat sterilization to the prepackaged food Pa by maintaining the temperature for the predetermined time period. Upon completion of the heat sterilization in the heating step X22, the primary cooling step X23 is executed.

In the primary cooling step X23, the control valve 450 is closed to stop supply of steam from the steam generator 410 to the food loading container 2y. Then, the control valve 460 is opened to supply cooling water from the supply source 420 to the pipes 430, 440. Thereby, as shown in FIG. 5B, the temperature of the prepackaged food Pa in the food loading chamber 21 is lowered down to the temperature at 100° C. or below. Then, the control valve 490 is opened to drain the water inside the food loading chamber 21 out of the pipe system. This cooling operation prevents long stay of the food at such a temperature that may cause growth of bacteria. This is effective in preventing re-growth of bacteria in the prepackaged food Pa.

After the temperature of the prepackaged food Pa is lowered to 100° C. or below in the primary cooling step X23, then, in the take-out step X3, the upper electrode 220 is raised followed by lifting up of the piston rod 27 by activation of the hydraulic cylinder 26 to open up the food loading chamber 21. Then, the prepackaged food Pa is taken out from the food loading chamber 21, put in the secondary cooling step X4 where the prepackaged food Pa is immersed in cooling water filled in the unillustrated water bath to lower the temperature thereof to an ambient temperature. The above-mentioned each step in accordance with batch processing is cyclically repeated in the food sterilizing apparatus 1 to sequentially perform heat sterilization to the prepackaged foods Pa.

Figure 12A:
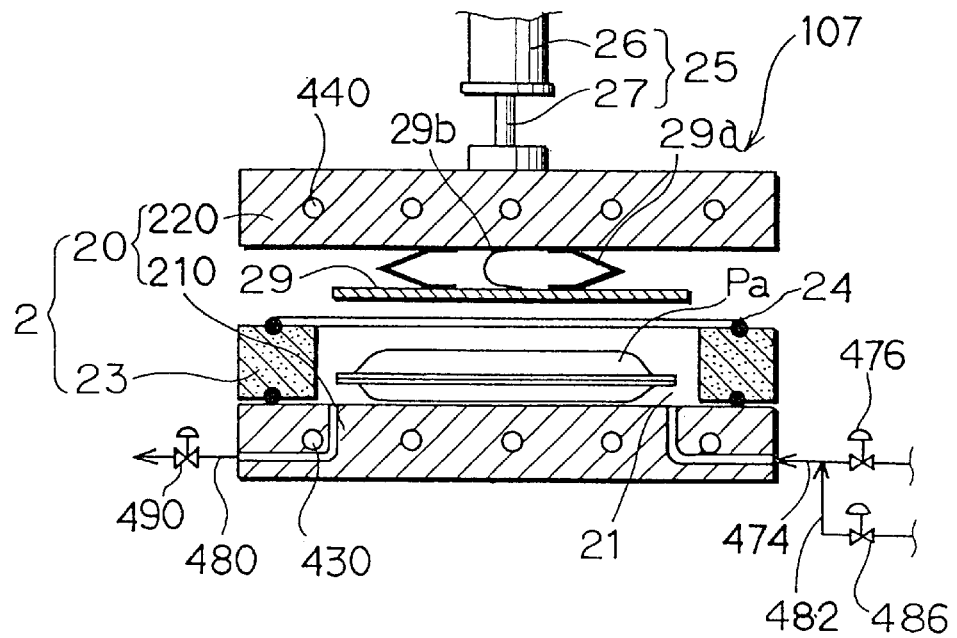
FIGS. 12A and 12B are cross sections of a food sterilizing apparatus as a seventh embodiment according to this invention, FIG. 12A showing a state that an upper electrode is raised, and FIG. 12B showing a state that the upper electrode is lowered.
Figure 12B:
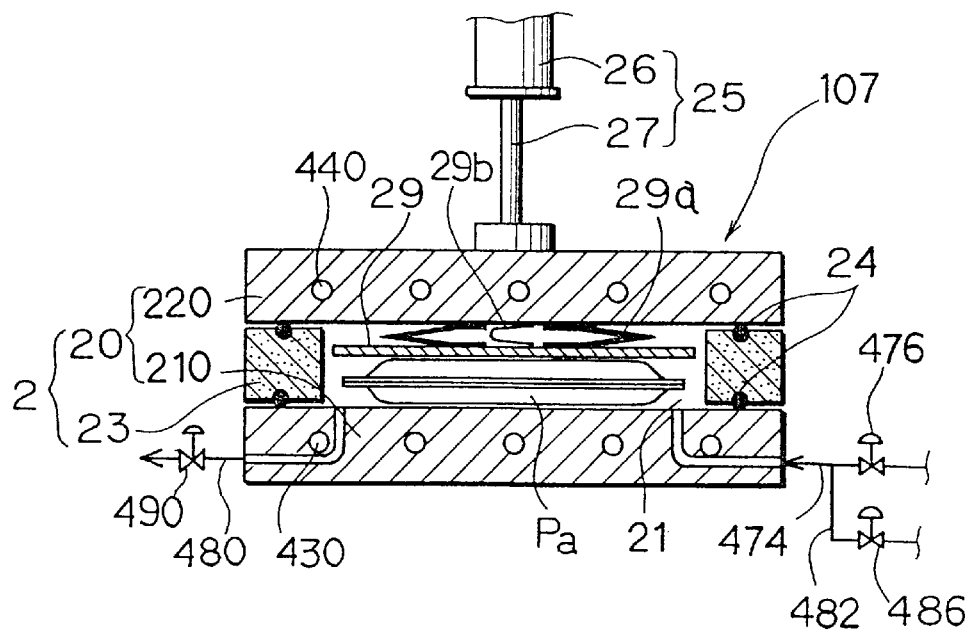

As mentioned above in detail, the food sterilizing apparatus 106 of the sixth embodiment is so designed as to supply high-pressurized heated air, in the sterilizing step X2, from the heating medium supply means 470 into the airtight food loading chamber 21 in which the prepackaged food Pa is loaded. In this arrangement, the non-contact area on the outer surface of the prepackaged food Pa which is not rendered in contact with the opposing electrode pair 20 is heated by heated air, while a high frequency from the high frequency generating means 3 is applied to the prepackaged food Pa loaded inside the food loading chamber 21 in a held state by the opposing electrode pair 20 to heat the inside of the prepackaged food Pa by electromagnetic wave. Since the peripheral portion of the prepackaged food P which could not have been sufficiently heated by electromagnetic wave is heated with heated air in this embodiment, heating by combination of heated air and electromagnetic wave enables uniform heating of the inside the prepackaged food Pa. Consequently, avoided is an uneven state of heated temperature inside the prepackaged food Pa, which was unavoidable when heating the prepackaged food solely depending on application of electromagnetic wave, as in the conventional method. Thereby, well-balanced sterilization is securely performed while performing uniform heat maturation of the prepackaged food Pa to eliminate variation of flavors and tastes of the prepackaged food Pa FIGS. 12A and 12B are cross sections showing a seventh embodiment of a food sterilizing apparatus 107, FIG. 12A showing a state that an upper electrode 220 is raised, and FIG. 12B showing a state that the upper electrode 220 is lowered. As shown in FIGS. 12A and 12B, in the seventh embodiment, the food sterilizing apparatus 107 has a metallic pressing plate 29 indirectly attached to a ceiling of the upper electrode 220 which is operably pressed against the upper side of the prepackaged food Pa The configuration of the upper electrode 220 is the same as the sixth embodiment except that the pressing plate 29 is provided in the seventh embodiment. Specifically, the pressing plate 29 is attached to the ceiling of the upper electrode 220 by way of a pair of spring members 29a each bent into a substantially V-shape in side view. The pressing plate 29 has a length slightly smaller than the transverse size of a food loading chamber 21. The pressing plate 29 is housed in the food loading chamber 21 encased by a sealing member 23x when the upper electrode 220 is lowered. The other arrangement of the seventh embodiment is similar to the sixth embodiment.

A connecting piece 29b which electrically connects the upper electrode 220 and the pressing plate 29 is provided between the pair of spring members 29a. The connecting piece 29b is provided by bending a thin copper plate into a U-shape in side view. The connecting piece 29b is so designed as to set the distance between the pressing plate 29 and the upper electrode 220 variable in accordance with a deflected amount (elastic deformation) of the connecting piece 29b, and apply a high frequency from the upper electrode 220 onto the pressing plate 29 uniformly.

According to the food sterilizing apparatus 107 of the seventh embodiment, the pressing plate 29 is located, as shown in FIG. 12A, projectingly below the upper electrode 220 due to the spring members 29a when the upper electrode 220 is raised upward. When the piston rod 27 is lowered by driving a hydraulic cylinder 26 from this state, the pressing plate 29 is accommodated in the food loading chamber 21 above the lower electrode 210 and comes into pressing contact with the upper side of the prepackaged food Pa when the upper electrode 220 is rendered into contact with the sealing member 23x. At this time, a compressive force of the spring members 29a against the spring force is increased, thus leading to a downwardly pressed state of the prepackaged food Pa. In this state, the pressing plate 29 functions as the upper electrode.

Providing the pressing plate 29 enables coping with a variation of the thickness of the prepackaged food Pa, even if such variation occurs, due to elastic deformation of the spring members 29a. This arrangement improves usability of the food sterilizing apparatus 107.

Figure 13:
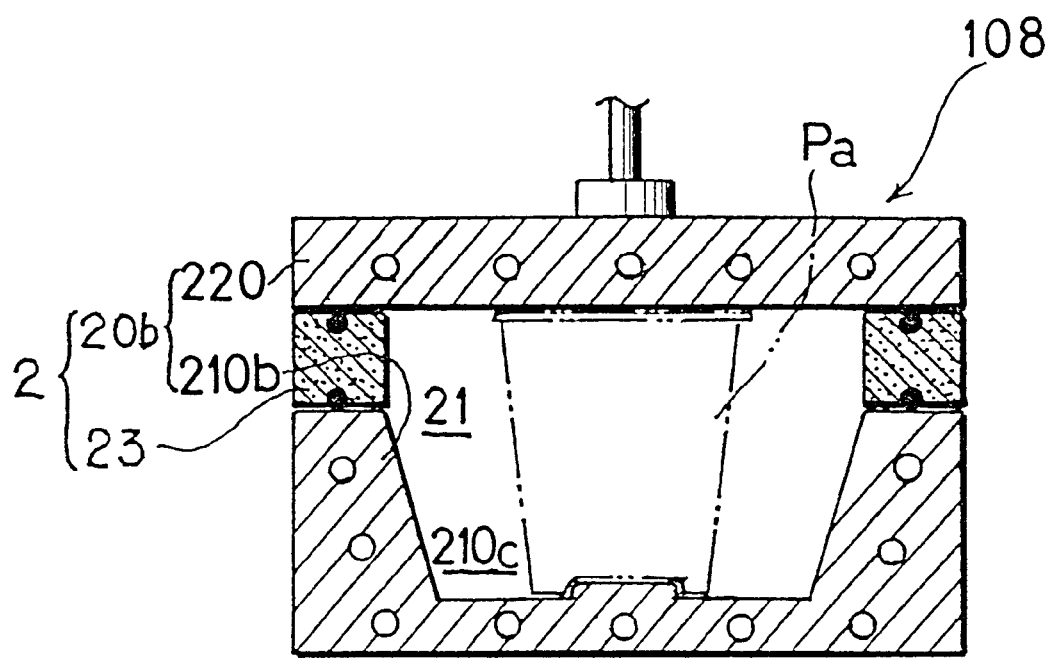
FIG. 13 is a schematic cross section of a food sterilizing apparatus as an eighth embodiment according to this invention.

FIG. 13 is a schematic cross section showing an eighth embodiment of the food sterilizing apparatus according to the invention. Although the arrangement of a sealing member 23x and an upper electrode 220 of an opposing electrode pair 20b of the eighth embodiment is the same as the sixth embodiment, the eighth embodiment is different from the sixth embodiment in that a lower electrode 210b of the opposing electrode pair 20b is shaped into a container with a closed bottom by forming a recess 210c at a center on an upper surface thereof to fittingly load a cup-shape prepackaged food Pa therein.

According to the food sterilizing apparatus 108 of the eighth embodiment, forming the recess 210c in the lower electrode 210b increases the height dimension of the food loading chamber 21. Thereby, this arrangement is applied to the prepackaged food Pa of a cup-shape vessel which has a certain height dimension, and improves usability of the food sterilizing apparatus 108.

In the eighth embodiment, the recess 210c is formed in the lower electrode 210b. Alternatively, the recess may be formed in a bottom side of the upper electrode, or may be formed both in the upper and lower electrodes.

Figure 14:
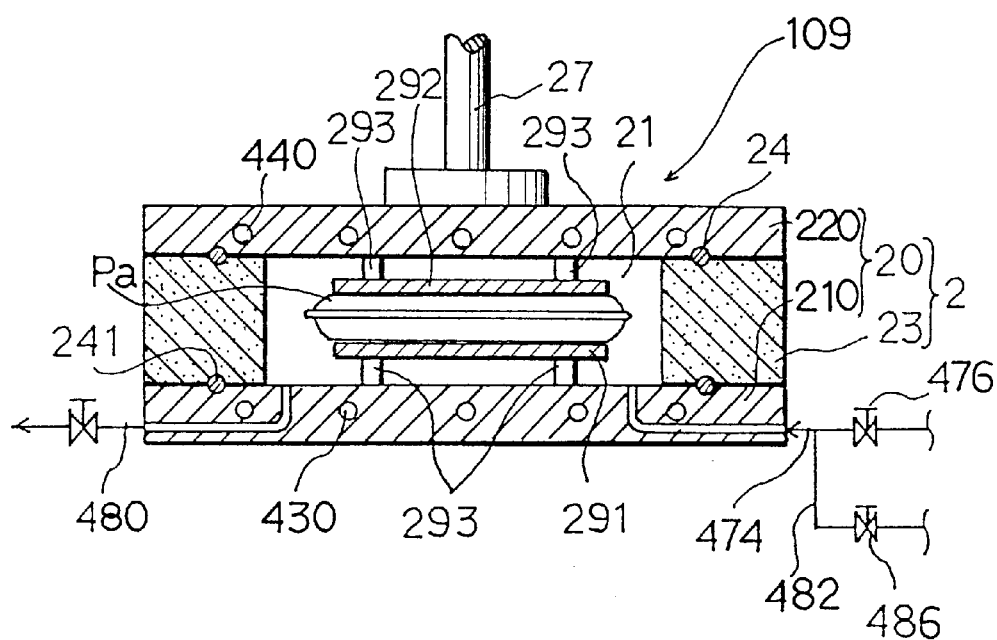
FIG. 14 is a schematic cross section of a food sterilizing apparatus as a ninth embodiment according to this invention.

FIG. 14 is a schematic cross section showing a ninth embodiment of the food sterilizing apparatus according to this invention. This embodiment is an alteration of the seventh embodiment. A lower pressing plate 291 is supported on the side of a lower electrode 210 by way of a certain number of bar-shape support members 293, and likewise, an upper pressing plate 292 is supported on the side of a ceiling of an upper electrode 220 by way of a certain number of bar-shape support members 293 at a position opposing to those on the lower pressing plate 291. In this arrangement, a prepackaged food Pa is pressingly held between the lower and upper pressing plates 291, 292 when the prepackaged food Pa is loaded in a food loading chamber 21. The lower and upper plates 291, 292 are electrically connected to the lower and upper electrodes 210, 220, respectively. A high frequency voltage applied to the lower and upper electrodes 210, 220 is applied to the prepackaged food Pa via the lower and upper pressing plates 291, 292.

In this embodiment, each of the support members 293 is formed into a metallic bar-shape. As an alternative, the support member 293 may be formed of an elastic member such as a coil spring to cope with a variation of thickness of the prepackaged food Pa held by the pressing plates 291, 292 using elasticity of the elastic member. The other arrangement of the ninth embodiment is the same as the food sterilizing apparatus 106 (see FIGS. 10, 11A, 11B) of the sixth embodiment.

According to the food sterilizing apparatus 109 of the ninth embodiment, when the prepackaged food Pa is pressingly held by the pressing plates 291, 292 in the food loading chamber 21, and a heating medium or a cooling medium is drawn into the food loading chamber 21 to attain uniform heating aided by auxiliary heating or cool the prepackaged food Pa, the prepackaged food Pa is supported spaced away from an inner wall of the food loading chamber 21. Accordingly, an efficient auxiliary heating and efficient cooling is performed by transmission of the heating medium through the pressing plates 291, 292 and direct heat exchange of the heating medium.

Hereafter, basic two types of prepackaged food loading container applied to a serially operated (including semi-serially operated) sterilizing apparatus according to this invention is described with reference to FIGS. 15 to 20B. Next, an alteration of container of the basic type is described with reference to FIGS. 21 to 24, and a sterilizing apparatus for sterilizing a prepackaged food loaded in the altered container is described with reference to FIGS. 25 to 30. A power supply system different from the one shown in FIGS. 25 to 29 is described with reference to FIGS. 17A and 17B. A container of another type and a sterilizing apparatus for sterilizing a prepackaged food loaded in the another type of container is described with reference to FIGS. 18 to 22.

Figure 15:
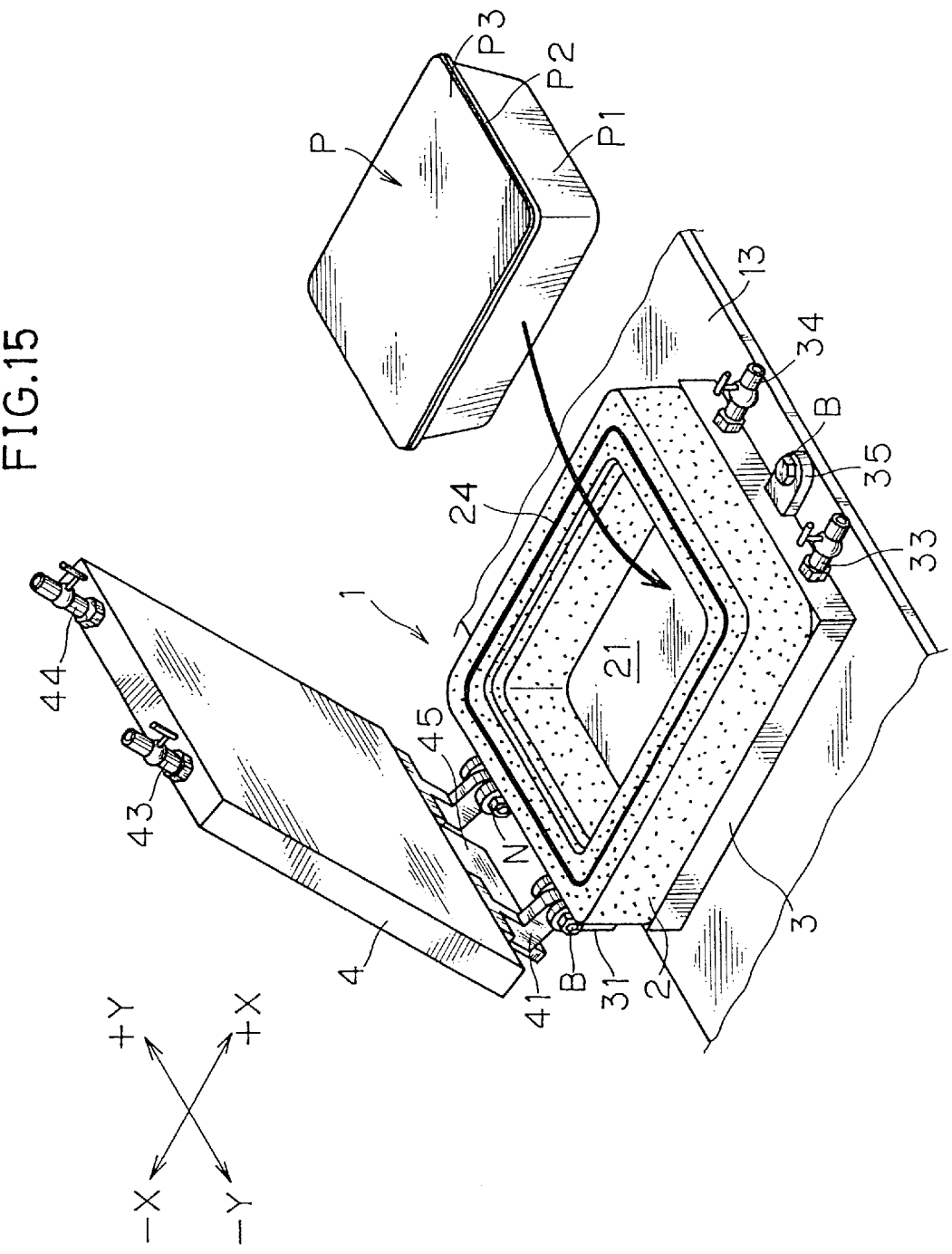
FIG. 15 is a perspective view of a prepackaged food loading container as a first modification according to this invention showing a state that a cover is opened.
Figure 16:
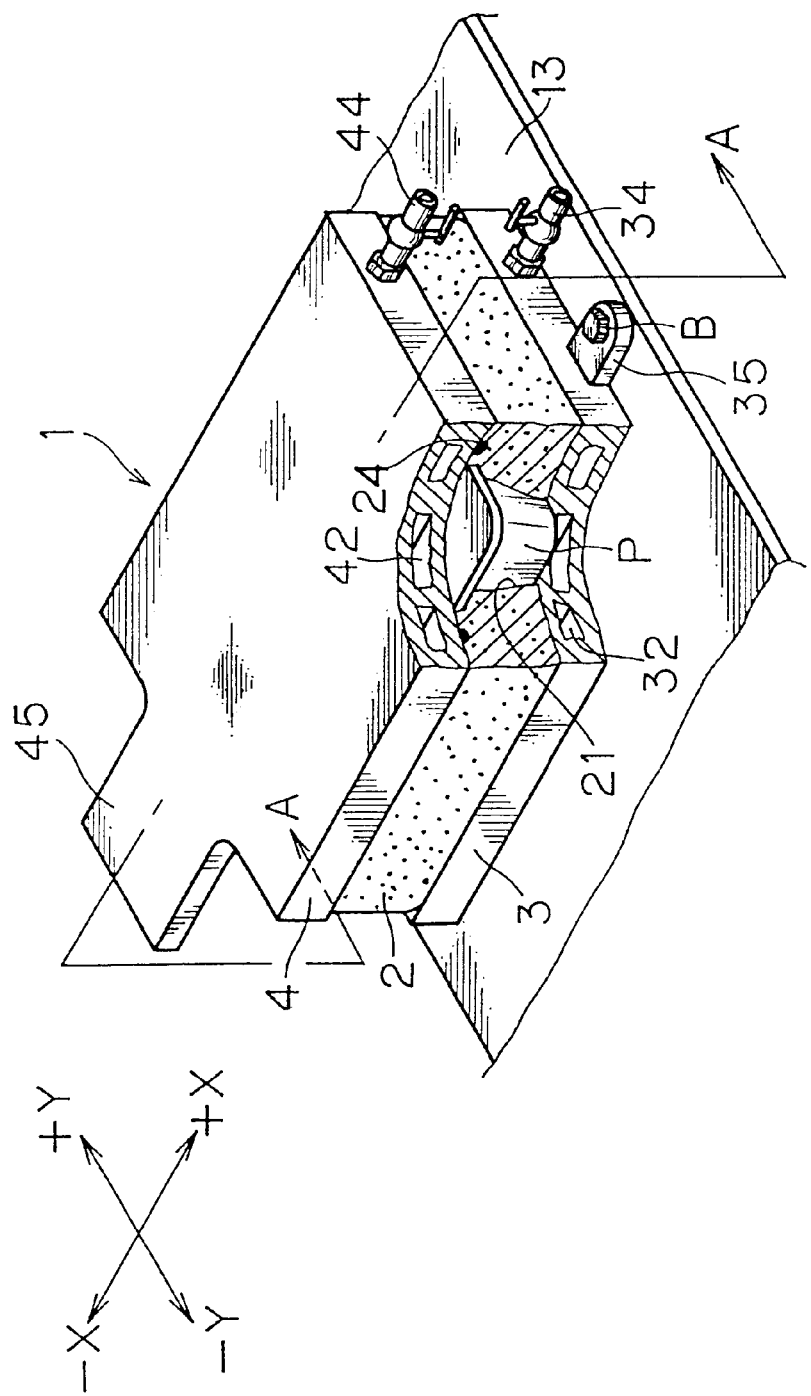
FIG. 16 is a perspective view of the first modified prepackaged food loading container showing a state that the cover is closed.
Figure 17A:
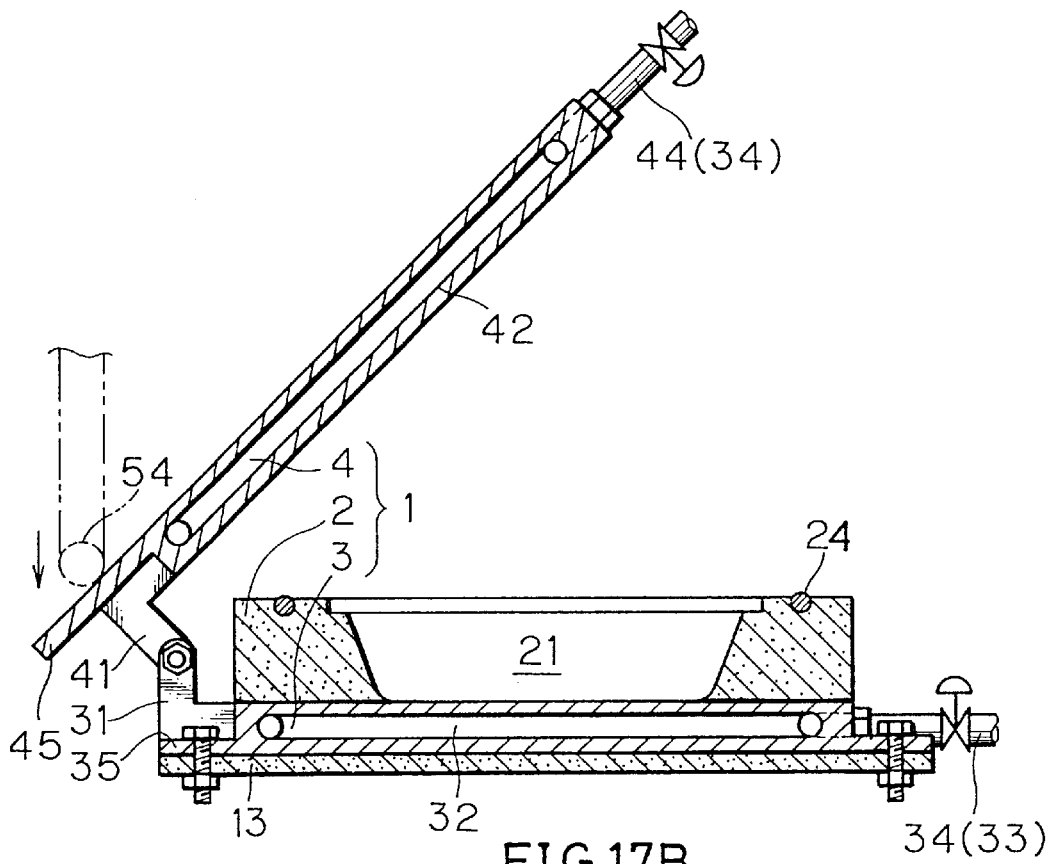
FIGS. 17A and 17B are cross sections taken along the line A—A in FIG. 16, FIG. 17A showing a state that the cover is opened, FIG. 17B showing a state that the cover is closed.
Figure 17B:
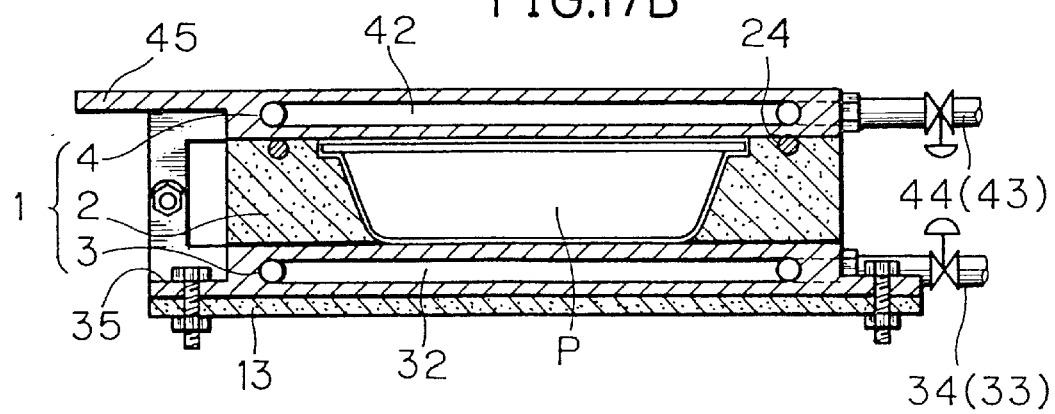

FIGS. 15 and 16 are perspective views showing a first modification of the container according to this invention, FIG. 15 showing a state that a cover is opened, and FIG. 16 showing a state that the cover is closed. FIGS. 17A and 17B are cross sections taken along the line A—A in FIG. 16, FIG. 17A showing a state that the cover is opened, and FIG. 17B showing a state that the cover is closed. In FIGS. 15 and 16, X—X direction represents widthwise direction of the food loading container, and Y—Y direction represents depth direction thereof. Specifically, -X direction indicates leftward direction, +X direction indicates rightward direction, and -Y direction indicates forward direction, and +Y direction indicates rearward direction.

As shown in FIGS. 15 and 16, the container 1 essentially includes an annular container main body (annular frame) 2 made of a non-conductive material, a bottom plate 3 made of a conductive material for closing an opening at a bottom side of the container main body 2, and a cover 4 for openably closing an opening at a top side of the container main body 2. The container main body 2 corresponds to the annular insulator 23 or the sealing member 23x shown in FIGS. 1 to 14.

The container main body 2 is made of a polytetrafluoroethylene excellent in heat resistance and durability. A food loading chamber 21 for loading a prepackaged food P is defined in the container main body 2 by an inner wall of the container main body 2 and the bottom plate 3. The food loading chamber 21 is brought to a sealed state by closing the cover 4.

An O-ring 22 made of a synthetic rubber is attached to an upper end of the container main body 2 to securely keep the sealed state of the food loading chamber 21 when the food loading chamber 21 is closed by the cover 4. In this modification, the O-ring 22 is provided. However, as far as the sealability of the food loading chamber 21 in the container main body 2 is ensured, the O-ring 22 may be omitted.

In this modification, the prepackaged food P is such that a certain kind of food is packed in a food container body P1 of a rectangular-shape tray in plan view, as shown in FIG. 15. The food container body P1 is formed with an annular rim P2 projecting outward from an upper end thereof. After the food is loaded in the food container body P1, a synthetic resin sheet P3 is adhered to the annular rim P2 by, for instance, thermal fusion to sealably pack the food in the food container body P1.

The inner dimension of the container main body 2 is set at such a three-dimensional configuration as to match the outer shape of the food container body P1. In this arrangement, when the prepackaged food P is loaded in the food loading chamber 21, the bottom side of the prepackaged food P comes into contact with the bottom plate 3, and the outer side surface of the prepackaged food P comes into contact with the inner side wall of the container main body 2. When the cover 4 is closed after the prepackaged food P is loaded in the food loading chamber 21, a ceiling of the cover 4 comes into contact with the synthetic resin sheet P3 of the prepackaged food P. In this way, the entire outer surface of the prepackaged food P comes into contact with the entire inner wall of the prepackaged food loading container 1.

As shown in FIGS. 17A and 17B, the bottom plate 3 has a pair of lower hinges 31 each of an L-shape provided at the Y—Y directional opposite ends projecting outward from a left side thereof. The cover 4 has a pair of upper hinges 41 each of an L-shape corresponding to the pair of lower hinges 31. A bolt B is inserted in a hole formed in a lead end of the lower hinge 31 and upper hinge 41 in a jointed state and tightened with a nut N to rotatably joint the cover 4 to the bottom plate 3 about an axis of the bolt B. The hinge pairs 31, 41 are molded of an engineering plastic having a certain rigidity, which is a non-conductive material, to insulate the space between the bottom plate 3 and the cover 4.

As shown in FIGS. 16, 17A and 17B, the bottom plate 3 is internally formed with a winding-shaped lower fluid passage 32, and likewise, the cover 4 is internally formed with a winding-shaped upper fluid passage 42. A fluid drawing connector 33 is mounted on a right side of the bottom plate 3 in FIGS. 17A, 17B (−Y direction in FIG. 15) to communicate with the lower fluid passage 32, and a fluid ejecting connector 34 is mounted on the right side of the bottom plate 3 in FIGS. 17A, 17B at a position corresponding to the fluid drawing connector 33 (+Y direction in FIG. 15) to communicate with the lower fluid passage 32. In this arrangement, a fluid drawn into the lower fluid passage 32 through the connector 33 is ejected out of the connector 34 after passing through the winding-shaped passage 32. A valve is provided at each of the connectors 33, 34, 43, 44. Controlling opening/closing of the valves enables switching between connection and disconnection of the connectors 33, 34, 43, 44 to and from the food loading chamber 21.

Similarly, the cover 4 is mounted with the fluid drawing connector 43 and the fluid ejecting connector 44 which communicate the upper fluid passage 42. A fluid drawn into the upper fluid passage 42 through the fluid drawing connector 43 is ejected out of the fluid ejecting connector 44 after passing along the upper fluid passage 42.

The fluid drawing connectors 33, 43 and the fluid ejecting connectors 34, 44 are so connected to a hot water source and a cooling water source, as is described in the following section describing a sterilizing process of the prepackaged food P, to draw hot water into the fluid passages 32, 42 before dielectric heating in order to promote heating of the prepackaged food P loaded in the food loading chamber 21 by heat transmission, and then to draw cooling water into the fluid passages 32, 42 after the dielectric heating in order to lower the temperature of the prepackaged food P once raised in the food loading chamber 21.

A pair of connecting tabs 35 respectively projecting leftward and rightward are provided on widthwise opposite ends of the bottom plate 3. The connecting tab pair 35 each provided at a number of prepackaged food loading containers 1 arrayed at the same interval is fixed on a conveyor belt 13 by a bolt B. In this arrangement, the prepackaged food loading containers 1 are serially moved forward by driving the conveyor belt 13. The conveyor belt 13 defines a transport path for the prepackaged food loading containers 1 according to this invention.

An operable projecting tab 45 projecting leftward is provided on an upper left end of the cover 4. Pushing a lead end of the operable projecting tab 45 downward opens up the cover 4, and releasing the pushing force allows the cover 4 to close the top opening of the food loading chamber 21.

According to the prepackaged food loading container 1 of the first modification, when the cover 4 is closed after loading the prepackaged food P in the chamber 21, the outer side surface of the food container body P1 comes into close contact with the inner side wall of the chamber 21. Also, the bottom surface and the top surface of the food container body P1 are respectively rendered into close contact with the bottom plate 3 and the cover 4. In addition, the annular rim P2 is held between an upper peripheral end of the food loading chamber 21 and the cover 4. In this arrangement, the prepackaged food P is securely held by the opposing electrode pair applied with a high frequency at a certain pressing force without a possibility of pop-up of the cover 4. Accordingly, even if the prepackaged food P is heated at the temperature of 100° C. or higher by application of a high frequency from the opposing electrode pair, avoided is a problem that the food container body P1 is burst out due to boiling and vaporizing of water contained in the prepackaged food P.

Figure 18:
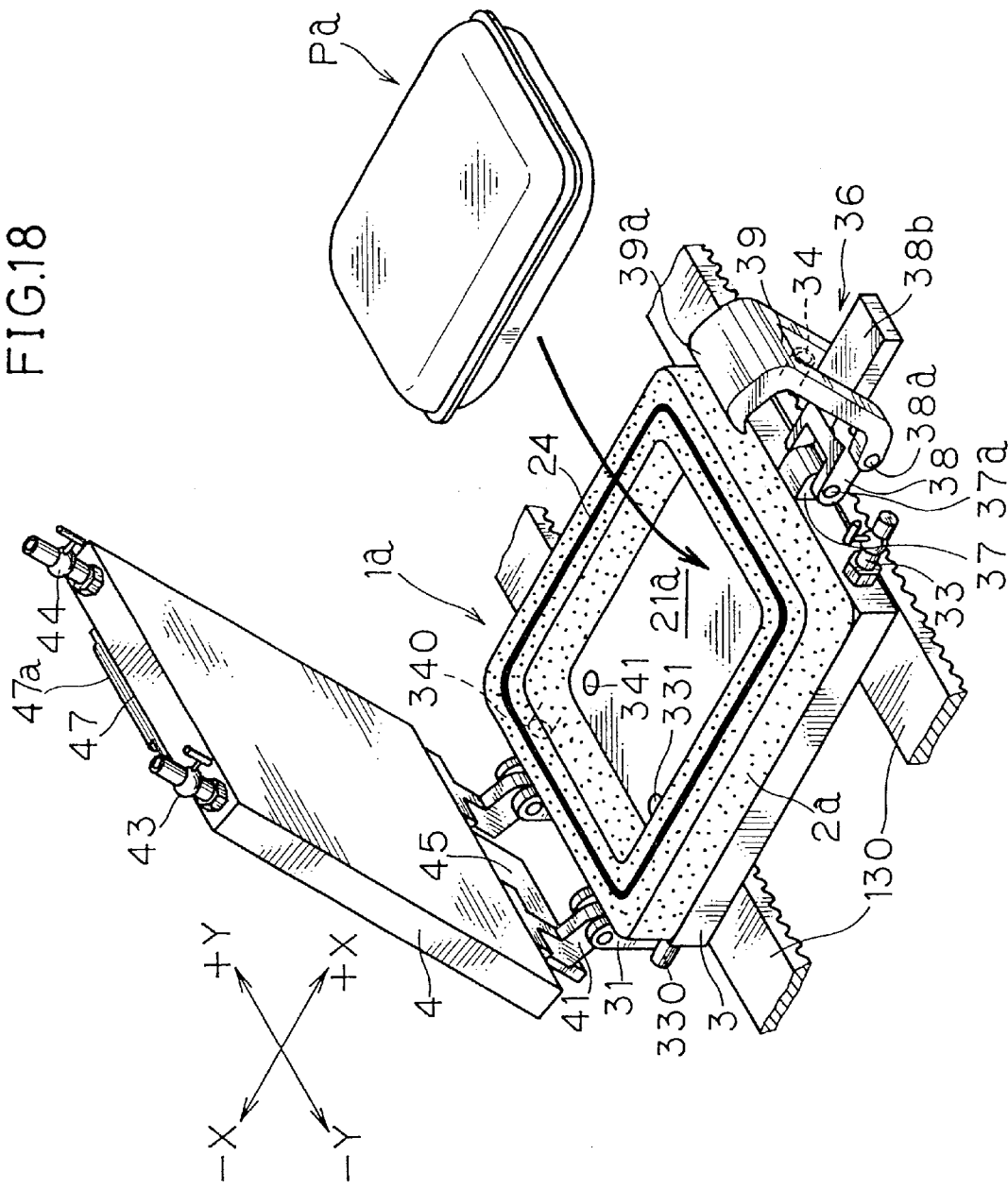
FIG. 18 is a perspective view of a prepackaged food loading container as a second modification according to this invention showing a state that a cover is opened.
Figure 19:
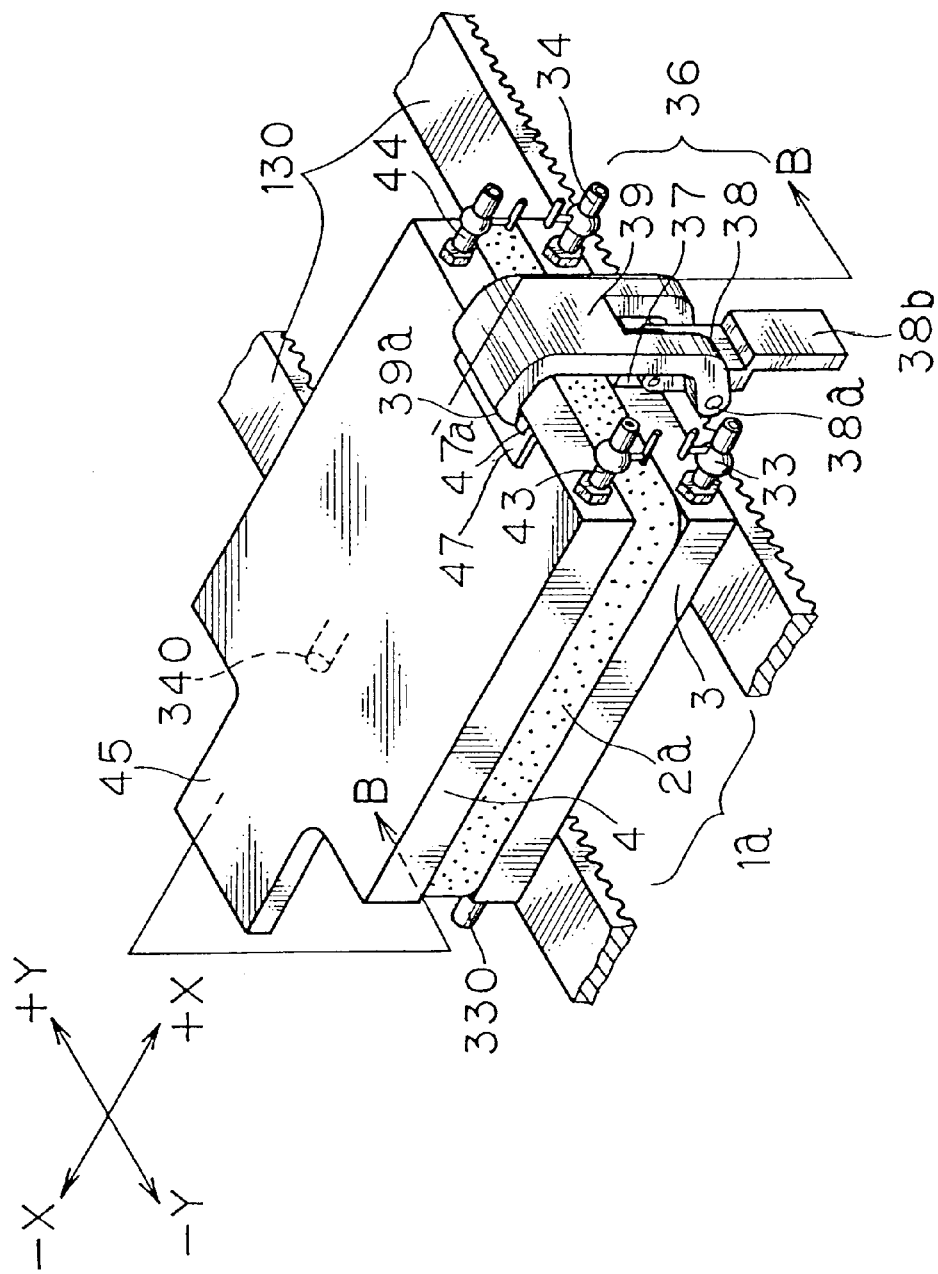
FIG. 19 is a perspective view of the second modified prepackaged food loading container showing a state that the cover is closed.
Figure 20A:
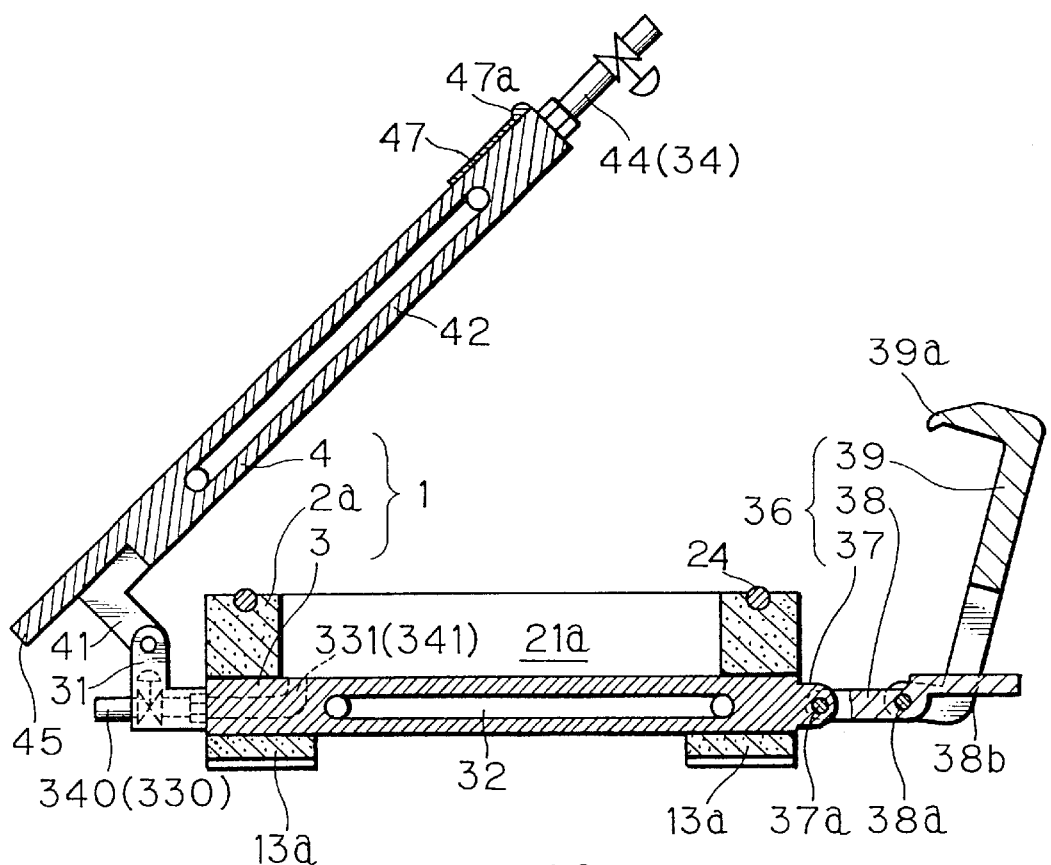
FIGS. 20A and 20B are cross sections taken along the line B—B in FIG. 19, FIG. 20A showing a state that the cover is opened, FIG. 20B showing a state that the cover is closed.
Figure 20B:
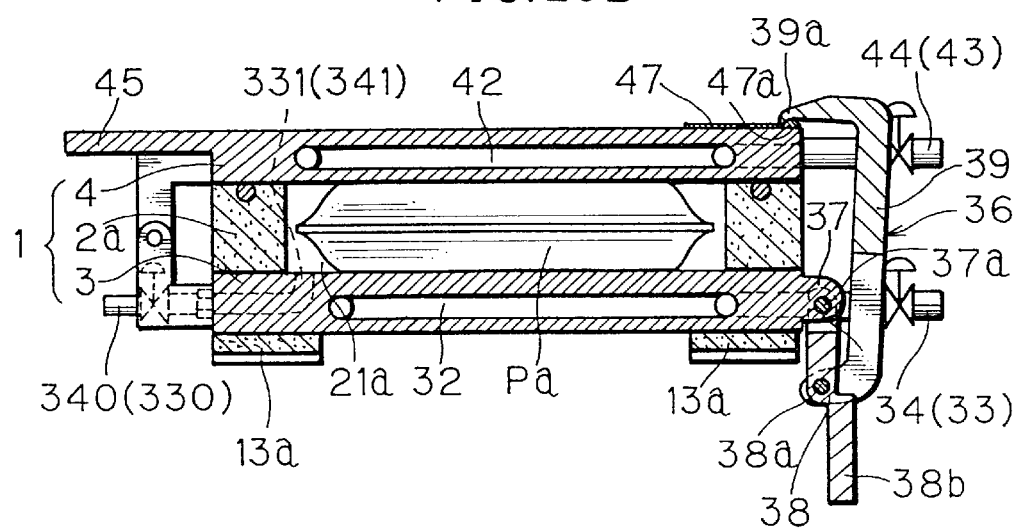

FIGS. 18 and 19 are perspective views of the container as a second modification according to this invention, FIG. 18 showing a state that a cover is opened, and FIG. 19 showing a state that the cover is closed. FIGS. 20A and 20B are cross sections taken along the line B—B in FIG. 19, FIG. 20A showing a state that the cover is opened, and FIG. 20B showing a state that the cover is closed. The directionality of the container in FIGS. 18 and 19 is the same as the description in FIGS. 15 and 16.

The arrangement of the container 1a in the second modification is the same as the container 1 in the first modification except that: a food loading chamber 21a of a container main body 2a in the second modification is not necessarily formed with such an inner shape as to match the three-dimensional configuration of the prepackaged food Pa; a locking means (open restricting means) 36 for holding a closed state by the cover 4 is provided in the second modification; and the container 1a is so designed as to draw a fluid (heated air and cooling water) into the food loading chamber 21.

The food loading chamber 21a of the container main body 2a is not specifically designed to match the three-dimensional shape of a specific prepackaged food, but rather shaped into a rectangular parallelepiped to accommodate a prepackaged food of versatile shape. As an example, a bag-type prepackaged food Pa is shown in FIG. 18.

The locking means 36 is provided at a widthwise right end of a bottom plate 3. The locking means 36 includes a bracket 37 projecting outward from a center on the right end of the bottom plate 3, a pivot tab 38 that pivots about a first horizontal axis 37a while holding the bracket 37 at split two leg portions thereof, and a locking tab 39 that pivots about a second horizontal axis 38a while holding a lead end of the pivot tab 38 at split two leg portions thereof.

An operable tab 38b projecting outward from the pivot tab 38 through a space between the leg portions of the locking tab 39 is provided at a right end of the pivot tab 38. Pressingly operating the operable tab 38b in such a manner as to rotate the pivot tab 38 in a specified direction about the first horizontal axis 37a rotates the locking tab 39 up and down.

An engaging portion 39a curved in counterclockwise direction about the second horizontal axis 38a is formed at a distal end of the locking tab 39. A plate-shape insulator 47 is provided at an upper right end of the cover 4 at a position corresponding to the engaging portion 39a. An engaging projection 47a for engaging with the engaging portion 39a is formed at a lead end of the insulator 47. When the operable tab 38b is rotated clockwise about the first horizontal axis 37a in a state that the cover 4 is closed and the engaging portion 39a is engaged with the engaging projection 47a, a base end of the locking tab 39 is lowered, as shown in FIGS. 19 and 20B, while maintaining the insulated state of the bottom plate 3 and the cover 4 by the insulator 47. Thereby, the closed state of the food loading chamber 21a is locked in a state that the second horizontal axis 38a is set slightly leftward of the first horizontal axis 37a. In this arrangement, even if the inside of the food loading chamber 21 is brought to a high-pressurized state of 1 atm or higher, the sealed state of the food loading chamber 21 is maintained, thus eliminating leakage of a high-pressurized fluid.

On the other hand, when the operating tab 38b is rotated counterclockwise about the first horizontal axis 37a from the closing locked state by the cover 4 shown in FIGS. 19 and 20B, the locking tab 39 is lifted up while releasing the engagement of the engaging portion 39a with the engaging projection 47a to unlock the closed state of the food loading chamber 21a by the cover 4.

When the food loading chamber 21a is set in the lock released state, as shown in FIGS. 18 and 20A, the pivot tab 38 is set in a horizontal posture by a biasing force of an unillustrated bias means, whereas the locking tab 39 is set in a substantially vertical posture by a biasing force of an unillustrated bias means. In this arrangement, the locking means 36 is securely set at a certain position when the food loading chamber 21a is set in a lock released state to facilitate locking operation by the locking means 36.

In this modification, the locking means 36 is so designed as to withstand a high-pressurized state of the food loading chamber 21a even if the inner pressure of the prepackaged food P loaded in the food loading chamber 21a is raised at a level of about 3 kg/cm². This arrangement makes it possible to suppress expansion of the prepackaged food Pa even if the temperature of the prepackaged food Pa is raised at a temperature in the range of 110° C. to 140° C. by dielectric heating.

A fluid drawing connector 330 and a fluid ejecting connector 340 are provided at a widthwise left end of the bottom plate 3. A fluid drawing hole 331 communicating with the fluid drawing connector 330 and a fluid ejecting hole 341 communicating with the fluid ejecting connector 340 are formed in an upper surface of the bottom plate 3 opposite the food loading chamber 21a. In this arrangement, a fluid is drawn in and out of the food loading chamber 21a through the connectors 330, 340 and the holes 331, 341. A valve is provided at the connectors 330, 340. Controlling opening/closing of the valves switchingly connects and disconnects the connectors 330, 340 to and from the food loading chamber 21a.

A pair of timing belts 130 each formed with meshable teeth on the underside surface thereof and extending in the Y direction are provided as a conveyor belt for conveying the prepackaged food loading containers 1a. The timing belts 130 define a transport path for the containers according to this invention. A connecting terminal for application of high frequency is rendered into contact with an exposed part on the bottom plate 3 of the container 1a which is exposed between the belts 130 while conveyed to a certain position over the timing belts 13 to allow the bottom plate 3 to function as one of opposing electrodes.

According to the prepackaged food loading container 1a of the second modification, when the cover 4 is closed and locked by the locking means 36 after the prepackaged food Pa is loaded in the food loading chamber 21a, and the valves of the connectors 330, 340 are closed after a high-pressurized fluid is drawn into the food loading chamber 21a, the inside of the food loading chamber 21a is brought to a sealed state. In this arrangement, even if the temperature of the prepackaged food Pa in the food loading chamber 21a is raised high by dielectric heating, and the inside of the food loading chamber 21a is set in a high-pressurized state, the cover 4 does not pop up. This arrangement eliminates a necessity of providing an electrode pair to pressingly hold the bottom plate 3 and the cover 4 during dielectric heating and simplifies the construction of the unit for dielectric heating.

Further, when a high-pressurized heated air is drawn into the food loading chamber 21a in the sealed state through the fluid drawing connector 330, a peripheral end of the prepackaged food Pa which is hardly rendered into contact with the opposing electrode pair is heated to perform auxiliary heating. Thereby, eliminated is a possibility of uneven heat transmission over the prepackaged food Pa which may cause an incomplete sterilization of the prepackaged food Pa.

Also, after the dielectric heating, cooling water is drawn into the food loading chamber 21a through the fluid drawing connector 330 and drawn out of the food loading chamber 21a through the fluid ejecting connector 340. In this arrangement, cooling of the prepackaged food Pa is quickly performed to lower the temperature thereof to 100° C. or lower in a short time. This arrangement enables to open the cover 4 after the dielectric heating within a short time, which improves heat sterilization efficiency.

Figure 21:
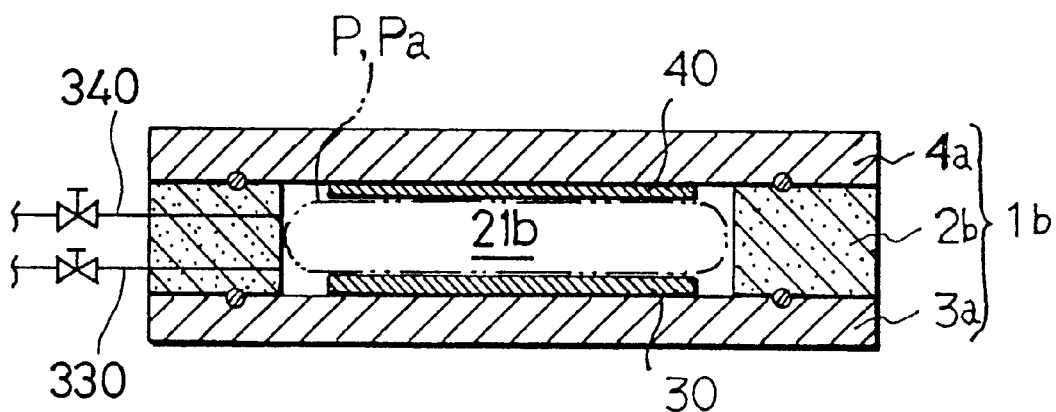
FIG. 21 is a cross section showing essential parts of a prepackaged food loading container as a third modification according to this invention.

FIG. 21 is a cross section showing essential parts of the prepackaged food loading container as a third modification according to this invention. The container 1b of the third modification includes, as shown in FIG. 21, a bottom plate 3a, a container main body 2b, and a cover 4a each made of a synthetic resin, namely, a non-conductive material. A food loading chamber 21b for loading a prepackaged food P (Pa) is defined by the bottom plate 3a, the container main body 2b, and the cover 4a.

A lower electrode 30 for applying a high frequency is mounted on the bottom plate 3a of the food loading chamber 21b, and an upper electrode 40 for applying a high frequency is mounted on the cover 4a of the chamber 21b. When the cover 4a is closed after the prepackaged food P (Pa) is loaded in the chamber 21b, the prepackaged food P (Pa) is held between the electrodes 30, 40. The other arrangement of the container 1b in this modification is the same as the container 1 (1a) of the first (second) modification.

According to the container 1b of the third modification, since almost all parts constituting the container 1b is made of a synthetic resin, the light weight container 1b is obtained.

Figure 22:
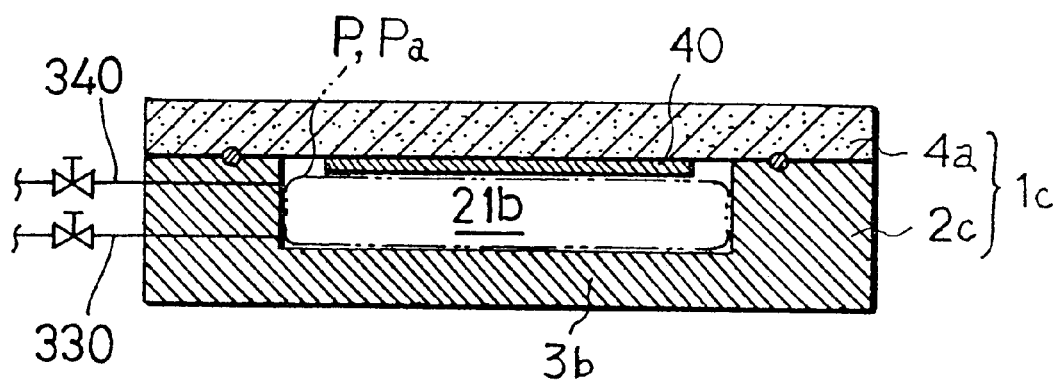
FIG. 22 is a cross section showing essential parts of a prepackaged food loading container as a fourth modification according to this invention.

FIG. 22 is a cross section showing essential parts of the container as a fourth modification according to this invention. The container 1c of the fourth modification is, as shown in FIG. 22, made of a metallic material and formed together with a bottom plate 3b. According to this arrangement, since an inner wall of a container main body 2c itself functions as a lower electrode, a lower electrode 30 shown in the third modification is omitted in this modification. A food loading chamber 21b for loading a prepackaged food P (Pa) is defined by the inner wall of the container main body 2c and a bottom surface of a cover 4a. When the cover 4a is closed after the prepackaged food P (Pa) is loaded in the chamber 21b, the prepackaged food P (Pa) is rendered into contact with an upper electrode 40 and the inner wall of the container main body 2c functioning as the lower electrode. The other arrangement of the container 1c is the same as the container 1 (1a) of the first (second) modification.

According to the container 1c of the fourth modification, a side end of the prepackaged food P (Pa) is rendered into contact with the inner side wall of the container main body 2c functioning as an electrode to heat the side end of the prepackaged food P (Pa) by dielectric heating, which is generally difficult to be heated by dielectric heating. This arrangement is effective in uniformly heating the prepackaged food P (Pa). Also, since the container main body 2c is made of a metallic material, the resistance against high pressure is great, which enables producing a compact container main body 2c, resulting in production cost reduction for the container.

Figure 23:
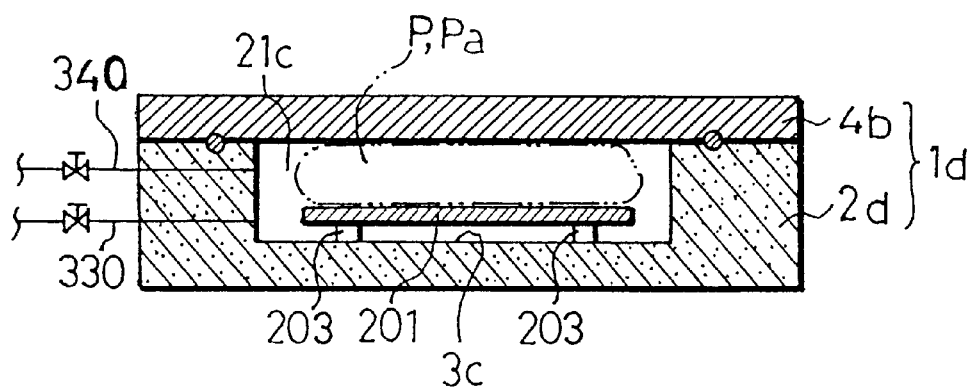
FIG. 23 is a cross section showing essential parts of a prepackaged food loading container as a fifth modification according to this invention.

FIG. 23 is a cross section showing essential parts of the container as a fifth modification according to this invention. The container 1d of the fifth modification is, as shown in FIG. 23, provided with a cover 4b of a metallic material, and accordingly a bottom surface of the cover 4b functions as an upper electrode. On the other hand, a container main body 2d is made of a synthetic resin with a closed bottom and formed with a top opening. A plurality of support members 203 with a vertical length identical to each other are provided on a bottom plate 3c of the container main body 2d. Each support member 203 projects inward in a food loading chamber 21c. A plate-shape lower electrode 201 is supported on top parts of the support members 203.

The support member 203 is, in this modification, made of an elastic member such as a coil spring and a plate spring. Elastic deformation of the support members 203 absorbs a variation of the thickness of a prepackaged food P (Pa) loaded in the chamber 21c, with an upper surface of the prepackaged food P (Pa) coming into close contact with the cover 4b and a bottom surface thereof coming into close contact with an upper surface of the lower electrode 201. The other arrangement of the container 1d is substantially the same as the container 1 (1a) of the first (second) modification.

According to the container 1d of the fifth modification, when the cover 4b is closed after the prepackaged food P (Pa) is loaded in the chamber 21c of the container main body 2d, the mounted state of the prepackaged food P (Pa) in the chamber 21c is stabilized since a variation of the thickness of the prepackaged food P (Pa), even if such variation occurs, is absorbed by the support members 203 made of the elastic member. Further, since the prepackaged food P (Pa) is pressingly held between the cover 4b and the lower electrode 201c, dielectric heating of the prepackaged food P (Pa) is securely performed.

Similar to the prepackaged food loading container 1b of the second modification, it may be preferable to provide a fluid drawing connector 330 and a fluid ejecting connector 340 on an outer wall of the container main body 2d to draw heated air into the chamber 21c through the connector 330 before and during dielectric heating, and then eject the air drawn out of the chamber 21 through the connector 340. In this way, passing the heated air through the chamber 21c promotes heating a side end of the prepackaged food P (Pa), which is difficult to be heated by dielectric heating, to enable uniform heating of the prepackaged food P (Pa).

Figure 24:
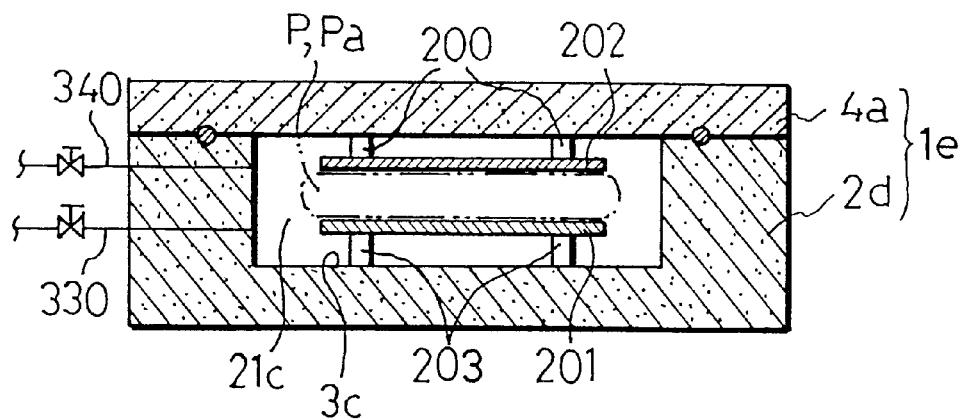
FIG. 24 is a cross section showing essential parts of a prepackaged food loading container as a sixth modification according to this invention.

FIG. 24 is a cross section showing essential parts of the container as a sixth modification according to this invention. The container 1e in the sixth modification includes, as shown in FIG. 24, a cover 4a made of a synthetic resin similar to the third modification (see FIG. 21), and a container main body 2d similar to the fifth modification. Similar to the fifth modification, a lower electrode 201 is provided on the side of a bottom plate 3c of the container main body 2d by way of support members 203, and an upper electrode 202 is provided on the side of a bottom surface of the cover 4a as opposed the lower electrode 201 by way of support members 203. The other arrangement of the sixth modification is substantially the same as the fifth modification.

According to the container 1e of the sixth modification, the container 1e is entirely made of a synthetic resin except the electrodes 201, 202. Accordingly, the light weight container 1e is produced in addition to the operation and effect obtained by the container 1d of the fifth modification. This enables saving power necessary for transporting the containers. Also, since the prepackaged food P (Pa) is held by the electrodes 201, 202 applied with a vertical pressing force, this arrangement can flexibly cope with a variation of the thickness of the prepackaged food P (Pa), which enables heat sterilization of different types of prepackaged foods P (Pa).

According to this arrangement, when performing auxiliary heating or cooling the prepackaged food P (Pa) by introducing a heating medium or a cooling medium into the food loading chamber 21c, the prepackaged food P (Pa) is supportively held by the electrodes 201, 202 away from an inner wall of the food loading chamber 21c, which assures efficient auxiliary heating and cooling.

As stated above, drawing the heating medium and cooling medium into the chamber 21c suffices auxiliary heating and cooling of the prepackaged food P (Pa). This arrangement eliminates a necessity of providing a passage in the cover 4a and the container main body 2d for passing the heating medium or cooling medium, which contributes to cost reduction of the container 1e.

In the sixth modification, the container main body 2d may be made of a metallic material. This alteration improves resistance of the container 1e against high pressure and reduces the production cost of the container, compared to the one made of a synthetic resin with great resistance against high pressure.

Figure 25:
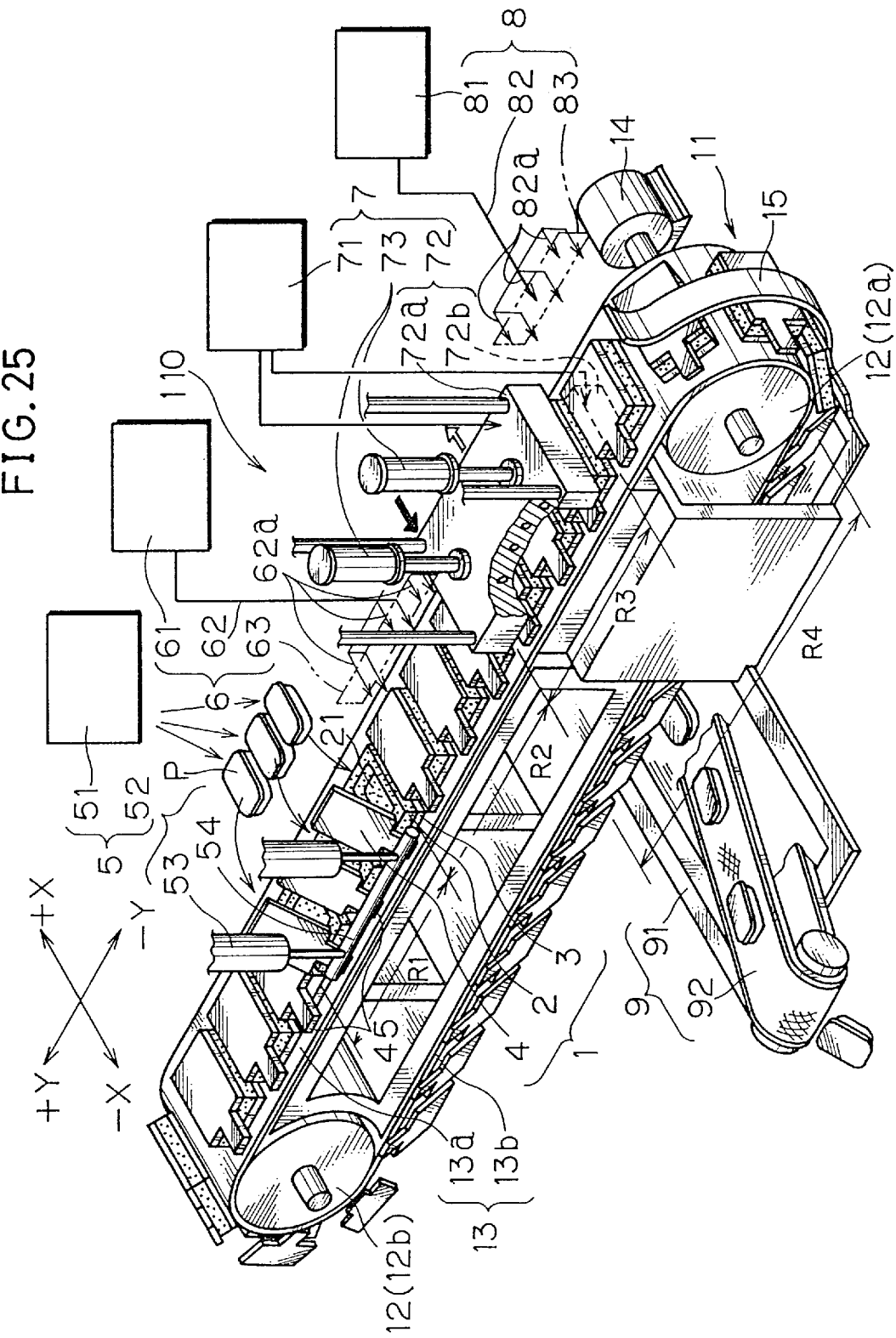
FIG. 25 is a perspective view of a food sterilizing apparatus as a tenth embodiment using the first modified prepackaged food loading container according to this invention.

FIG. 25 is a perspective view showing a food sterilizing apparatus 110 (tenth embodiment) using the container 1 of the first modification. It should be noted that X—X direction in FIG. 25 is widthwise direction of the apparatus, and Y—Y direction is depthwise direction of the apparatus. Particularly, −X direction is leftward direction, and +X direction is rightward direction. −Y direction and +Y direction respectively become forward (downstream) direction and rearward (upstream) direction when referring to a forward belt. On the other hand, −Y direction and +Y direction respectively become upstream direction and downstream direction when referring to a backward belt.

As shown in FIG. 25, the food sterilizing apparatus 110 includes a belt conveyor 11 with a transport plane set horizontal. The belt conveyor 11 is so designed as to transport a plurality of containers 1 in a certain direction, a prepackaged food loading mechanism 5, a preheating mechanism 6, a dielectric heating unit 7, a cooling mechanism 8, and a prepackaged food takeout mechanism 9 in this order along the belt conveyor 11 from upstream to downstream.

The belt conveyor 11 includes a pair of rotary drums 12 disposed opposing each other in the forward and rearward direction of the belt conveyor 11, a conveyor belt 13 mounted between the rotary drums 12, and an electric motor 14 for driving the rotary drum 12. A forward located rotary drum 12a is a drive drum, and a rearward located rotary drum 12b is a driven drum. Rotating the drive drum 12a clockwise about a drive shaft thereof by the electric motor 14 circulatively moves the conveyor belt 13 between the drive drum 12a and the driven drum 12b in clockwise direction.

The belt conveyor 11 includes a belt member made of a synthetic resin with an insignificantly small dielectric loss and high rigidity. In this embodiment, the belt conveyor 11 is made of polytetrafluoroethylene. A plurality of containers 1 are arrayed at the same interval on the transport plane of the belt conveyor 11 with the projecting direction of an operable projecting tab 45 thereof normal to the driving direction of the conveyor belt 13. In this arrangement, when the conveyor belt 13 is driven by the electric motor 14, the containers 1 are moved along the conveyor belt 13 between the rotary drums 12 followed by the movement of the conveyor belt 13.

It should be noted that hereinafter an upper side of the conveyor belt 13 that is moved forward is referred to as a "forward belt 13a", and a lower side thereof that is moved backward is referred to as a "backward belt 13b".

The loading mechanism 5 is provided on the upstream side with respect to transport of the forward belt 13a, and includes a loading device 51 for loading a prepackaged food P into a chamber 21 of the container 1, and a cover drive means 52 for openably closing a cover 4 of the container 1. The loading device 51 includes an unillustrated storage unit for storing a certain number of prepackaged foods P, and a loading actuator for taking out a certain number of prepackaged foods P stored in the storage unit as a group to load the group of prepackaged foods P into the respective chambers 21 of the containers 1. In this embodiment, three prepackaged foods P are loaded in corresponding three containers 1 at one time.

The cover drive means 52 includes a cylinder device 53 each provided with a piston rod projecting downward, and an operable rod 54 connected to the piston rods. The operable rod 54 has such a length as to cover the group of containers 1 arrayed in a row on the forward belt 13a in a state that the operable projecting tabs 45 of the group of containers 1 oppose against the operable rod 54 simultaneously. In this arrangement, when the piston rods are lowered, the operable rod 54 simultaneously presses the operable projecting tabs 45 of the group of containers 1 downward to simultaneously open up the covers 4 thereof, as shown in FIG. 25. On the other hand, by releasing the pressing force against the operable projecting tabs 45 followed by lifting up of the piston rods, the covers 4 are closed.

Driving/suspending drive of the electric motor 14, opening/closing of the covers 4 of the group of containers 1 by driving the cover drive means 52, and loading of the prepackaged foods P into the chambers 21 of the group of containers 1 are performed synchronously at a certain timing. Thereby, when a group of prepackaged foods P reach a certain position at a prepackaged food loading location R1, the group of prepackaged foods P are automatically loaded in the corresponding chambers 21 of the containers 1 simultaneously.

The preheating mechanism 6 includes a hot water source 61 provided with an unillustrated boiler and a delivery pump, a hot water pipe 62 disposed communicable between the hot water source 61 and the group of containers 1 that are moved to a preheating location R2 downstream of the loading location R1, and a connector means 63 provided at a lead end of the hot water pipe 62.

The hot water pipe 62 is branched into six sub pipes 62a at a distal end thereof. Each pair of sub pipes 62a are disposed at such a position as to oppose fluid drawing connectors 33, 43 (see FIG. 17) provided at a bottom plate 3 and the cover 4 of the container 1 respectively when the group of containers 1 are moved to the preheating location R2.

The connector means 63 is for connecting the sub pipes 62a to the corresponding connectors 33, 43. Driving the connector means 63 switchingly connects and disconnects the sub pipes 62a to and from the connectors 33, 43, and controllably opens and closes valves of the connectors 33, 43, 34, 44. In this arrangement, hot water from the hot water source 61 is drawn into a lower fluid passage 32 formed in each of the bottom plates 3 and an upper fluid passage 42 formed in each of the covers 4 to preheat the group of prepackaged foods P loaded in the chambers 21 by way of the bottom plates 3 and the covers 4.

The dielectric heating unit 7 includes a high frequency generator 71, an opposing electrode pair 72 consisting of an upper electrode 72a and a lower electrode 72b to which a high frequency generated from the high frequency generator 71 is applied so as to heat the group of prepackaged foods P loaded in the containers 1, and a cylinder device 73 for moving the upper electrode 72a up and down. The opposing electrode pair 72 is so arranged as to interpose the forward belt 13a therebetween at a position on a heating/cooling location R3 downstream of the preheating location R2 when the group of containers 1 are moved to the heating/cooling location R3. The lower electrode 72b is so arranged as to render an upper surface thereof in contact with the forward belt 13a. In this embodiment, the opposing electrode pair functions as an open restricting means according to this invention.

A group of three prepackaged food loading containers 1 that have been preheated at the pre-heating location R2 are fed to the heating/cooling location R3 by intermittent driving of the electric motor 14. At this time, the upper electrode 72a is lifted up by driving of the cylinder device 73. The group of containers 1 are then pressingly held between the opposing electrode pair 72 by lowering of the upper electrode 72a. In this state, a high frequency from the high frequency generator 71 is applied to the prepackaged foods P in the group of containers 1 by way of the opposing electrode pair 72, the bottom plates 3 and the covers 4 of the containers 1 to perform heat sterilization onto the prepackaged foods P by dielectric heating.

In this embodiment, the pressing force by the upper electrode 72a is controlled to withstand an inner pressure of the prepackaged food P at about 3 kg/cm$^2$ when loaded in the chamber 21 of the container 1. In this arrangement, expansion of the prepackaged food P is suppressed even if the temperature of the prepackaged food P is raised as high in the range of 110 to 140° C. due to dielectric heating.

The cooling mechanism 8 is for cooling the group of prepackaged foods P, after having been completed with heat sterilization by the dielectric heating unit 7 at the heating/cooling location R3, while pressingly holding the group of prepackaged foods P by the upper electrode 72a at the same location. The cooling mechanism 8 includes a cooling water source 81, a cooling water pipe 82 disposed communicable between the cooling water source 81 and the group of containers 1, and a connector means 83 arranged at a distal end of the cooling water pipe 82. The reason for cooling the group of prepackaged foods P at the same location as the dielectric heating was conducted while pressingly holding the prepackaged foods P by the upper electrode 72a is to prevent a problem that the prepackaged food P may be expanded by releasing the pressing force by the upper electrode 72a against the prepackaged food loading container 1 which may result in burst out of a container main body P1 of the prepackaged food P.

The cooling water pipe 82 is branched into six sub pipes 82a at a distal end thereof. Each pair of sub pipes 82a are disposed at such a position as to oppose the fluid drawing connectors 33, 43 (see FIG. 17) provided at the bottom plate 3 and the cover 4 of the container 1 respectively when the group of containers 1 are moved to the heating/cooling location R3.

The connector means 83 is for connecting the sub pipes 82*a* to the corresponding connectors 33, 43. Driving the connector means 83 switchingly connects and disconnects the sub pipes 82*a* to and from the connectors 33, 43, and controllably opens and closes the valves of the connectors 33, 43, 34, 44. In this arrangement, cooling water from the cooling water source 81 is drawn into the lower fluid passage 32 formed in each of the bottom plates 3 and the upper fluid passage 42 formed in each of the covers 4 to be replaced with the water staying in the passages 32, 42 to cool the prepackaged foods P in the chambers 21 by way of the bottom plates 3 and the covers 4.

The above cooling operation is continued until the temperature of the prepackaged foods P is lowered from about 130° C. to 100° C. or below. When the temperature of the prepackaged foods P is lowered to 100° C. or below, holding of the prepackaged food P by the upper electrode 72*a* is released, and the group of containers 1 are fed to the take-out mechanism 9 by driving of the electric motor 14. A guide cover 15 with a certain portion in parallel with the transport plane of the conveyor belt 13 is disposed above the conveyor belt 13 with a certain distance. The guide cover 15 has a certain length covering an outer circumference area of the drive drum 12*a* up to the take-out mechanism 9 for preventing the cover 4 from opening up even when the prepackaged food loading container 1 is being fed upside down from the forward belt 13*a* to the backward belt 13*b*.

The prepackage d food take-out mechanism 9 is for taking out the prepackaged food P that has been cooled by the cooling mechanism 8 from the container 1 and immersing the prepackaged food P in water for cooling. The take-out mechanism 9 includes a cooling bath 91 disposed at a certain position at a take-out location R4 below the backward belt 13*b*, and a discharge belt 92 with a certain portion thereof immersed in the cooling water filled in the cooling bath 91. The discharge belt 92 circulates in and out of the cooling water in the cooling bath 91 by dving of an unillustrated drive means. In this arrangement, the prepackaged food P that has been immersed in the cooling water in the cooling bath 91 is emerged out of the cooling bath 91 and discharged outside.

A heating medium shown by the solid black arrow in FIG. 25 may be preferably drawn into t he upper electrode 72*a* and the lower electrode 72*b*, and discharged out therefrom as shown by the blank arrow. In this arrangement, the upper electrode 72*a* and the lower electrode 72*b* are heated to promote heating of the group of prepackaged foods P in the containers 1 in addition to dielectric heating in order to improve the sterilizing efficiency. Also, a heating medium may be introduced into the upper electrode 72*a* and the lower electrode 72*b* during dielectric heating, and then a cooling medium may be introduced into the upper electrode 72*a* and the lower electrode 72*b* upon completion of the dielectric heating. Thereby, the group of prepackaged foods P after sterlization are rapidly cooled to prevent a problem that the prepackaged food P is exposed to a temperature state that may induce growth of bacteria for a long time.

The upper electrode 72*a* may be divided into three sections to individually supply a high frequency power to the group of three prepackaged foods P from compact high frequency generating devices. In this arrangement, the group of prepackaged foods P disposed between the opposing electrode pair 20*a* may be uniformly applied with a high frequency power.

FIG. 26 is a block diagram showing an example of a control system of the food sterilizing apparatus 110. As shown in this drawing, the control system 700 includes a control means 710 for centrally controlling an operation of the apparatus 110, and an operating unit 120 for operating the dielectric heating unit 7 and the apparatus 110.

The control means 710 controls power supply to a high frequency generator 71 of the dielectric heating unit 7 based on operation data inputted by way of the operating unit 120, and is designed to output a certain control signal to the loading mechanism 5, the preheating mechanism 6, and the cooling mechanism 8 to control driving thereof.

The operating unit 120 has an operation button section 123 provided with a start-up button 121, a stop button 122, etc., as well as a data enter key 124 for inputting various data such as the kind and volume of the prepackaged food P, the cycle for intermittently driving the electric motor 14, and the cycle for operating the loading mechanism 5 and the preheating mechanism 6.

An operation signal from the start-up button 121 and the stop button 122 is outputted to the control means 710 as a control signal via the control means 710. When the start-up button 121 is operated, driving of the high frequency generator 71 starts, as well as initiating driving/operation of the electric motor 14, the loading mechanism 5, the preheating mechanism 6, the cooling mechanism 8, and the prepackaged food take-out mechanism 9. On the other hand, when the stop button 122 is operated, the driving of the high frequency generator 71 is suspended, and the driving of the various parts including the electric motor 14 is suspended.

The high frequency generator 71 includes a power circuit 71*a*, a high frequency generating circuit 71*b* for generating a high frequency upon power supply from the power circuit 71*a*, and a rectifying circuit 71*c* provided downstream of the circuit 71*b*. The power circuit 71*a* is for transforming a power of e.g., 220V for commercial use to a direct current power of a predetermined level. The circuit 71*b* is of a self-oscillating type which generates a high frequency energy of a desired level upon supply of a DC voltage of the predetermined level from the power circuit 71*a*. The high frequency generating circuit 71*b* may be of an enforced oscillating type. The rectifying circuit 71*c* is a circuit for rectifying a current balance between the circuit 71*b* and a current passing through a load (prepackaged food P) disposed between the opposing electrode pair 20, and includes a transformer 71*d* and an unillustrated capacitor for rectification. A coil, or a capacitor and a coil may be used for rectification, in place of the capacitor.

The control means 710 is programmed to compute a desired power supply level that is obtained in advance based on experiments conducted under various conditions of differentiated kind, volume and thickness of the prepackaged food P. The computation is executed based on data inputted through the data enter key 124. An output power from the power circuit 71*a* is set based on a computation result of the inputted data The electric motor 14 is driven at a certain time interval based on a control signal from the control means 710. Thereby, the conveyor belt 13 circulates intermittently in such a manner that the conveyor belt 13 moves by a distance corresponding to a group of three prepackaged foods loading containers 1 by one feeding operation. In this arrangement, each time when the conveyor belt 13 moves, the group of containers 1 that have been set at the loading location R1 are fed to the preheating location R2, the preceding group of containers 1 that have been located at the preheating location R2 are fed to the heating/cooling location R3. In this way, each group of containers 1 are moved to the next downstream operating location R2 (R3).

During the movement of the conveyor belt 13, the loading mechanism 5, the preheating mechanism 6, and the cooling mechanism 8 are set in a stand-by mode. Namely, these mechanism 5, 6, 8 stay still relative to the group of containers 1, and the upper electrode 72a of the dielectric heating unit 7 is raised to allow the containers 1 to pass between the opposing electrode pair 72. On the other hand, when the movement of the conveyor belt 13 is suspended, the loading mechanism 5, the preheating mechanism 6, and the cooling mechanism 8 are driven to perform a certain operation to the group of containers 1, and the dielectric heating unit 7 performs heating operation to the prepackaged foods P in the group of loading containers 1 by driving the high frequency generator 71 while the group of containers 1 are pressingly held between the opposing electrode pair 72 by lowering of the upper electrode 72a. The discharge belt 92 of the take-out mechanism 9 is controlled to constantly drive during an ON-state of the start-up button 121.

Figure 27A:
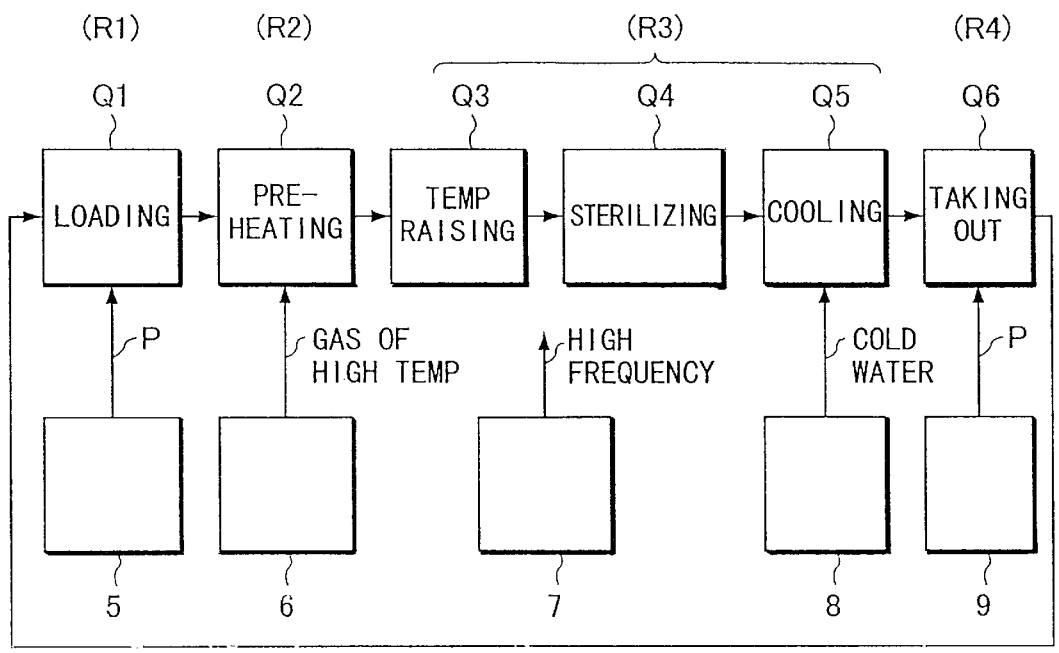
FIGS. 27A and 27B are diagrams showing a sequence of heat sterilization conducted by the tenth food sterilizing apparatus, FIG. 27A showing the sequence of steps, FIG. 27B being a graph showing a relation between the temperature of the prepackaged food in each step from preheating to cooling and time.
Figure 27B:
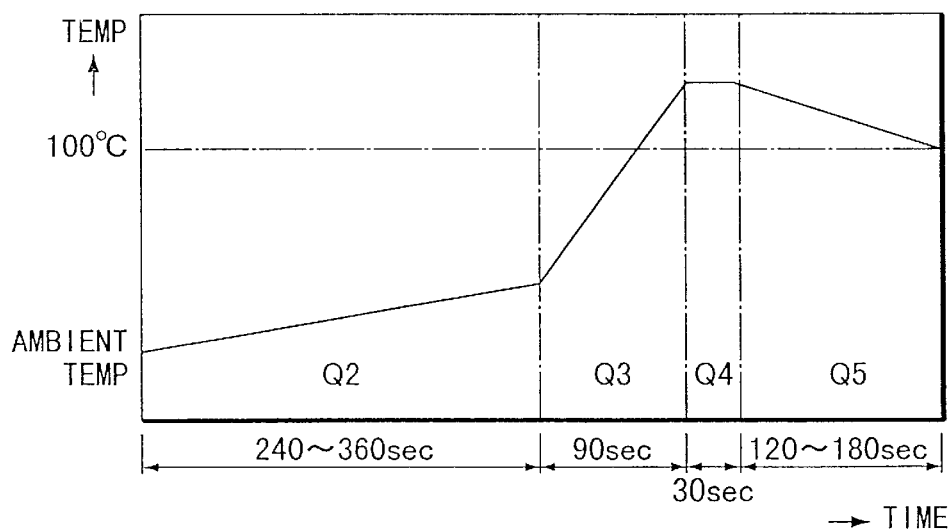

FIGS. 27A and 27B are diagrams showing a sequence of heat sterilization performed by the tenth food sterilizing apparatus 110 using the first modified prepackaged food P, FIG. 27A showing the sequence of steps, and FIG. 27B being a graph showing a relation between the temperature of the prepackaged food P in each step from a preheating step Q2 to a cooling step Q5 and time. As shown in FIG. 27A, the food sterilizing apparatus 110 is operated to sequentially perform a loading step Q1 of loading the prepackaged food P in the chamber 21 of the container 1, the preheating step Q2 of preheating (auxiliary heating) the container 1 in which the prepackaged food P is loaded, a temperature raising step Q3 of raising the temperature of the preheated prepackaged food P, a sterilizing step Q4 of sterilizing the prepackaged food P by maintaining the temperature of the prepackaged food P that has been raised at a certain point in the temperature raising step Q3, the cooling step Q5 of cooling the sterilized prepackaged food P, and a take-out process Q6 of taking out the cooled prepackaged food P from the food loading chamber 21.

The loading step Q1 is performed when the prepackaged food P is moved at the loading location R1 of the apparatus 110, the preheating step Q2 is performed when the prepackaged food P is moved to the preheating location R2, the temperature raising step Q3, the sterilizing step Q4 and the cooling step Q5 are performed when the prepackaged food P is moved to the heating/cooling location R3, and the take-out step Q6 is performed when the prepackaged food P is moved to the takeout location R4.

Hereafter, each step is described with reference to an arbitrary one of the containers 1 that are intermittently moved over the conveyor belt 13. When the container 1 reaches the loading location R1, the loading step Q1 is executed. Specfically, the operable rod 54 is lowered by driving of the cylinder devices 53. Then, the operable projecting tab 45 of the container 1 that stays still at the loading location R1 is pressed downward to open up the cover 4 thereof. Next, driving the loading device 51 enables the prepackaged food P to be loaded into the chamber 21. After the loading, the operable rod 54 is raised by driving the cylinder devices 53. Then, the cover 4 is closed to set the food loading chamber 21 in a closed state.

Next, driving of the conveyor belt 13 moves the container 1 to the preheating location R2 downstream of the loading location R1. Thereupon, driving of the conveyor belt 13 is suspended, and the connector means 63 is operated to communicate the hot water sub pipes 62a with the fluid drawing connectors 33, 43 (see FIG. 17) of the bottom plate 3 and the cover 4 of the container 1 that stays still at the preheating location R2.

In this state, hot water from the hot water source 61 is supplied to the fluid passages 32, 42 of the bottom plate 3 and the cover 4 and discharged out of the pipe system through the opened fluid ejecting connectors 34, 44. Passing of the hot water preheats the prepackaged food P in the chamber 21 by way of the bottom plate 3 and the cover 4. The preheating step Q2, as shown in FIG. 27B, raises the temperature of the prepackaged food P from an ambient temperature up to about 40° C. The preheating time in the preheating step Q2 lasts for about 240 to 360 seconds.

Next, upon completion of the preheating by the preheating step Q2, the container 1 is moved to the heating/cooling location R3 by driving the conveyor belt 13. Then, suspending drive of the conveyor belt 13 and lowering the upper electrode 72a by driving the cylinder devices 73 that are executed simultaneously pressingly holds the container 1 between the opposing electrode pair 72. In this state, performed is the temperature raising step Q3 where the temperature of the prepackaged food P is raised up to about 130° C. by driving the high frequency generator 71, and then, the sterilizing step Q4 for maintaining the temperature at about 130° C. is performed. The process time in the temperature raising step Q3 lasts for about 90 seconds, and the process time in the sterilizing step Q4 lasts for about 30 seconds.

Since the process time required for sterilization varies depending on the output of the high frequency generator 71, the weight of the prepackaged food, and the sterilizing temperature, it is required to set the sterilizing process time in advance considering these parameters. For instance, in the case where a normal prepackaged food is to be sterilized, an experiment proved that a complete sterilization is enabled within several seconds, which is remarkably shorter compared with the above sterilizing process time (30 seconds) if the sterilizing temperature is set as high as about 140° C., 10° C. higher than 130° C.

In the latter half of the temperature raising step Q3 and in the sterilizing step Q4, the prepackaged food P in the chamber 21 is heated as high as 100° C. or higher. At this time, however, the prepackaged food P is pressingly held by the opposing electrode pair 72, and the inner wall of the chamber 21 is kept in close contact state with the outer surface of the prepackaged food P. Accordingly, the boiling point of water inside the prepackaged food P is raised, and prevented is water boiling and burst-out of the prepackaged food P.

Next, upon completion of the sterilization at the temperature raising step Q3, the cooling step Q5 is performed onto the prepackaged food P that is still pressingly held by the opposing electrode pair 72. In this step, first, driving the connector means 83 connects the cooling water sub pipes 82a to the fluid drawing connectors 33, 43. Then, the cooling water from the cooling water source 81 is drawn into the fluid passages 32, 42. Thereby, the temperature of the prepackaged food P in the chamber 21 is lowered to a point slightly lower than 100° C. due to supply of the cooling water by way of the bottom plate 3 and the cover 4. The process time in the cooling step Q5 lasts for about 120 to 180 seconds.

Next, upon completion of the cooling in the cooling step Q5, simultaneous driving of the cylinder devices 53 to lift up the upper electrode 72a and driving of the conveyor belt 13 allows the container 1 to move onto the back side of the conveyor belt 13, namely, from the forward belt 13a to the backward belt 13b. Then, intermittent driving of the conveyor belt 13 eventually releases the container 1 from the holding control by the guide cover 15 (see FIG. 25) when the container 1 is moved to the takeout location R4. Then, the cover 4 of the container 1 is opened up by the weight thereof to release the prepackaged food P loaded in the chamber 21 into the water filled in the cooling bath 91. Then, the discharged prepackaged food P is immersed in the water in the cooling bath 91 to lower the temperature thereof to a substantially ambient temperature, and carried out of the discharge belt 92. The empty container 1 is then returned to the loading location R1 by circulation of the conveyor belt 13.

In this way, according to the first modification of the food sterilizing apparatus 110, intermittent transport of the container 1 by intermittent driving of the conveyor belt 13 enables to automatically and sequentially execute the followings in the order named: loading the prepackaged food P into the container 1 in the loading step Q1; raising the temperature thereof up to a preheat temperature in the preheating step Q2; raising the temperature thereof up to a sterilizing temperature in the temperature raising step Q3; sterilizing the prepackaged food P in the sterilizing step Q4; lowering the temperature thereof to 100° C. or lower in the cooling step Q5; and taking out the prepackaged food P that has been cooled down to the substantially ambient temperature in the take-out step Q6. This is effective in improving sterilizing efficiency of the prepackaged food P.

Figure 28:
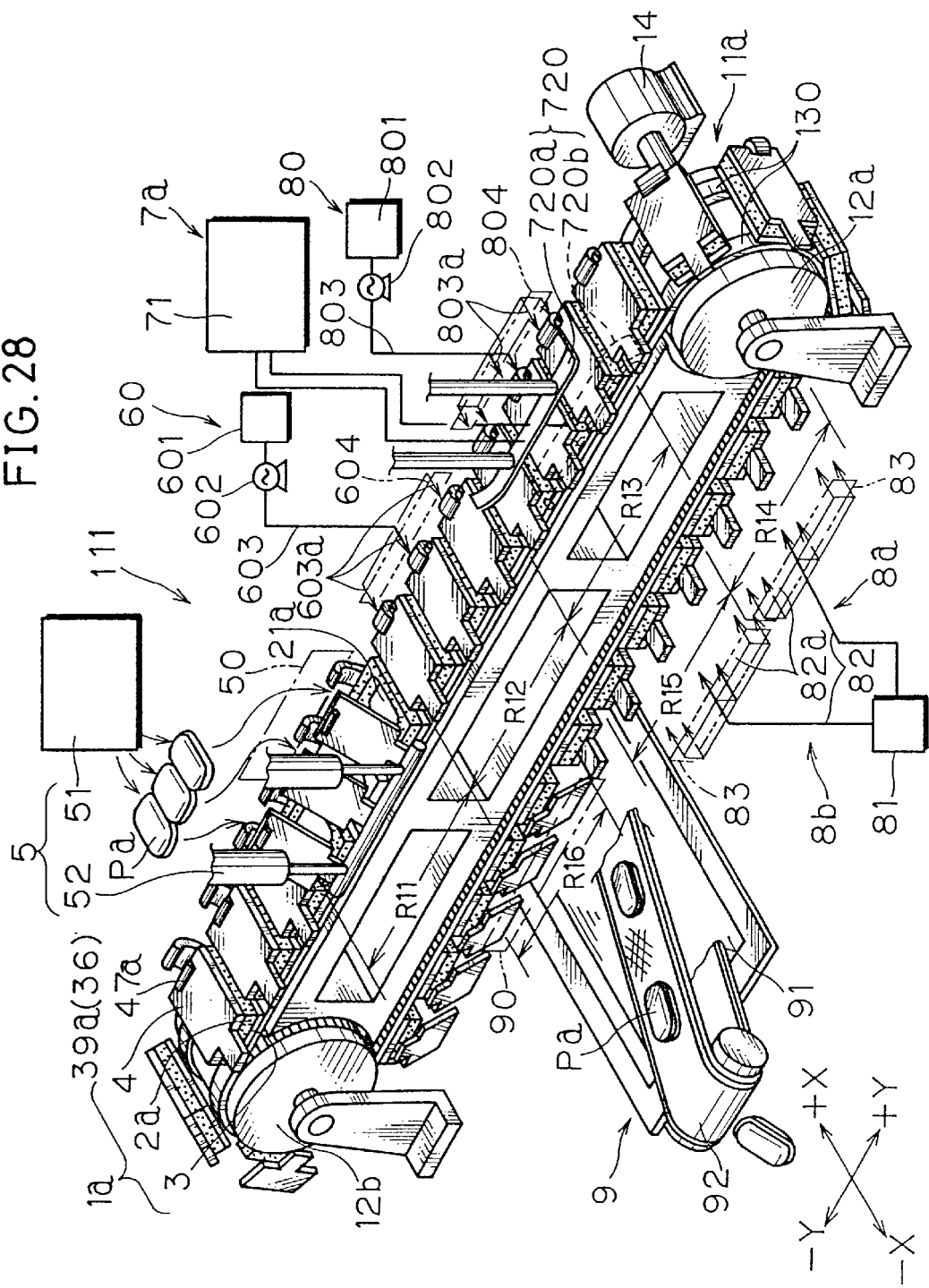
FIG. 28 is a perspective view of a food sterilizing apparatus as an eleventh embodiment using the second modified prepackaged food loading container.

FIG. 28 is a perspective view showing a food sterilizing apparatus 111 (eleventh embodiment) using the container 1a of the second modification. It should be noted that X—X direction in FIG. 28 is widthwise direction of the apparatus, and Y—Y direction is depthwise direction of the apparatus. Particularly, -X direction is leftward direction, and +X direction is rightward direction. -Y direction and +Y direction respectively become forward (downstream) direction and rearward (upstream) direction when referring to a forward belt. On the other hand, -Y direction and +Y direction respectively become upstream direction and downstream direction when referring to a backward belt.

In the eleventh embodiment, the container 1a provided with a cover lock mechanism of locking the closed state by the cover 4 is adopted. In this construction, since the closed state by the cover 4 is secured in a state that the prepackaged food Pa is loaded in the container 1a, there is no need of providing an arrangement of pressingly holding the cover 4 in order to prevent open-up of the cover 4 during dielectric heating. Accordingly, simplified is the construction of applying a high frequency to the prepackaged food Pa by a dielectric heating unit 7a, although the cover locking/unlocking mechanism for the container 1a is provided. Further, since the inside of the chamber 21 of the container 1 is brought to a sealably closed state by the cover locking mechanism, high-pressure heated air for preheating can be introduced into the chamber 21.

In this embodiment, a belt conveyor (container moving means) 11a for circulating the containers 1a includes, as shown in FIG. 28, a pair of timing belts 130 each mounted between the drive drum 12a and the driven drum 12b provided side by side in the widthwise direction of the drum. Providing the pair of timing belts 13 in the widthwise direction of the drum allows a certain bottom portion of the bottom plate 3 of the container 1a to be exposed outward between the timing belts 130 to render the exposed portion in contact with a lower terminal for high frequency application which is described below.

A loading/locking location R11, a pressurizing/preheating location R12, and a dielectric heating location R13 are provided at a certain position on a forward belt 130a of the timing belt pair 130, each with a certain length corresponding to a group of three containers 1a in this order from upstream side. A first cooling location R14, a second cooling location R15, and a take-out location R16 are provided at a certain position on a backward belt 130b of the timing belt pair 130, each with a certain length corresponding to the group of containers 1a in this order from upstream side.

A prepackaged food loading mechanism 5 similar to the tenth embodiment is provided at the loading/locking location R11, and in addition, a locking mechanism 50 for locking a closed state by the cover 4 is provided at the loading/locking location R11. After the prepackaged food Pa is loaded in the chamber 21 of the container 1a by the loading mechanism 5 and the cover 4 is closed, the locking mechanism 50 performs a predetermined operation to lock the closed state of the container 1a by the cover 4. Specifically, the operable tab 38b (see FIG. 20A) of the locking means 36 set in a horizontal posture is first rotated counterclockwise about the first horizontal axis 37a to temporarily allow the engaging portion 39a of the locking tab 39 to cross over the engaging projection 47a of the cover 4, and then rotating the operable tab 38b clockwise engages the engaging portion 39a with the engaging projection 47a.

A pressurizing/preheating mechanism 60 is provided at the pressurizing/preheating location R12 for supplying heated air into the chamber 21 where the prepackaged food Pa is sealably loaded. The pressurizing/preheating mechanism 60 includes a heater 601 for heating the atmospheric air to hot air, a compressor 602 for pressurizing the heated air at about 3 atm to blow the pressurized heated air, a heated air pipe 603 branched into three sub pipes 603a at a downstream end thereof corresponding to three containers 1a, and a connector means 604 provided near the sub pipes 603a.

The connector means 604 is operated to connect the sub pipes 603a with the respective fluid drawing connectors 330 of the group of containers 1a in such a way as to open and close the communication by way of the valves, and connect the sub pipes 603a with the respective fluid ejecting connectors 340 of the group of containers 1a in such a way as to open and close the communication by way of the valves. In this arrangement, the pressurized heated air from the compressor 602 is drawn into the chambers 21 of the group of containers 1a to directly preheat the prepackaged foods Pa through communication of the pressurized heated air.

Upon completion of the preheating, the connector means 604 is operated to close the fluid drawing connectors 330 and the fluid ejecting connectors 340. Thereby, the pressurized heated air sealably stays in the chambers 21.

A dielectric heating unit 7a and an external heating mechanism 80 are provided at the dielectric heating location R13. The dielectric heating unit 7a includes a high frequency generator 71, an upper terminal 720a (functioning as an upper electrode) for transmitting the high frequency generated from the high frequency generator 71 to the covers 4 of the group of containers 1a, and a lower terminal 720b (functioning as a lower electrode) for transmitting the high frequency to the bottom plates 3 of the group of containers 1a. The upper terminal 720a has an elongated shape with a certain length extending in the circulating direction of the timing belts 130 and is rendered into contact with the covers 3 of the group of containers 1a that have been moved to the dielectric heating location R13. Likewise, the lower terminal 720b is provided between the timing belts 130 at a position vertically opposing the upper terminal 720a and rendered into contact with the bottom plates 3 of the group of containers 1a that have been moved to the dielectric heating location R13.

In this arrangement, when the group of containers 1 that have reached the dielectric heating location R13 by circulation of the timing belts 130, they are held by the upper terminal 720a and the lower terminal 720b. Thereby, the prepackaged foods Pa in the respective containers 1a are subject to dielectric heating by way of the bottom plates 3 and the covers 4.

The external heating mechanism 80 includes a boiler 801 for generating steam by heating water, a pump 802 for ejecting steam from the boiler 801, a steam pipe 803 for drawing the steam from the pump 801 into the bottom plates 3 and the covers 4 of the group of containers 1a transported at the dielectric heating location R13 by way of six sub pipes 803a branched at a downstream end thereof, and a connector means 804 provided at a downstream end of the sub pipes 803a.

The connector means 804 is operated to connect each pair of sub pipes 803a to the corresponding fluid drawing connector 330 and the fluid ejecting connector 340 to open the valve thereof. Thereby, heated steam from the steam pipe 803 is drawn into the chambers 21 of the group of containers 1a. Upon completion of heat sterilization at the dielectric heating location R13, the connector means 804 is operated to close the valve thereof to disconnect the steam pipe 803 with the fluid drawing connectors 330 and the fluid ejecting connectors 340.

An upstream cooling mechanism 8a similar to the cooling mechanism 8 of the tenth embodiment including a cooling water source 81, a cooling water pipe 82, cooling water sub pipes 82a, and a connector means 83 is provided at the first cooling location R14. A downstream cooling mechanism 8b similar to the upstream cooling mechanism 8a is provided at the second cooling location R15. These cooling mechanisms 8a, 8b are for supplying cooling water from the cooling water source 81 into the chambers 21 of the group of containers 1a to directly cool the prepackaged foods Pa therein. Arranging the cooling mechanisms 8a, 8b in series manner enables obtaining a desired cooling effect even if the interval of intermittent transport of the group of containers 1 is shortened. The cooling water source 81 is commonly used for the upstream cooling mechanism 8a and the downstream cooling mechanism 8b in this embodiment.

In this arrangement, when the group of containers 1a are transported at the dielectric heating location R13, heat sterilization is performed by the dielectric heating unit 7a. Next, when the group of containers 1a reach the first cooling location R14 by intermittent driving of the timing belts 130, they are subjected to a first stage of cooling where the temperature thereof is lowered to an intermediate cooling temperature (temperature slightly higher than 100° C.) by supply of cooling water into the chambers 21a by the upstream cooling mechanism 8a. Then, when the group of containers 1a reach the second cooling location R15 by circulation of the timing belts 130, they are subjected to a second stage of cooling where the temperature thereof is lowered to 100° C. or below.

A lock release mechanism 90 and a prepackaged food take-out mechanism 9 including a cooling bath 91 and a discharge belt 92 similar to the eleventh embodiment are provided at the take-out location R16. The lock release mechanism 90 is for releasing a locked state of the cover 4, and performs a predetermined operation to the covers 4 of the group of containers 1a that have moved to the second cooling location R15. Specifically, the operable tab 38b of the locking means 36 that is set in a horizontal posture (see FIG. 20B) is rotated counterclockwise to unlock the engagement of the engaging portion 39a of the locking tab 39 with the engaging projection 47a of the cover 4. Thereby, the cover 4 of the container 1a loaded with the prepackaged food Pa is opened up by the weight thereof to let the loaded prepackaged food Pa fall down.

Then, the discharged prepackaged food Pa is immersed into cooling water filled in the cooling bath 91 one after another to perform a final stage of cooling where the temperature thereof is lowered down to a substantially ambient temperature, and discharged out of the apparatus by driving of the discharge belt 92. The empty container 1a is returned to the loading/locking location R11 by a circulative movement of the timing belts 130.

Figure 29:
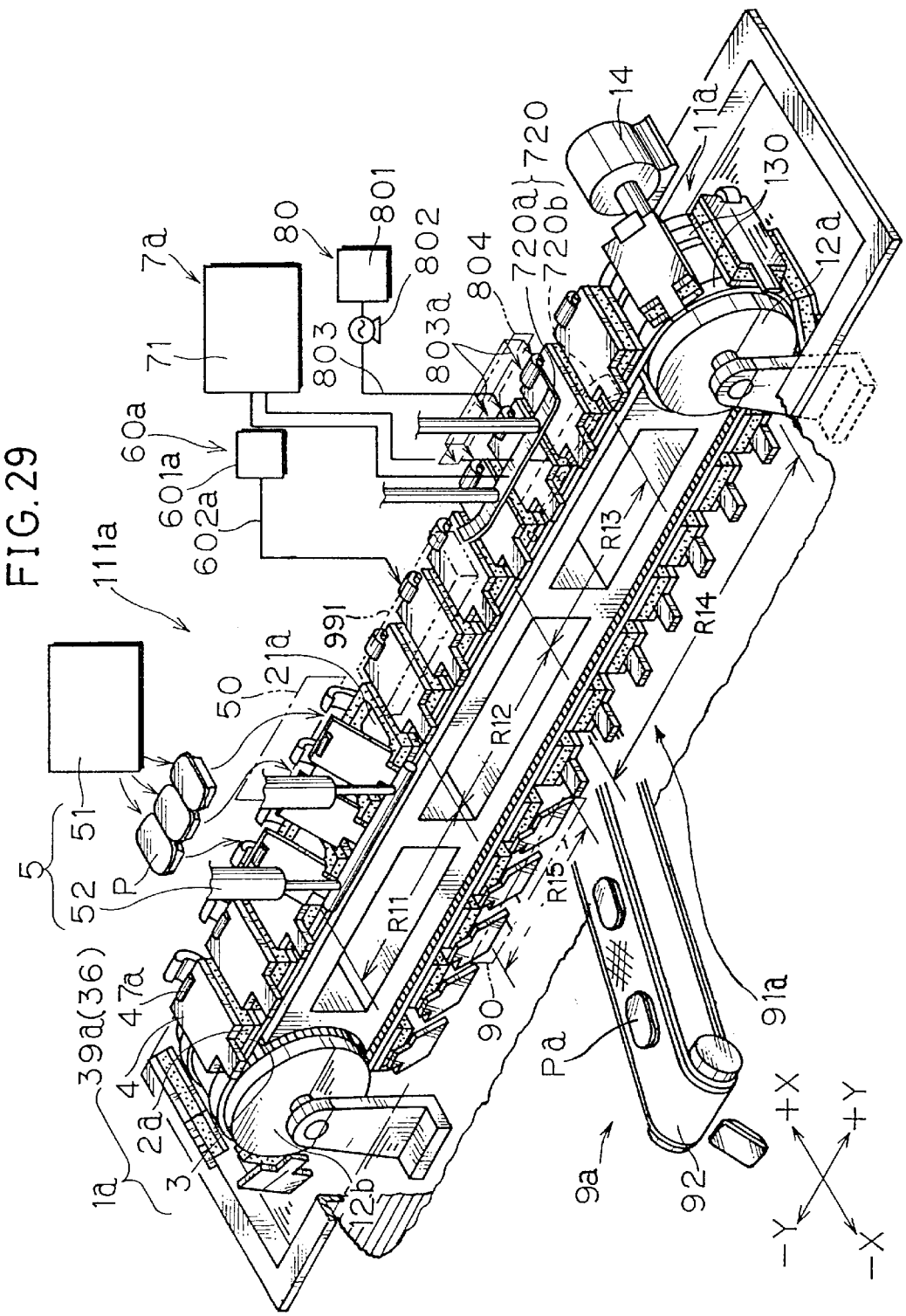
FIG. 29 is a partially cutaway perspective view showing an alteration of the eleventh food sterilizing apparatus.

FIG. 29 is a perspective view showing an alteration of the eleventh food sterilizing apparatus 111 (food sterilizing apparatus 111a). The altered food sterilizing apparatus 111a is for sterilizing the tray-type prepackaged food P instead of the bag-type prepackaged food Pa. In this modification, adopted is a heating medium generating mechanism 60a having a steam boiler 601a in place of the pressurizing/preheating mechanism 60. A heat exchange plate 991 is provided at such a position as to come into contact with the covers 4 of a group of three containers 1a that have moved to a preheating location R12'. Steam from the steam boiler 601a is designed to draw into the heat exchanger plate 991 by way of a steam pipe 602a. Thereby, prior to dielectric heating at a dielectric heating location R13, the prepackaged foods P in the group of containers 1a are preheated.

A prepackaged food take-out mechanism 9a includes a cooling pool 91a having such a size as to immerse a lower half part of timing belt pair 130 in water filled therein. The container 1a is, after dielectric heating at the dielectric heating location R13, is immersed in cooling water filled in the cooling pool 91a by a circulative movement of the timing belt pair 130. After the cooling, the container la has the cover 4 opened up by a lock releasing mechanism 90 when moved to a take-out position R15' and is discharged out of the apparatus by driving of a discharge belt 92. The other arrangement is the same as the apparatus 111 of the eleventh embodiment.

According to the altered apparatus 111a, it is possible to preheat the prepackaged foods P in the containers 1a by the heat exchange plate 991 prior to dielectric heating. Thereby, sterilizing efficiency is improved. In addition, the container 1a after the dielectric heating is immersed in water for cooling, which improves cooling efficiency. Consequently, sterilizing efficiency as a whole is improved.

Figure 30:
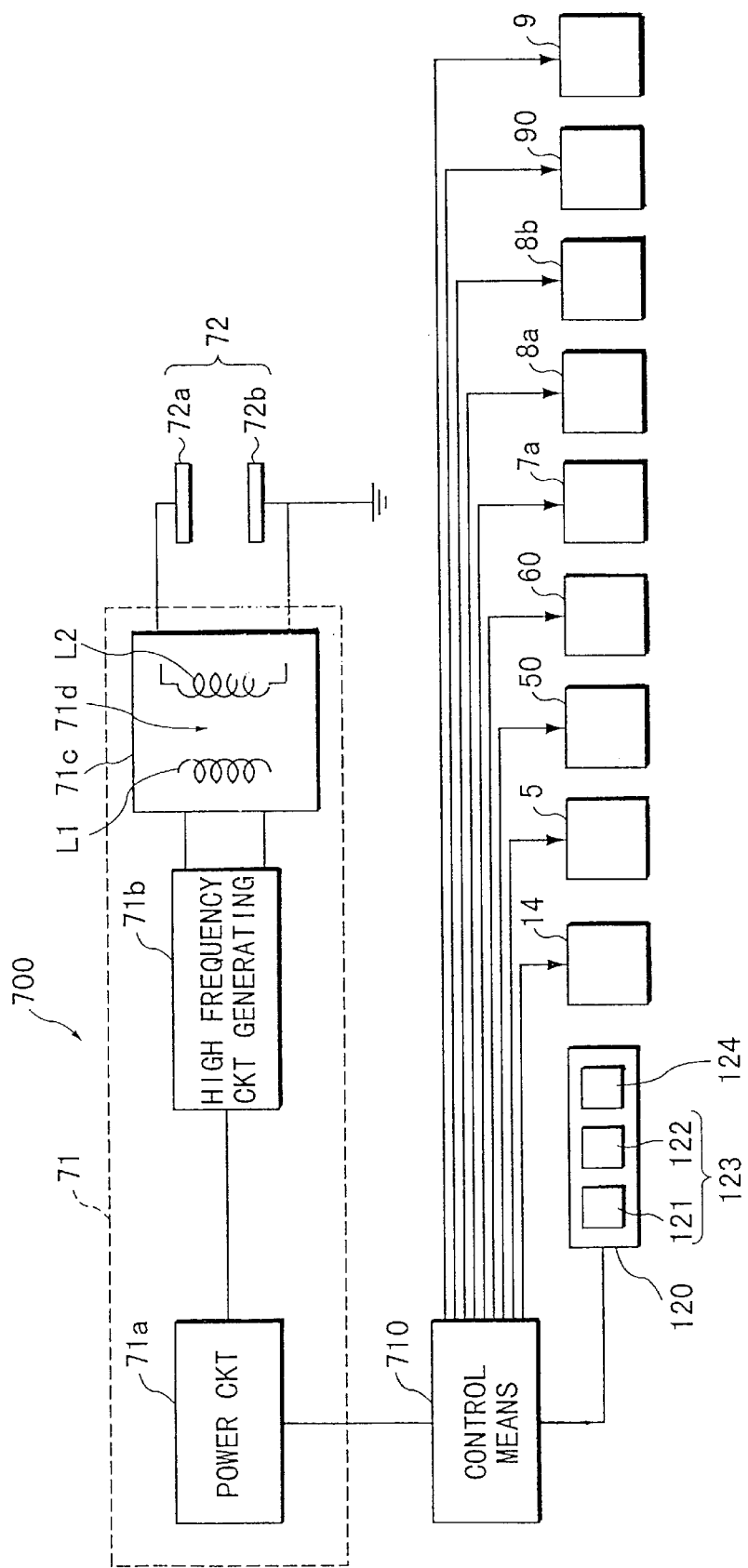
FIG. 30 is a block diagram showing an example of the control system of the eleventh food sterilizing apparatus.

FIG. 30 is a block diagram showing an example of a control system of the apparatus 111 as the eleventh embodiment. As shown in this drawing, the control system of the apparatus 111 is similar to that of the apparatus 110 of the tenth embodiment shown in FIG. 26 except that the container 1 in the tenth embodiment is not provided with a locking means 36. Accordingly, a control operation concerning to the locking means 36 is not provided in the tenth embodiment. On other hand, in the latter embodiment (eleventh embodiment), the locking means 36 is provided for the container 1a. Accordingly, the latter embodiment is different from the former embodiment (tenth embodiment)

in that control relating to a locking/unlocking operation of the locking means 36 is effected.

In the eleventh embodiment, a high frequency is applied to the container 1*a* by way of the upper terminal 720*a* that is not moved up and down and the lower terminal 720*b*. Accordingly, control concerning to up/down movement of the upper electrode 72*a*, as performed in the tenth embodiment, is not implemented.

A control signal for intermittently driving the electric motor 14 at a certain interval is outputted from a control means 710. Intermittent driving of the timing belt pair 130 based on the control signal intermittently transports a group of containers 11. Respective predetermined control signals are outputted from the control means 710 to the loading mechanism 5, the locking mechanism 50, the pressurizing/preheating mechanism 60, the dielectric heating unit 7*a*, the upstream cooling mechanism 8*a*, the downstream cooling mechanism 8*b*, and the lock releasing mechanism 90 in synchronism with drive suspend timing of the group of containers 1*a*, thereby allowing these mechanism 5 to 90 to perform a predetermined operation. In this way, sterilization due to dielectric heating is automatically and sequentially effected to the prepackaged foods Pa loaded in respective groups of containers 1*a*.

The takeout mechanism 9 starts when the start-up button 121 is turned on and keeps on driving irrespective of drive/drive suspend state of the timing belt pair 130, and suspends its driving when the stop button 122 is operated.

Figure 31A:
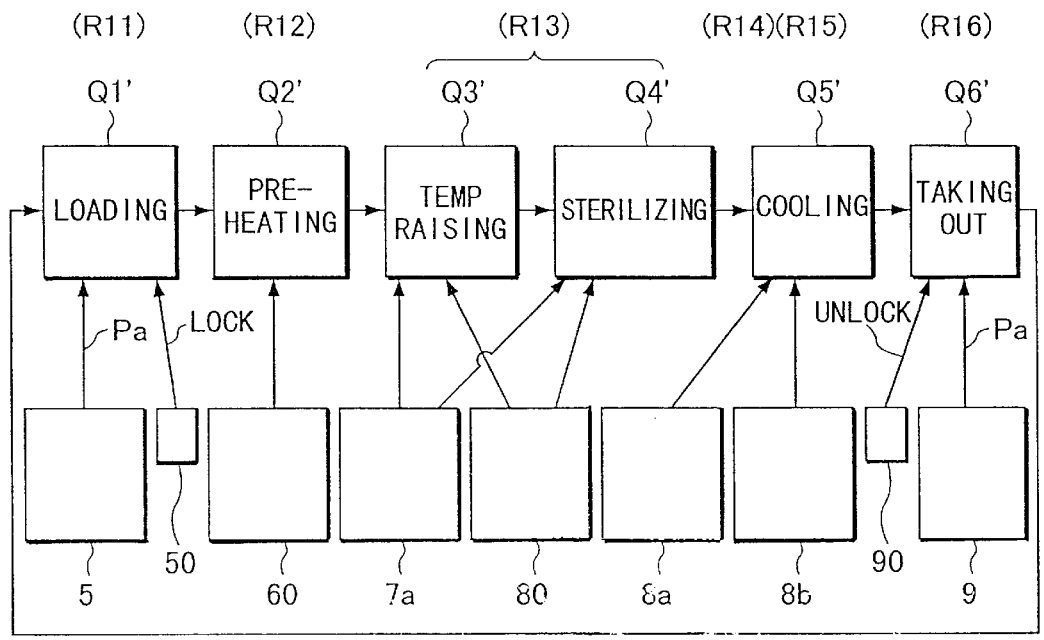
FIGS. 31A and 31B are diagrams showing a heat sterilizing process conducted by the eleventh food sterilizing apparatus, FIG. 31A showing a sequence of steps, FIG. 31B being a graph showing a relation between the temperature of the prepackaged food in each step from preheating to cooling and time.
Figure 31B:
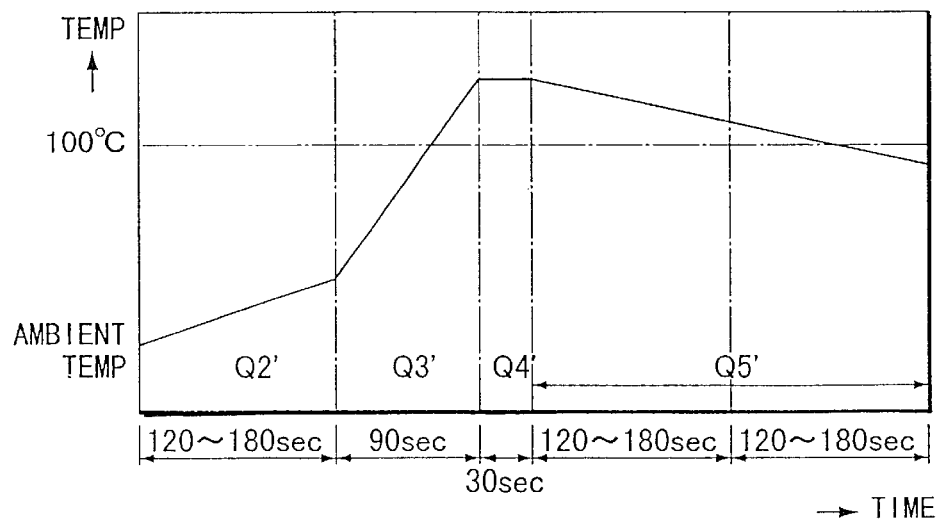

FIGS. 31A and 31B are diagrams showing a heat sterilization performed by the eleventh food sterilizing apparatus using the second modified prepackaged food. FIG. 31A is a diagram showing a sequence of steps, and FIG. 31B is a graph showing a relation between the temperature of the prepackaged food in each step from a preheating step to a cooling step and time. As shown in FIG. 31A, the heat sterilization by the apparatus 10*a* includes, similar to the tenth embodiment, a loading step Q1' of loading the prepackaged food Pa in the chamber 21*a* of the container 1, a preheating step Q2' of preheating the container 1*a* in which the prepackaged food Pa is loaded, a temperature raising step Q3' of raising the temperature of the preheated prepackaged food Pa, a sterilizing step Q4' of sterilizing the prepackaged food Pa by maintaining the temperature of the prepackaged food Pa that has been raised at a certain point in the temperature raising step Q3', a cooling step Q5' of cooling the sterilized prepackaged food Pa, and a take-out step Q6' of taking out the cooled prepackaged food Pa from the food loading chamber 21*a*.

The loading step Q1' is performed when the prepackaged food Pa is moved to the loading/locking location R11 of the food sterilizing apparatus 10*a*, the preheating step Q2' is performed when the prepackaged food Pa is moved to the pressurizing/preheating location R12, the temperature raising step Q3' and the sterilizing step Q4' are performed when the prepackaged food Pa is moved to the dielectric heating location R13, the cooling step Q5' is performed when the prepackaged food Pa is moved to the first cooling location R14 and the second cooling location R15, and the take-out step Q6' is performed when the prepackaged food Pa is moved to the take-out location R16.

Hereafter, each step is described with reference to an arbitrary one of the containers 1*a* that are intermittently moved to the respective locations by intermittent driving of the timing belts 130. When the container 1*a* reaches the loading/locking location R11, the loading step Q1' is executed. Specifically, the operable rod 54 is lowered by driving the cylinder devices 53. Then, the operable projecting tab 45 of the container 1*a* that stays still at the loading/locking location R11 is pressed downward to open up the cover 4 thereof. Next, driving the loading device 51 enables the prepackaged food Pa to be loaded into the chamber 21*a*. After the loading, the operable rod 54 is raised by driving the cylinder device 53. Then, the cover 4 is closed to set the chamber 21*a* loaded with the prepackaged food Pa in a closed state.

Next, driving of the locking mechanism 50 locks the closed state of the cover 4 by a certain operation of the locking mechanism 50. Locking of the closed state is performed by moving the operable tab 38*b* set in a horizontal posture as follows. Specifically, the operable tab 38*b* (see FIG. 6A) of the locking means 36 set in a horizontal posture is first rotated counterclockwise about the first horizontal axis 37*a* to temporarily allow the engaging portion 39*a* of the locking tab 39 to cross over the engaging projection 47*a* of the cover 4, and then rotating the operable tab 38*b* clockwise engages the engaging portion 39*a* with the engaging projection 47*a*. Thereby, the locking means 36 sets the cover 4 in a locked state where the engaging portion 39*a* engages with the engaging projection 47*a* as shown in FIG. 5, thereby setting the inside of the food loading chamber 21 loaded with the prepackaged food Pa in a sealably closed state.

Subsequently, driving of the timing belt pair 130 moves the container 1*a* to the pressurizing/preheating location R12 downstream of the loading/locking location R11. Thereupon, the driving of the timing belt pair 130 is suspended. At the pressuring/preheating location R12, the preheating step Q2' is performed. Specifically, the connector means 604 is operated to communicate the steam sub pipes 603*a* with the fluid drawing connectors 33, 43 (see FIG. 6) of the bottom plate 3 and the cover 4 of the container 1*a* that stays still at the pressurizing/preheating location R12.

In this state, heated air from the compressor 602 is supplied to the fluid passages 32, 42 of the bottom plate 3 and the cover 4 and discharged out of the pipe system through the opened fluid ejecting connectors 34, 44. Passing of the heated air preheats the prepackaged food Pa in the chamber 21*a* by way of the bottom plate 3 and the cover 4. By the preheating step, as shown in FIG. 31B, the temperature of the prepackaged food Pa is raised from the ambient temperature to about 40° C. The preheating time in the preheating step Q2' lasts for about 80 to 120 seconds. The reason for setting the shorter preheating time in the eleventh embodiment, compared with the tenth embodiment, is because the high pressurized heated air is drawn into the chamber 21*a* to directly preheat the prepackaged food Pa. Immediately before completion of the preheating step Q2', the second fluid drawing connector 330 and the second fluid ejecting connector 340 are closed to set the inside of the chamber 21 in a sealably closed state filled with high pressurized heated air.

Next, upon completion of the preheating by the preheating step Q2', the container 1*a* is moved to the heating/cooling location R3 by driving of the timing belt pair 130. Upon drive suspend of the timing belt pair 130 there at, the cover 4 is connected to the upper terminal 720*a*, and the bottom plate 3 is connected to the lower terminal 720*b*, thereby functioning the cover 4 and the bottom plate 3 substantially as an opposing electrode pair. In this state, driving the high frequency generator 71 enables effecting the temperature raising step Q3' where the temperature of the prepackaged food Pa is raised to about 130° C., and then, the sterilizing step Q4' for maintaining the temperature at about 130° C. is performed. In this embodiment, dielectric heating is suspended during the sterilizing step Q4', accordingly, the sterilizing temperature is maintained only by heat supply from an external heating mechanism 80, which is described below. The process time in the temperature raising step Q3' lasts for about 60 to 90 seconds, and the process time in the sterilizing step Q4' lasts for about 20 to 30 seconds. To sum up, the total process time at the dielectric heating location R13 is about 80 to 120 seconds by summation of the process time in the temperature raising step Q3' and the sterilizing step Q4' (see FIG. 31B).

In the temperature raising step Q3', auxiliary heating by the external heating mechanism 80, in addition to dielectric heating by the dielectric heating unit 7a, is performed onto the prepackaged food Pa. Specifically, when the container 1a reaches the dielectric heating location R13, the connector means 804 is operated such that the steam sub pipes 803a are communicated with the fluid drawing connectors 33, 43 of the bottom plate 3 and the cover 4, respectively to supply heated air from the boiler 801 to the fluid passages 32, 42 (see FIG. 6). Thereby, the container 1a is promoted with heating via the bottom plate 3 and the cover 4. The auxiliary heating is continued until termination of the sterilizing step Q4'.

In the latter half of the temperature raising step Q3' and in the sterilizing step Q4', the prepackaged food Pa in the chamber 21a is heated as high as 100° C. or higher. At this time, however, the chamber 21a loaded with the prepackaged food Pa is set in a sealably closed state with a locked state of the cover 4 by the locking means 36 to withstand a high pressurized state therein. Further, since the high-pressurized air at a high temperature prepared in the preheating step Q2' is filled in the chamber 21a. Accordingly, the boiling point of water inside the prepackaged food Pa is raised, and thereby, prevented is water boiling and burst-out of the prepackaged food Pa.

Next, upon completion of the sterilization at the temperature raising step Q3', the container 1a reaches the first cooling location R14 by a circulative movement of the timing belt pair 130 to execute a first stage of cooling step Q5' by the upstream cooling mechanism 8a. Specifically, the upstream cooling mechanism 8a is operated such that driving of the connector means 83 connects the cooling water sub pipes 82a to the second fluid drawing connectors 330 to draw the cooling water from the water source 81 into the chamber 21a via the second fluid drawing connector 330. In this arrangement, the prepackaged food Pa in the chamber 21a is subjected to the first stage of cooling where the temperature thereof is lowered to a temperature slightly lower than 100° C. by supply of the cooling water. The process time by the upstream cooling mechanism 8a lasts for about 80 to 120 seconds (see FIG. 31B).

Next, the container 1a is carried to the second cooling location R15 by driving of the timing belt pair 130. Thereupon, the downstream cooling mechanism 8b is operated, similar to the upstream cooling mechanism 8a, to perform a second stage of cooling step Q5' to lower the temperature of the prepackaged food Pa at about 90° C. The process time by the downstream cooling mechanism 8b lasts for about 120 to 180 seconds (see FIG. 31B).

Next, upon completion of the cooling step Q5', the timing belt pair 130 is driven to move the container 1a to the take-out location R16, where the lock releasing mechanism 90 drives the locking means 36 to set the cover 4 in a lock released state, as shown in FIG. 6A. Specfically, in the lock released state, the cover 4 that has been set in the closed state is opened up by the weight thereof to discharge the prepackaged food Pa in the chamber 21a into the water filled in the cooling bath 91. The discharged prepackaged food Pa is immersed in the water to lower the temperature thereof to substantially the ambient temperature, and carried out of the apparatus by the discharge belt 92. The empty container 1a is then returned to the loading/locking location R11 by a circulative movement of the timing belt pair 130.

In this way, according to the eleventh food sterilizing apparatus 10a, intermittent transport of the timing belt pair 130 to intermittently move the container 1a enables to automatically and sequentially execute the followings in the order named: loading the prepackaged food Pa into the container 1a in the loading step Q1'; raising the temperature thereof up to a preheat temperature in the preheating step Q2'; raising the temperature thereof up to a sterilizing temperature in the temperature raising step Q3'; sterilizing the prepackaged food Pa in the sterilizing step Q4'; lowering the temperature thereof to 100° C. or lower in the cooling step Q5'; and taking out the prepackaged food Pa that has been cooled down to the substantially ambient temperature in the take-out step Q6'.

In the eleventh embodiment, the container 1a provided with the locking means 36 is used to let the locking means 36 lock the closed state of the cover 4 so as to set the inside of the food loading chamber 21a in a sealably closed state. In this arrangement, the prepackaged food Pa is directly heated or cooled by introducing a heating medium into the chamber 21a in the preheating step Q2'. Further, in the temperature raising step Q3' and the sterilizing step Q4', even if the temperature of the prepackaged food Pa is raised to 100° C. or higher, there can be securely prevented a phenomenon that water inside the prepackaged food Pa is boiled, which may result in burst-out of the prepackaged food Pa due to expansion of the prepackaged food Pa owning to boiling water.

Further, the cooling step Q5' which rather takes a long time is divided into two stages: the first stage of cooling by the upstream cooling mechanism 8a; and the second stage of cooling by the downstream cooling mechanism 8b. In this arrangement, the time interval of intermittent driving of the container 1a combined with open-up operation of the cover 4 can be shortened, which is advantageous in improving the heat sterilization efficiency.

Figure 32:
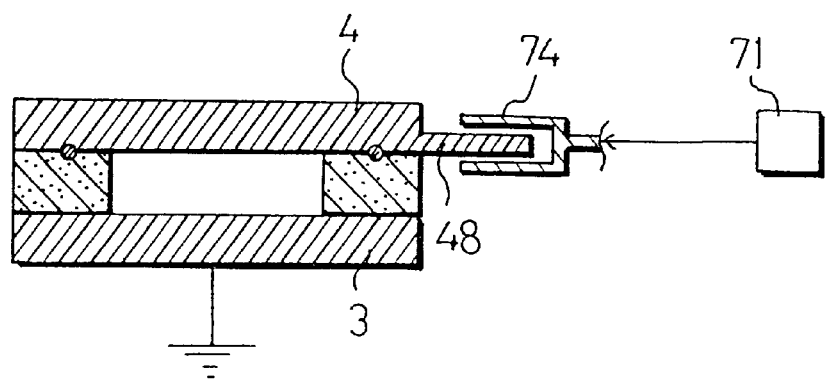
FIG. 32 is a diagram showing an alteration of a high frequency power supply system in the eleventh embodiment.

FIG. 32 is a diagram showing an alteration of the power supply system of supplying a high frequency power in the eleventh embodiment. In this power supply system, the cover 4 of the container 1a is provided with a planar shape movable electrode 48 extending in a direction normal to the moving direction of the container 1a and projecting horizontally. A two-legged fixing electrode 74 that enables the movable electrode 48 to pass a space between the leg portions in non-contact state is provided. A high frequency power from the high frequency generator 71 is supplied to the fixing electrode 74. The bottom plate 3 is grounded via a part constituting the apparatus 10a suitable for grounding.

According to the power supply system, the fixing electrode 74 and the movable electrode 48 are rendered into capacity coupling state at their respective opposing planes via a layer of air existing in the space. Therefore, a high frequency power from the high frequency generator 71 is supplied to the prepackaged food P (Pa) without causing the electrode under high frequency application in contact with the container 1a. Thereby, the power supply system is simplified, and omitted is a cumbersome maintenance operation such as inspection as to whether the electrode is reliably enabled in contact state with the container 1a, and adjustment if a poor contact state is found.

Figure 33:
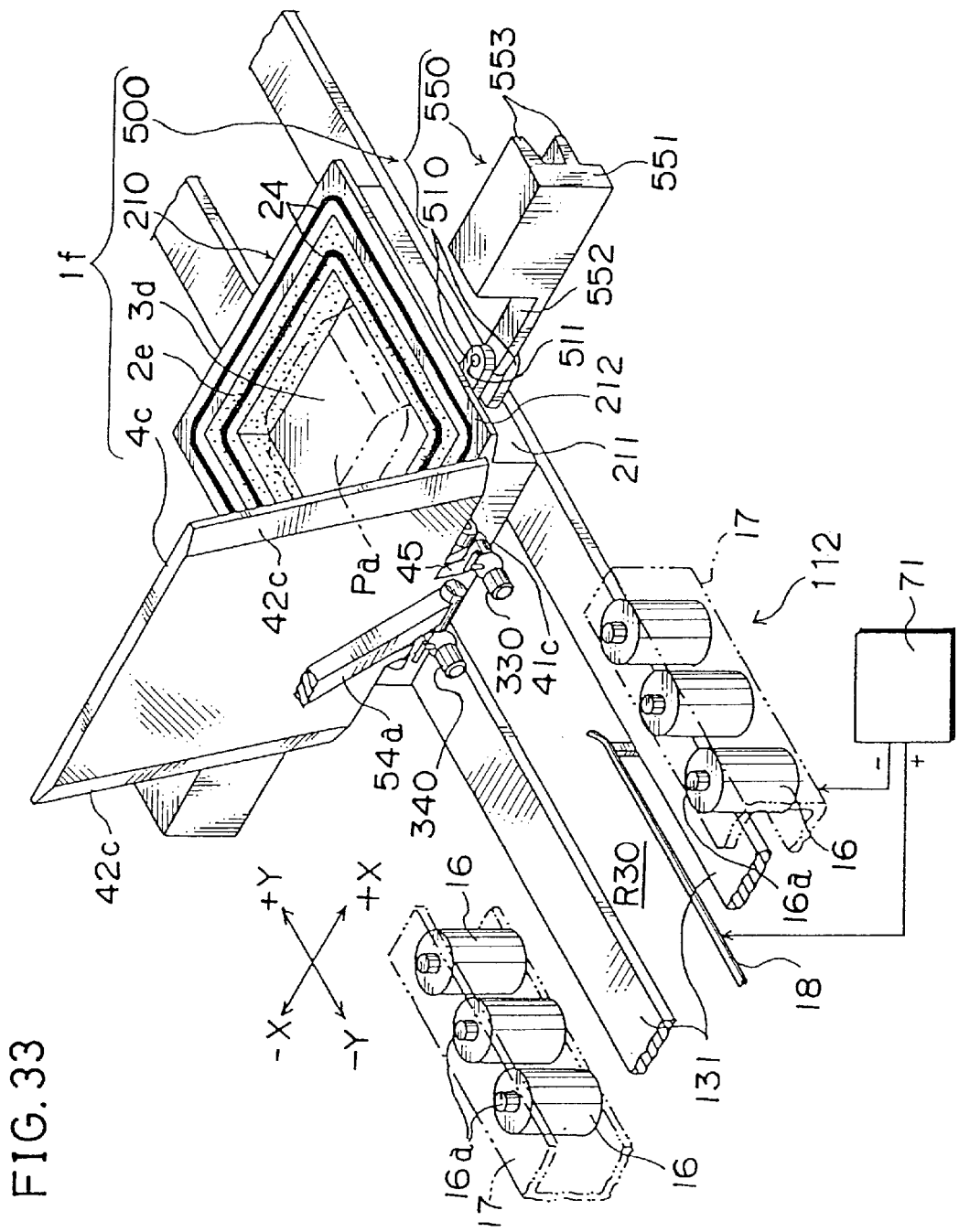
FIG. 33 is a perspective view of a prepackaged food loading container as a seventh modification according to this invention showing a state that a cover is opened.
Figure 34:
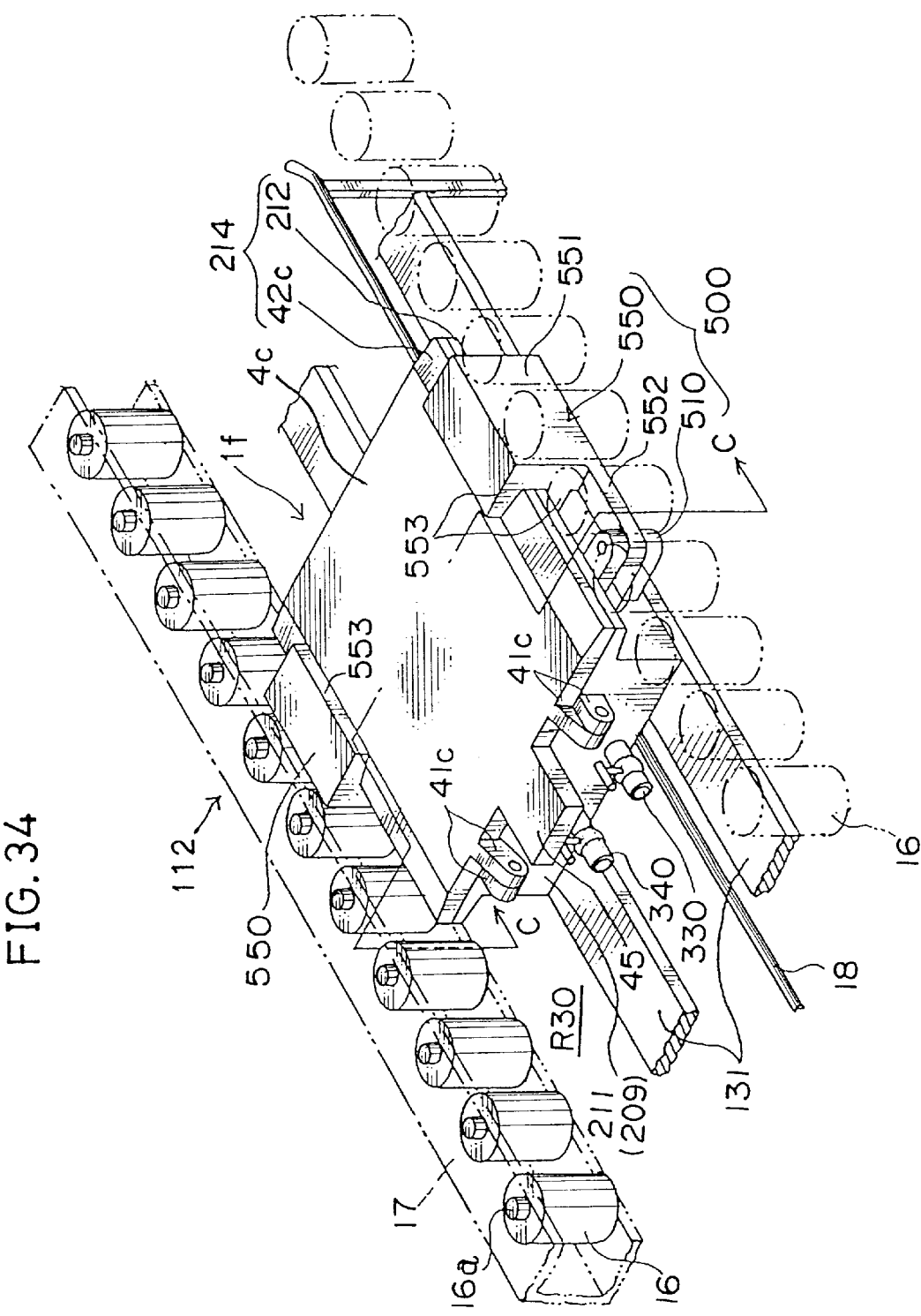
FIG. 34 is a perspective view of the seventh modified prepackaged food container showing a state that the cover is closed.
Figure 35:
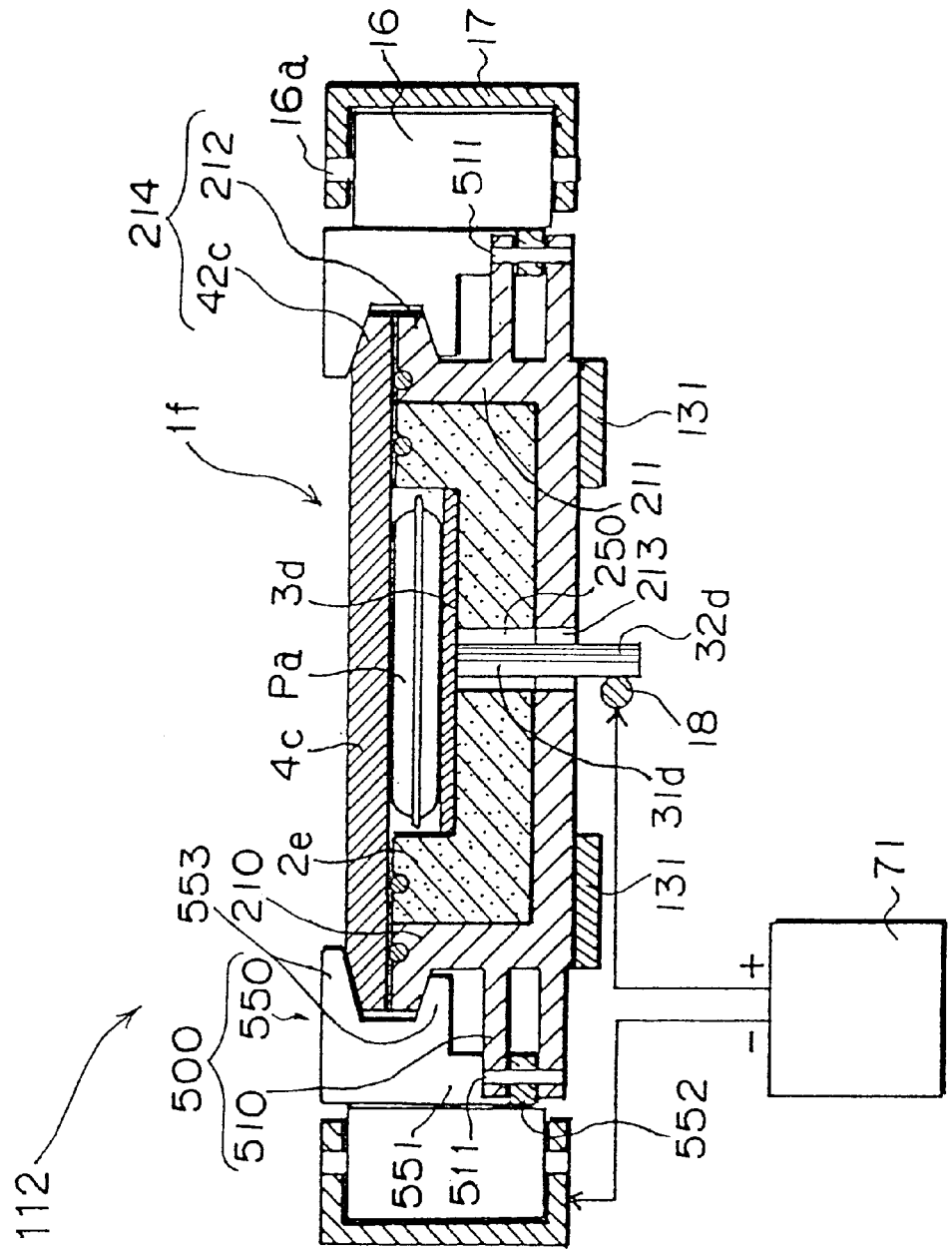
FIG. 35 is a cross section taken along the line C—C in FIG. 34.

FIGS. 33 and 34 are perspective views showing a twelfth embodiment of the food sterilizing apparatus according to this invention. FIG. 33 shows a state that a cover is opened, and FIG. 34 shows a state that the cover is closed. FIG. 35 is a cross section taken along the line C—C in FIG. 34. Hereafter, X—X direction in FIGS. 33 and 34 is widthwise direction of the apparatus, and Y—Y direction is depthwise direction of the apparatus. Particulaly, −X direction is "leftward direction", +X direction is "rightward direction", and −Y direction is "forward direction", and +Y direction is "rearward direction".

As shown in these drawings, a container 1f includes a container man body 2e composed of a rigid insulating material similar to the container main bodies 2, 2a, 2b, 2c, 2d of the modifications, a bottom plate 3d provided in a bottom portion of a food loading chamber 21d of the container main body 2e, a metallic casing 209 covering an outer side surface and a bottom portion of the container main body 2e, a cover 4c for openably closing the chamber 21d of the container main body 2e, and a locking mechanism 500 for locking a closed state of the cover 4c.

The container main body 2e has, as shown in FIG. 33, a substantially square shape in plan view, and is formed with the rectangular parallelepiped food loading chamber 21d in the center thereof with a square shape in plan view. An annular groove is formed in an upper end of the container main body 2e to confine an O-ring 24 with an upper half part thereof exposed. A through-hole 250 (see FIG. 35) is formed in a center at the bottom portion of the chamber 21d.

The bottom plate 3d is made of a metallic flat plate, and is shaped into a square so as to fit an outer peripheral end thereof in sliding contact with an inner wall of the chamber 21d. A downwardly projecting terminal rod 31d is provided at a center on a bottom surface of the bottom plate 3d, as shown in FIG. 35, corresponding to the through-hole 250 with an outer diameter thereof smaller than an inner diameter of the through-hole 250.

The casing 209 includes a box shape main body 211 opened upward with a square shape in plan view, and a pair of wings 212 projecting outward in widthwise direction from an upper end of the widthwise lateral opposite ends of the casing main body 211. Each of the wings 212 is so constructed as to set an upper surface thereof horizontal with a thickness gradually decreased as approaching toward a lead end thereof.

A through-hole 213 with the same diametrical size as the through-hole 250 is formed in a bottom portion of the casing main body 211 corresponding to the through-hole 250 of the container main body 2e. With the bottom plate 3d mounted at the bottom portion in the chamber 21d of the container main body 2e, the terminal rod 31d is fitted into the through-hole 250. Thereby, a distal end of the terminal rod 31d projects from the bottom portion of the container 1f in an insulated state from the casing 209. A projected portion of the terminal rod 31d is utilized as a connecting terminal 32d for receiving a high frequency from a high frequency generator 71.

An annular groove is also formed in an upper end of the casing 209, and an O-ring 24 is confined in the annular groove. When the cover 4c is closed, a bottom surface thereof comes into contact with two O-rings 24 provided at the container main body 2e and the casing 209. The double contact state with the O-rings 24 secures a sealably closed state of the chamber 21d.

A fluid drawing connector 330 for drawing a heating medium into the chamber 21d and a fluid ejecting connector 340 for ejecting the heating medium after passing through the chamber 21d outward are provided at a front end of the casing main body 211. The connectors 330, 340 are provided with control valves respectively to switchingly connect and disconnect the inside of the food loading chamber 21d to and from the outside.

The cover 4c has, as shown in FIG. 34, a square shape in plan view, similar to the casing 209, and is attached to the casing 209 by way of a pair of hinges 41c provided at the front end of the casing 209. In this arrangement, the cover 4c pivots about respective horizontal axes of the hinges 41c to open and close the chamber 21d. The cover 4c is closed by a biasing force of a bias means (not shown) in a normal state, and is opened only when releasably loading the prepackaged food Pa in the chamber 21d. It should be noted that the prepackaged food Pa in non-contact state with the inner wall of the chamber 21d is illustrated in this modification. However, a prepackaged food P in close contact state with the inner wall may be used.

To open up the cover 4c, an operable projecting tab 45 is formed at a front end of the cover 4c, and an operable rod 54a which is projected in and out by driving a drive means (not shown) is provided at an appropriate position on the transport path for the container 1f. When the operable projecting tab 45 of the container 1f is pressed against the operable rod 54a when the operable rod 54a is set in a projected state, as shown in FIG. 33, the cover 4c is opened up.

The cover 4c has a flat bottom surface and a top surface formed with a slope 42c at widthwise opposite ends thereof. The thickness of the slope 42c (42c) is gradually tapered as approaching a lead end thereof. A locked part 214 engageable with the locking mechanism 500, when the cover 4c is closed, is formed by the tapered slope 42c (42c).

The locking mechanism 500 includes a pair of hinges 510 provided at a part closer to a front part of the widthwise opposite ends of the casing main body 211 projecting outward, and a pair of locking arms 550 provided at widthwise ends each pivotally supported about a vertical axis of the corresponding hinge 510. Each of the locking arms 550 includes a rectangular parallelepiped main body 551, a projecting rod 552 projecting in longitudinal direction of the arm main body 551 from a lower end of the arm main body 551, and a pair of upper and lower projections 553 formed at a side surface of the arm main body 551 extending in the longitudinal direction of the arm main body 551 to slidably receive the corresponding locked part 214. The locking arm 550 is normally set in a lock released posture projecting widthwise from the casing 209, as shown in FIG. 33, by a bias force of a bias means (not shown). On the other hand, when a dielectric heating is applied, the locking arm 550 is retracted in a lockable state, as shown in FIG. 34, for locking a closed state of the cover 4c.

The projecting rod 552 is so operated as to pivot the locking arm 550 about the vertical axis 511 with a lead end thereof pivotally supported by the vertical axis 511. The upper and lower projections 553 are operated such that, in the case of operating the right (left) arm 550, the arm main body 551 is rotated counterclockwise (clockwise) about the vertical axis 511, as shown in FIG. 34, to hold the right (left) locked part 214 between the upper and lower locking projections 553. Thereby, the closed state of the cover 4c is locked.

The projecting rod 552 is formed such that opposing planes thereof are rendered into sliding contact with the respective upper and lower slopes of the locked part 214. In this arrangement, when the locked part 214 engages with the locking arm 550, the closed state of the chamber 21c by the cover 4c is secured.

The container 1f is, as shown in FIGS. 33 to 35, constructed such that the bottom portion of the casing 209 is fixed to a pair of widthwise provided conveyor belts 131 of a food sterilizing apparatus 112 (altered apparatus of the twelfth embodiment) to sterilize the prepackaged food Pa loaded in the chamber 21d due to dielectric heating while moving the container 1f along a predetermined transport path defined by a circulative movement of the conveyor belt pair 131.

In this embodiment, the food sterilizing apparatus 112 is provided with a plurality of pressing roller pairs 16 arrayed in parallel with the moving direction of the conveyor belt pair 131 at a dielectric heating region R30. Each roller pair 16 is provided in widthwise direction of the apparatus. Each of the right-handed (left-handed) pressing rollers 16 has its vertical axis 1a supported on a common support member 17 extending in forward/rearward direction, thereby allowing the pressing rollers 16 to freely rotate about the respective vertical axes 16a. The distance between the pair of pressing rollers 16 opposing in widthwise direction is set substantially the same as the distance between lead ends of a pair of hinges 510 provided at the casing main body 211, and the interval between the adjacent pressing rollers 16 arrayed in forward/rearward direction is set shorter than the length of the arm main body 551 in forward/rearward direction.

The food sterilizing apparatus 112 includes a terminal wire 18 provided beneath the conveyor belt 131 in the lengthwise direction thereof at the dielectric heating region R30. A plus voltage of high frequency is applied from the high frequency generator 71 to the terminal wire 18, whereas a minus voltage of high frequency is applied therefrom to the support members 17. In this arrangement, when the prepackaged food Pa is loaded in the chamber 21d, and the container if set in a closed state by the cover 4c reaches the dielectric heating region R30 by driving of the conveyor belt pair 131, the pair of locking arms 550 which have been set in the lock released posture, namely, in a projecting state from the casing main body 211 first come into contact with the most upstream pair of pressing rollers 16. Accompanied by the forward movement of the container 1f, each of the locking arm pair 550 rotates rearward about the vertical axis 511.

When the container 1f is moved to the dielectric heating region R30, as shown in FIG. 34, the locked part 214 (see FIG. 35) of the container 1f set in the closed state by the cover 4c is pressingly held by the upper and lower projections 553 of the locking arm 550, with a connecting terminal 32d of the terminal rod 31d coming into contact with the terminal wire 18 (see FIG. 35). Thereby, a high frequency voltage from the high frequency generator 71 is applied to the prepackaged food Pa loaded in the chamber 21d via the bottom plate 3d to perform dielectric heating onto the prepackaged food Pa.

When the container 1f is moved to the dielectric heating region R30, high pressurized heated air is supplied into the chamber 21d via the fluid drawing connector 330 to raise the pressure inside the chamber 21d to 3 atm or higher. Thereby, prevented is burst-out of the prepackaged food Pa, while propagating uniform heated state throughout the prepackaged food Pa aided by auxiliary heating onto the prepackaged food Pa.

According to the container 1f as a seventh modification, the locking arm 550 comes into sliding contact with the corresponding support member 17 as the container 1f is carried into the dielectric heating region R30, thereby locking the closed state of the cover 4c. Further, while the container 1f moves out of the dielectric heating region R30, the locked state is eventually released. In this arrangement, the locking mechanism 500 for locking and unlocking is simplified, which contributes to installation cost reduction.

Figure 36:
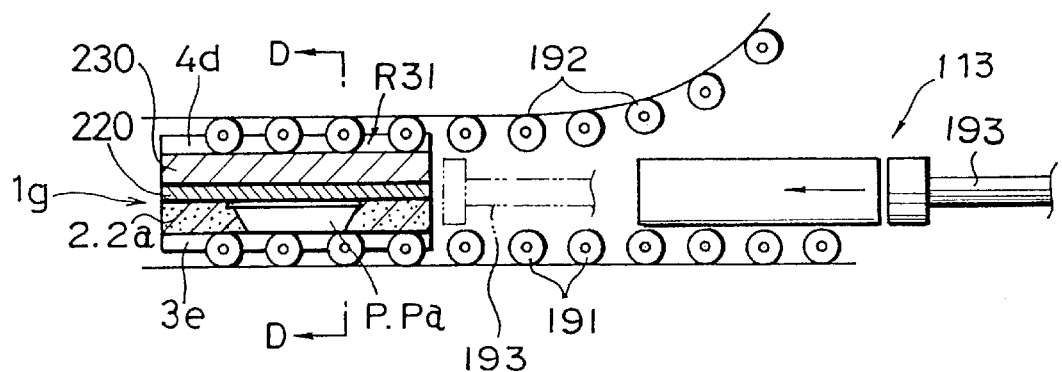
FIG. 36 is a cross-sectional side view showing a prepackaged food loading container as an eighth modification according to this invention.
Figure 37:
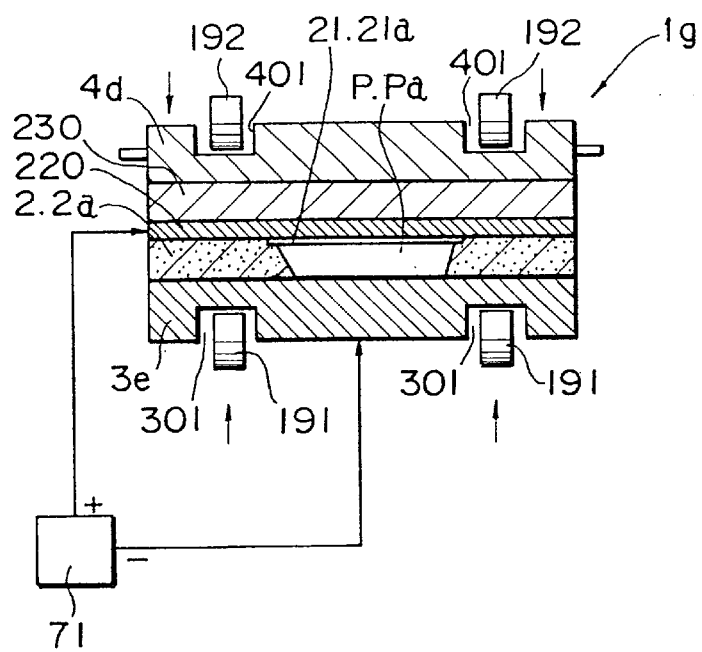
FIG. 37 is a cross section of the eighth modified prepackaged food loading container taken along the line D—D in FIG. 36.

FIGS. 36 and 37 are diagrams illustrating a thirteenth embodiment of the food sterilizing apparatus according to this invention. FIG. 36 is a cross-sectional side view, and FIG. 37 is a cross section taken along the line D—D in FIG. 36. In this modification, a prepackaged food loading container 1g (eighth modification) includes a container main body 2 (2a) similar to the first (second) modification, a metallic bottom plate 3e placed over a lower part of the container main body 2 (2a), a metallic intermediate plate 219 placed over a top part of the container main body 2 (2a), an insulating plate 230 placed over a top part of the intermediate plate 219 and composed of the same material as the container main body 2 (2a), and a metallic cover 4d placed over a top part of the insulating plate 230.

A food loading chamber 21 (21a) for loading a prepackaged food P (Pa) is defined in the container main body 2 (2a). When the intermediate plate 219, the insulating plate 230, and the cover 4d are placed one over the other in the predetermined order on the container main body 2 (2a) in a state that the prepackaged food P (Pa) is loaded in the chamber 21 (21a), a sealably closed space is defined in the chamber 21 (21a). A pair of lower guide grooves 301 provided at widthwise ends (left-hand and right-hand direction on the plane of FIG. 37) each extending in forward/rearward direction (leftward/rightward direction on the plane of FIG. 36) are formed in a bottom portion of the bottom plate 3e of the container 1g. A pair of upper guide grooves 401 are formed in a top surface of the cover 4d in the similar manner as the lower guide grooves 301.

A food sterilizing apparatus 113 (thirteenth embodiment) incorporated with the container 1g includes plural pairs of lower rollers 191 with each pair opposing in widthwise direction, plural pairs of upper rollers 192 provided above the lower roller pairs 191 corresponding thereto, and a pushing member 193 for pushing the container 1g to a dielectric heating region R31. The pushing member 193 is so constructed as to reciprocate in fore and aft direction by driving of a drive mechanism (not shown). When moved forward, the pushing member 193 pushes the container 1g toward the dielectric heating region R31 and passes it over the region R31.

The distance between widthwise centers of the lower roller pair 191 is set equal to the distance between widthwise centers of the opposing lower guide grooves 301. Thereby, as shown in FIG. 37, left and right lower rollers 191 support the container 1g in a fitted state in the left and right lower guide grooves 301 to make the container 1g movable in fore and aft direction.

At the dielectric heating region R31, the distance between widthwise centers of the upper roller pair 192 is set equal to the distance between widthwise centers of the opposing upper guide grooves 401. Thereby, when the container 1g is moved to the dielectric heating region R31 supported by the lower rollers 191, the inside of the chamber 21 (21a) is kept in a pressurized state while being pressed against the upper rollers 192 fitted in the upper guide grooves 401.

The upper roller 192 is constructed such that the height level thereof increases as going upstream (right side in FIG. 36) of the dielectric heating region R31. In this arrangement, the container 1g moved up to the upstream side of the dielectric heating region R31 is readily pushed forward by the pushing member 193, thereby facilitating transport of the container 1g into the dielectric heating region R31.

When the container 1g is pushed to the dielectric heating region R31, a high frequency voltage from a high frequency generator is applied to the prepackaged food P (Pa) in the chamber 21 (21a) by way of the intermediate plate 219 and the bottom plate 3e. Thereby, the prepackaged food P (Pa) is subjected to dielectric heating. In the case of the prepackaged food Pa of a non-contact type that is not rendered into contact with the inner wall of the container, pressurized heated air is supplied into the chamber 21a to promote heating, while preventing burst-out of the prepackaged food Pa According to the container 1g of the eighth modification, the inside of the chamber 21 (21a) at the dielectric heating region R31 is rendered into a sealably closed space without providing a complicated locking mechanism for the container 1g, which simplifies the construction of the container 1g and reduces production cost for the container 1g.

Figure 38A:
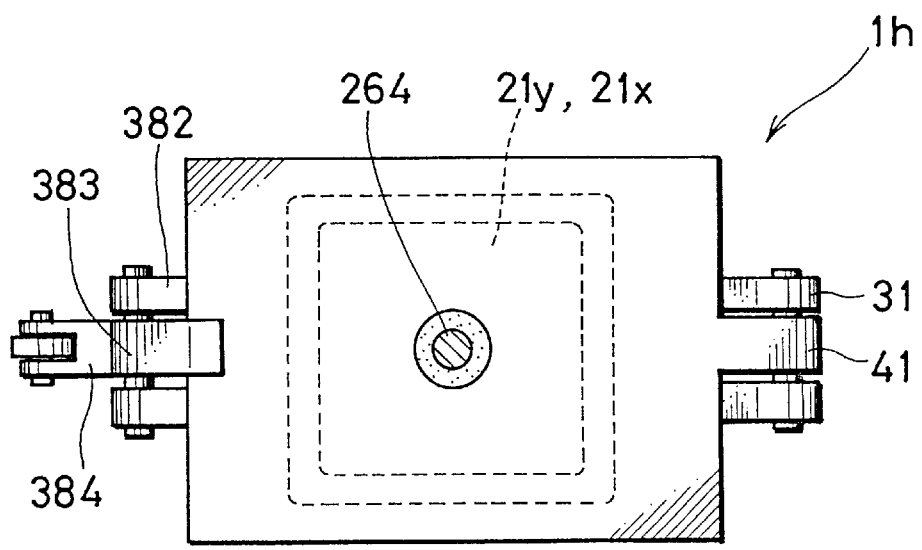
FIGS. 38A and 38B are diagrams of a prepackaged food loading container as a ninth modification according to this invention, FIG. 38A being a plan view, FIG. 38B being a cross-sectional side view.
Figure 38B:
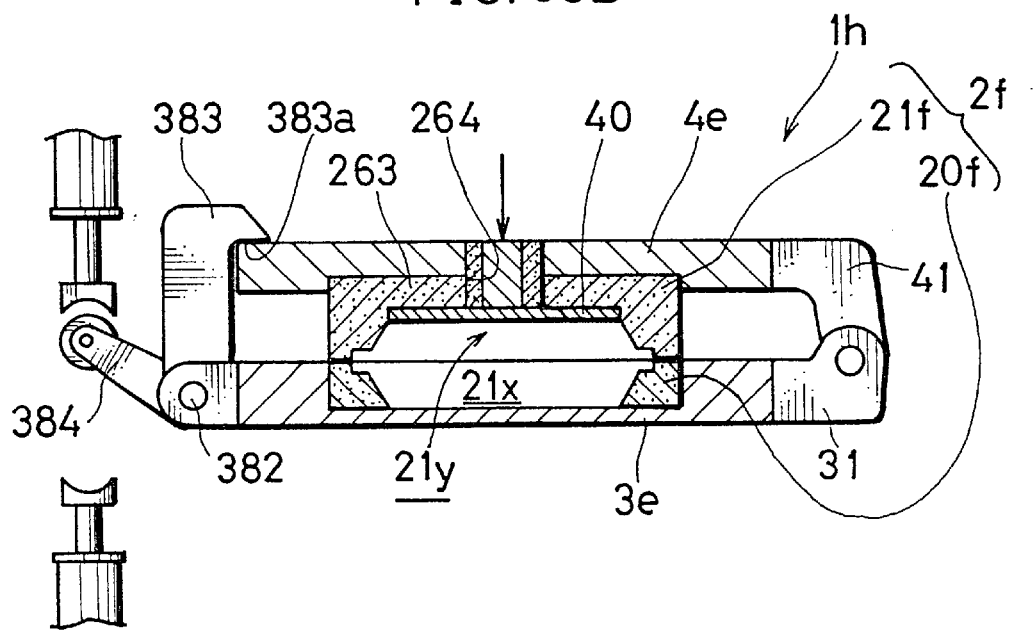

FIGS. 38A and 38B are diagrams showing a ninth modification of the food loading container according to this invention. FIG. 38A is a plan view, and FIG. 38B is a cross sectional side view. In this modification, the food loading container 1h includes an upper-and lower-part-dividable container main body 2f composed of a synthetic resin such as epoxy resin, a metallic bottom plate 3e constituting a bottom portion of the container man body 2f, and a top plate 4e constituting a ceiling thereof.

The container main body 2f includes a lower container main part (annular frame segment) 20f and an upper container main part (another annular frame segment) 21f. A through-hole for verticaly loading a tray-type prepackaged food P is formed in the lower container main part 20f. When a lower part of the through-hole is closed by the bottom plate 3e, a lower food loading chamber 21x opened upward is defined in a center of the lower main part 20f.

The lower food loading chamber 21x has such an inner shape of three-dimensional size as to match the three-dimensional size of an outer shape of the prepackaged food P. An annular step portion 261 for fittingly receiving the annular end P2 is formed in an upper end of the lower chamber 21x. When the tray-type prepackaged food Pa is loaded in the lower chamber 21x, an outer peripheral surface of the container main body P1 comes into fitting contact with an inner wall of the lower chamber 21x with the annular end P2 fitted in the annular step portion 261. Thereby, a top surface of the tray-type prepackaged food container Pa composed of a synthetic resin sheet P3 is set flush with a top surface of the lower container main part 20f.

The upper container main part 21f is so constructed as to make the thickness (depth) thereof greater than the lower chamber 21x and is formed with a recess at a lower part thereof so as to make the depth of a three-dimensional configuration of the lower chamber 21x set in upside-down state (corresponding to upper food loading chamber) slightly greater than the lower chamber 21x. Thereby, a ceiling 263 is formed on the upper container main part 21f. Mounting an upper electrode 40 of a flat plate shape in the recess (on the ceiling) and fixes the same defines the upper food loading chamber 21y for loading the tray-type prepackaged food container Pa. A lower peripheral end of the upper chamber 21y is formed with an annular step portion 262 corresponding to the annular step portion 261 of the lower container main part 20f. In this arrangement, loading the tray type prepackaged food container Pa set in upside-down state in the upper chamber 21y makes a bottom surface of the synthetic resin sheet P3 of the prepackaged food P flush with a bottom surface of the upper container main part 21f.

Loading the tray type prepackaged food containers Pa in their respective food loading chambers 21x, 21y of the lower and upper chambers 21x, 21y and jointly and pressingly holding the upper and lower container main parts 21f, 20f with the chambers 21x, 21y opposing each other enables sealably accommodating the two prepackaged foods Pa vertically one over another in the container main body 2f.

A through-hole 264 is formed in a center of the ceiling 263 of the upper container main part 21f and the top plate 4e to expose a part of the upper electrode 40. A terminal for high frequency power application is connected to the upper electrode 40 through the through-hole 264 to supply a high frequency power to the upper electrode 40.

The bottom plate 3e has a lower hinge 31 at one end thereof projecting outward, and the top plate 4e has an upper hinge 41 corresponding to the lower hinge 31. When the upper and lower hinges 31, 41 are rotatably jointed about their respective horizontal axes, the upper container main part 21f is openably and closably jointed to the lower container main part 20f.

The container main body 2f has a locking means 380 on a side opposite the side where the hinges 31, 41 are provided. The locking means 380 includes a pair of brackets 381 each provided at an end of the bottom plate 3e projecting outward, a locking rod 383 pivotally supported about a horizontal axis 382 interposed between the brackets 381, and a rod operable tab 384 extending from a lower end of the locking rod 383 branched into two-leg portions.

The locking rod 383 is formed with an engaging groove 383a in a plane opposing the upper container main part 21f. The engaging groove 383a is formed in such a position as to confine a peripheral end of the top plate 4e when the upper container main part 21f is placed over the lower container main part 20f.

In this arrangement, operating the rod operable tab 384 so as to rotate the locking rod 383 clockwise about the horizontal axis 382 when the upper container main part 21f is placed over the lower container main part 20f fittingly receives the peripheral end of the top plate 4e in the engaging groove 383a. Thereby, the closed state of the container main body 2f is locked. On the other hand, operating the rod operable tab 384 so as to rotate the locking rod 383 counterclockwise about the horizontal axis 382 releases the locked state. The pivotal rotation of the locking rod 383 is executed by moving a piston rod up and down by driving one of a pair of cylinder devices each provided at an appropriate position on a lower or upper side of a transport path for the container main body 2f.

According to the food loading container 1f of the ninth modification, the upper electrode 40 is set in the upper chamber 21y of the upper container main part 21f made of a synthetic resin, and a high frequency power is supplied to the upper electrode 40 through the through-hole 264 having a relatively large inner diameter. In this arrangement, the bottom plate 3e, the lower hinge 31, the upper hinge 41, and the locking means 380 are insulated from the upper electrode 40 with the container main body 2f of a synthetic resin interposed therebetween. Therefore, a problem can be avoided that a high frequency power is short-circuited even if the upper and lower hinges 31, 41 and the locking means 380 are made of a metallic material, thus making the construction of the food loading container 1f durable.

Further, two prepackaged foods P can be loaded without heat variation in the container main body 2f. This improves sterilizing efficiency of the prepackaged food P.

In the food loading container 1h of the ninth modification, it may be possible to omit the locking means 380 and instead, a press machine may be provided to pressingly hold the upper container main part 21f against the lower container main part 20f while a high frequency power is supplied to the prepackaged food P in the chamber 1h to render the inside of the food loading chambers 21x, 21y resistible against a high pressure during heating by high frequency application.

Figure 39A:
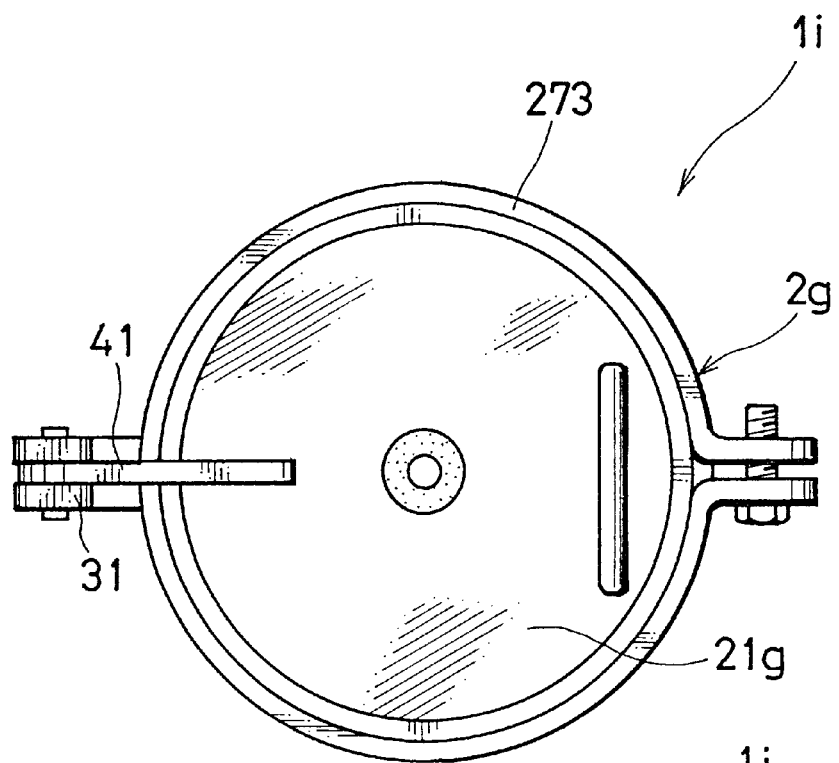
FIGS. 39A and 39B are diagrams of a prepackaged food loading container as a tenth modification according to this invention, FIG. 39A being a plan view, FIG. 39B being a cross-sectional side view.
Figure 39B:
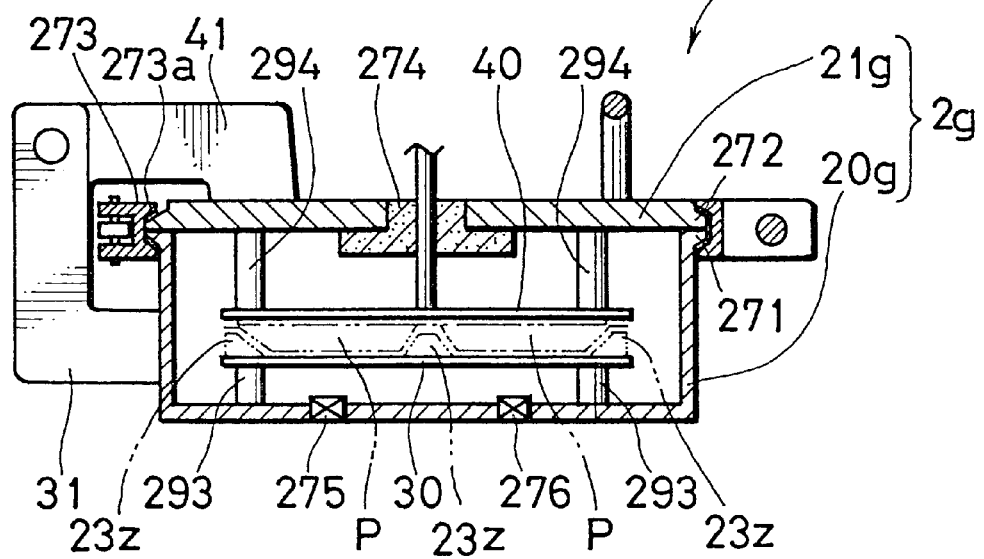

FIGS. 39A and 39B are diagrams showing a tenth modification of the food loading container according to this invention. FIG. 39A is a plan view, and FIG. 39B is a cross-sectional side view. The food loading container 1i of this modification is of a type for maintaining a high-pressurized state in the food loading chamber to suppress expansion of the prepackaged food P during heating by high frequency application. As shown in FIGS. 39A and 39B, the chamber 1i essentially has a metallic upper-and-lower-part-dividable container main body 2g of a circular shape in plan view, and a pair of opposing electrodes (lower electrode 30 and upper electrode 40) equipped in the container main body 2g.

The container main body 2g includes a lower container main part 20g of a pan shape with a great depth and a cover 21g of lid type that covers an upper peripheral end of the lower container main part 20g. A lower annular rib 271 projecting outward with a tapered portion as going downward is provided along an entire perimeter of the upper peripheral end of the lower container main part 20g. Likewise, an upper annular rib 272 corresponding to the lower annular rib 271 with a tapered portion as going upward is provided along a peripheral end of the cover 21g. Mounting a pair of semi-circular clamp bands 273 formed with an engaging groove 273a in an inner side thereof on a wedge-shape part in cross section defined by joining the lower annular rib 271 and the upper annular rib 272 in mutually pressing contact state and fastening the same with a bolt when the cover 21g is placed over the lower container main part 20g securely sets the inside of the container main body 2g in a sealably closed state.

An insertion hole is formed in a center of the cover 21g to fittingly insert a fitting member 274 made of an insulating material. A conductive wire for supplying a high frequency power to the upper electrode 40 by way of the fitting member 274 is drawn into the container main body 2g.

The container main body 2g is constructed such that a lower hinge 31 integrally mounted on the lower container main part 20g and an upper hinge 41 integrally mounted on the cover 21g are jointed pivotable about respective horizontal axes relative to each other. Thereby, the cover 21g is openably closed with respect to the lower container main part 20g.

The lower electrode 30 is supported by a plurality of conductive bar shape support members 293 provided upright on an inner bottom portion of the lower container main part 20g. Likewise, the upper electrode 40 is supported by a plurality of bar shape support members 294 made of an insulating material and provided upright from a ceiling of the cover 21g. A loading space for loading the prepackaged food P (Pa) is defined between the lower electrode 30 and the upper electrode 40. In this embodiment, the loading space is secured by setting the planar size of the upper and lower electrode 30, 40 so as to place the prepackaged foods P, Pa side by side.

A first auto coupler 275 for drawing a fluid into the container main body 2g and a second auto coupler 276 for ejecting the fluid passing through the container main body 2g are provided at a bottom portion of the lower container main part 20g. Connecting a given tube to the corresponding auto coupler 275 (276) according to needs switchingly draws heated air, pressurized air, heated steam or cooling water into the container main body 2g by way of the first auto coupler 275 and ejects the fluid once drawn into the container main body 2g out therefrom by way of the second auto coupler 276.

Mounting a sealing member 23z which is rendered in planar contact with the tray type prepackaged foods P between the lower electrode 30 and the upper electrode 40 enables dielectric heating of the prepackaged foods P at 100° C. or higher without setting the inside of the container main body 2g in a pressurized state by drawing pressurized air.

According to the food loading chamber 1i of the tenth modification, since an entirety of the container main body 2g except the fitting member 274 is made of a metallic material, it can easily provide a food loading container of a durable construction with less material cost, thus obtaining a desirable effect.

Figure 40:
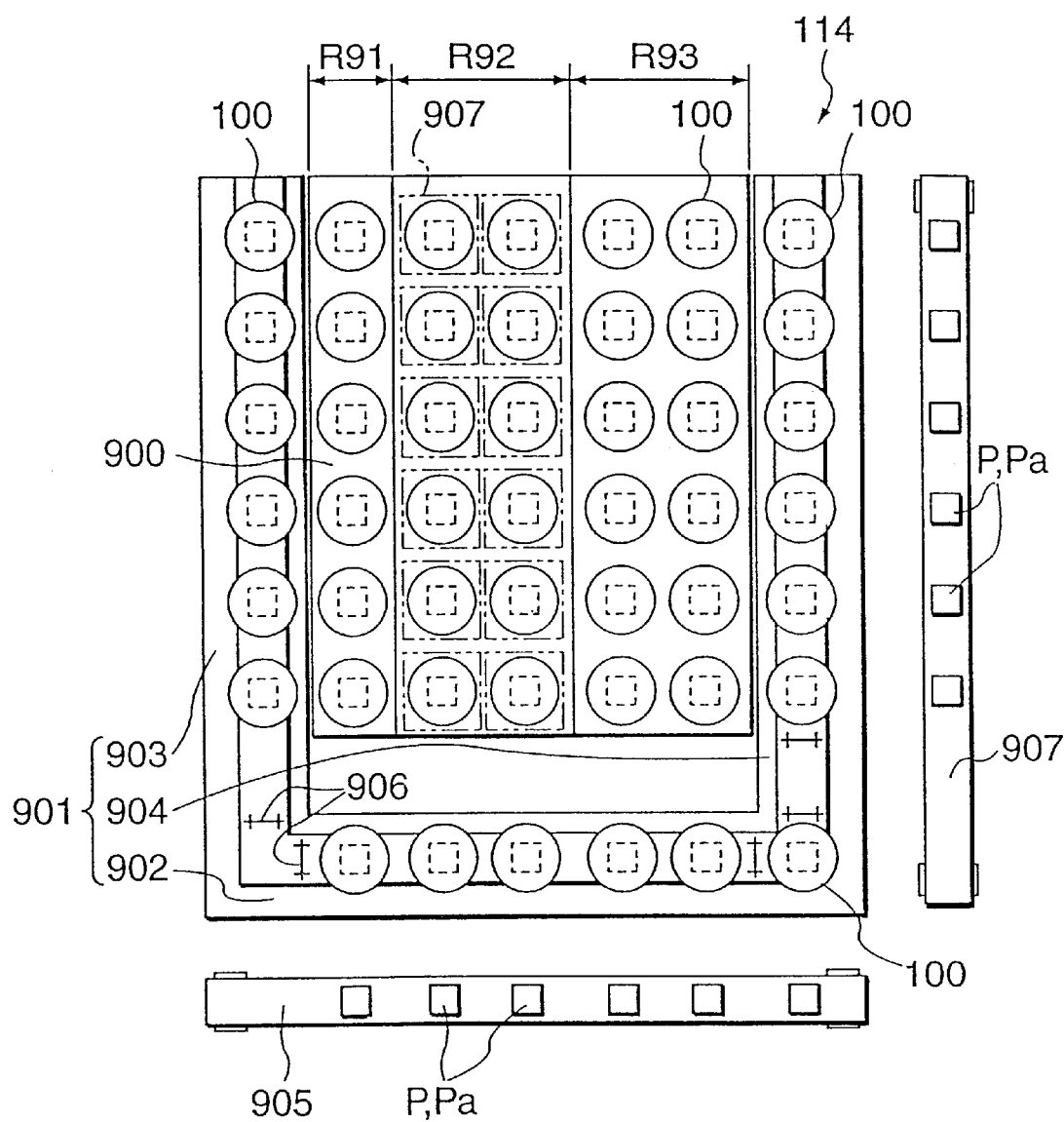
FIG. 40 is a plan view showing a food sterilizing apparatus as a fourteenth embodiment according to this invention.

FIG. 40 is a plan view showing a fourteenth embodiment of the food sterilizing apparatus according to this invention. As shown in this drawing, the food sterilizing apparatus 114 basically includes a food processing table 900 of a square shape in plan view, and a U-shape sub table 901 in plan view extending by a certain length along left and right ends and a side end (lower part on the plane of FIG. 40) of the food processing table 900. The food loading container 100 is processed for sterilization due to dielectric heating while moving according to a predetermined order over the food processing table 900 and the sub table 901.

The food processing table 900 has, in this embodiment, such a size sufficient as to place 36 pieces of food loading containers 100 (6 per column×5 per row). Any type of food loading container as described in the foregoing embodiments/modifications is applicable as the food loading container 100. The sub table 901 includes a food receiving table 902 provided in parallel with the side end of the food processing table 900, a stand-by table 903 adjacent the table 900 at an upstream end (left end) in a container transport direction, and a food take-out table 904 adjacent the table 900 at a downstream end (right end) in the container transport direction.

Six pieces of food loading containers 100 that have moved onto the food receiving table 902 are transported to the stand-by table 903 by a transport roller 906 provided on the sub table 901 after loading of the prepackaged foods P (Pa) carried by a belt conveyor 905. These food loading containers 100 are, after waiting for a predetermined time on the stand-by table 903, fed onto the food processing table 900 altogether as a set by a certain pushing means, and subjected to a certain sterilization while moved downstream, and carried onto the food take-out table 904.

Next, the set of containers 100 carried onto the food take-out table 904 have their covers opened by a certain cover opening means, have the prepackaged foods P (Pa) loaded therein taken out by a certain take-out means, and are discharged out of the apparatus by a discharge conveyor 907. After discharge of the prepackaged foods P (Pa), the set of containers 100 are returned to the sub table 901 by the transport roller 906 where another set of prepackaged foods P (Pa) are loaded.

In this way, a set of six containers 100 circulatively move over the food receiving table 902, the stand-by table 903, the food processing table 900, and the food take-out table 904. Thereby, the prepackaged foods P (Pa) that have reached the apparatus 114 by the belt conveyor 905 are loaded in the corresponding container 100, subjected to a certain sterilization, and then discharged as the sterilized prepackaged foods P (Pa) by the discharge conveyor 907.

A preheating location R91, a dielectric heating location R92, and a cooling location R93 are provided from upstream to downstream in this order on the food processing table 900. The prepackaged foods P (Pa) in the container 100 is preheated by an external heat source at the preheating location R91, sterilized due to dielectric heating while applied with a high frequency at the dielectric heating location R92, and cooled by an external cooling source such as cooling water at the cooling location R93.

Compact high frequency generators are mounted individually for each of the set of six containers 100 at the dielectric heating location R92 to perform dielectric heating onto the prepackaged foods P (Pa) loaded in the containers 100 by the individually mounted high frequency generators 907. The high frequency generators 907 are detached from the containers 100 immediately before the containers 100 pass the dielectric heating location R92 and detachably mounted to another set of containers 100 that have entered the dielectric heating location R92.

Individually applying a high frequency to the set of containers 100 by the compact high frequency generators 907 enables reliable dielectric heating with less heat variation among the prepackaged foods P (Pa) in the food loading containers 100.

A high frequency generator 907 may be provided for all the food loading containers 100 in advance, instead of detachably mounted to a set of containers 100 that have reached the dielectric heating location R92 one after another. Alternatively, a high frequency power from one high frequency generator 71 may be distributed to every single food loading container 100.

According to the food sterilizing apparatus 114 of the fourteenth embodiment, the prepackaged foods P (Pa) in the containers 100 provided in a densely arranged manner are applied with heat sterilization one set after another successively. This arrangement reduces the installation area for the apparatus, which is advantageous in effectively using a factory site.

Figure 41:
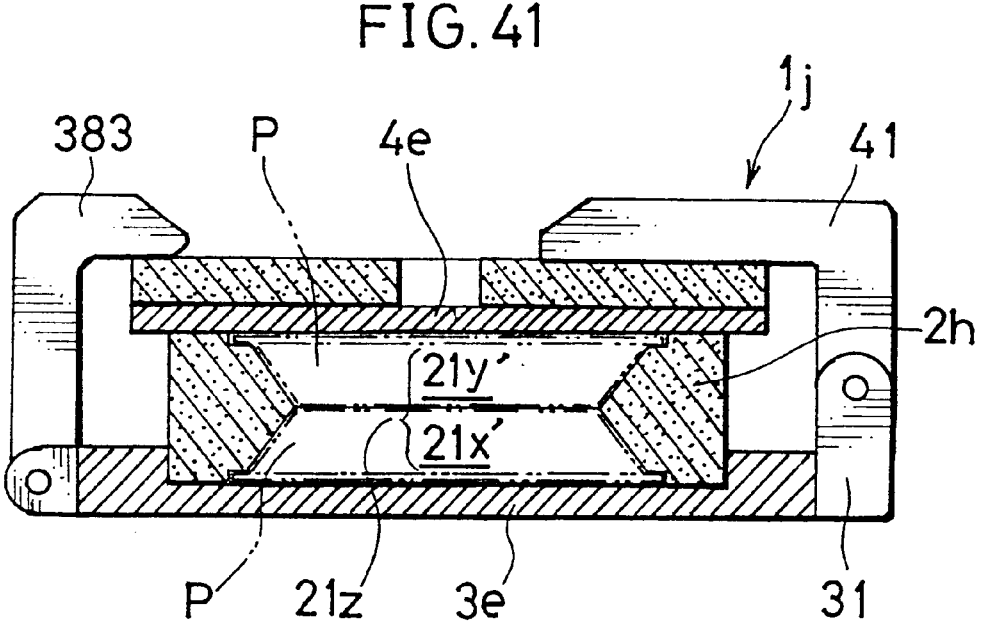
FIG. 41 is a diagram showing a prepackaged food loading container as an eleventh modification according to this invention.

FIG. 41 is a diagram showing an eleventh modification of the food loading container according to this invention. The food loading container 1$j$ of this modification is, similar to the ninth modification shown in FIGS. 38A and 38B, of a type where the tray type prepackaged foods P are placed one over another in a container main body 2$h$. The container main body 2$h$ includes a food loading chamber 21$z$ with such a shape that an intermediate portion thereof has a smaller size compared with upper and lower portions. The food loading chamber 21$z$ consists of a lower food loading chamber 21$x'$ and an upper food loading chamber 21$y'$. The other arrangement is substantially the same as the ninth modification.

According to the food loading container 1$j$ of the eleventh modification, each one of the prepackaged foods P can be loaded in lower and upper parts of the food loading chamber 21$z$ (lowerfood loading chamber 21$x'$ and upperfood loading chamber 21$y'$) without dividing the food loading chamber 21$z$ into two parts.

Figure 42:
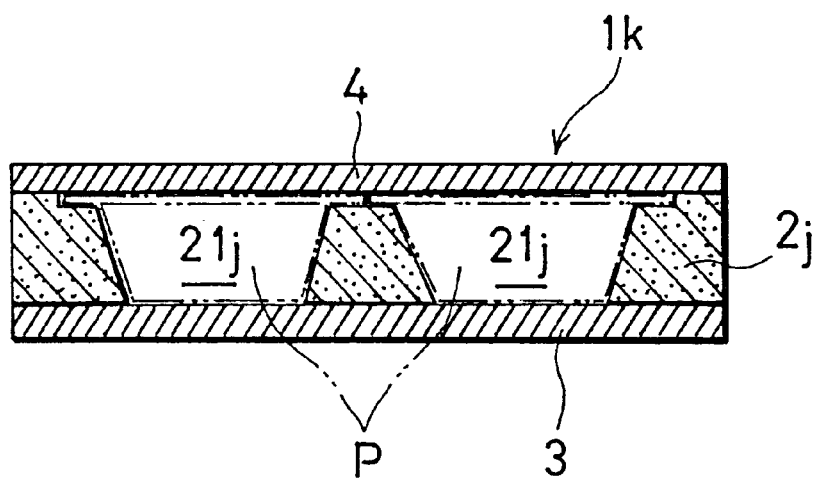
FIG. 42 is a diagram showing a prepackaged food loading container as a twelfth modification according to this invention.

FIG. 42 is a diagram showing a twelfth modification of the food loading container according to this invention. In the food loading container 1$k$ of this modification, two food loading chambers 21$j$ are defined side by side in a container main body 2$j$. The inner shape of each of the food loading chambers 21$j$ is set substantially the same as the outer shape of the prepackaged food P.

According to the container 1$k$ of the twelfth modification, two prepackaged foods P can be loaded side by side simultaneously in the container main body 2$j$.

As mentioned above in detail referring to each one of the embodiments and modifications, the present invention is for sterilizing a sealably packed prepackaged food due to dielectric heating by applying a high frequency onto a food loading container loaded with the prepackaged food. Fundamentally, adopted is a food loading container provided with at least one food loading chamber defined by a pair of opposing electrodes and having such a shape as to load one prepackaged food therein. The food loading chamber has such an inner configuration as to substantially match the outer shape of the prepackaged food. This invention also relates to various parts structures and devices that are used when actually performing dielectric heating onto the prepackaged food loaded in the thus constructed food loading container.

The food loading container basically includes a pair of opposing electrodes and an annular frame composed of an insulating material interposed between the electrode pair. However, as mentioned above in detail, there exist many types of electrodes such as a flat plate type and the one formed with the recess as to match the shape of the prepackaged food. The parts structures involved in the arrangement of the food loading container include the one relating to the cylinder device for maintaining a closed state of the food loading chamber, the locking mechanism for restricting opening of the food loading chamber once locked, and the construction for supplying a heating medium to the opposing electrode pair. The devices involved in the arrangement of the food loading container include the transport means such as the belt conveyor and the roller conveyor for circulatively transporting the food loading containers, the prepackaged food loading means, the secondary (auxiliary) heating means to promote heating of the food loading container, the cooling means, and the food take-out means arranged along the transport path for the food loading containers.

Further, the arrangements on the structure and the facility that have been described in the other embodiments and modifications are applicable, as far as not departing from the spirit of the invention, to any one of the food loading containers shown in the foregoing embodiments/modifications.

This invention is not limited to the embodiments and modifications described above and may contain the followings:

(1) In the first and second embodiments, the planar size of the opposing electrode pair 20 is set substantially equal to that of the annular insulator 23. In the fourth embodiment, the planar size of the opposing electrode pair 20$a$ is set as to cover three annular insulators 23 (transportable containers 23$a$). Alternatively, the size of the opposing electrode pair 20 may be set as to cover two annular insulators 23 or more than three.

(2) In the first to fourth embodiments, the lower pipe 430 is embedded in the lower electrode 210, and the upper pipe 440 is embedded in the upper electrode 220. Alternatively, a horizontally extending through-hole may be formed in the opposing electrode pair 20 to be connected with the pipe.

(3) In the first to fourth embodiments, it is designed to selectively supply steam from the steam generator 410 and cooling water from the supply source 420 into the space defined by the opposing electrode pair 20 (20a) by switching a supply timing. Supply of both steam and cooling water into the space of the opposing electrode pair 20 (20a) is not necessarily required. Either one or none of the supply may be used.

(4) In the first to fourth embodiments, it is designed to draw a heating medium such as steam from the steam generator 410 and cooling water from the supply source 420 both into the upper electrode 220 (22a) and lower electrode 210 (210a, 210b). Drawing may be conducted to either one of the upper and lower electrodes. Also, it may be preferable to form a communication channel inside the sealing member 23 to supply a heating medium.

(5) In the first to fourth embodiments, provided is the second cooling step X4 where the temperature of the prepackaged food P is lowered to an ambient temperature, following the take-out step X3. Alternatively, the second cooling step X4 may be omitted, and the primary cooling step X23 may be executed to lower the temperature of the prepackaged food P to the ambient temperature. Also, it may be possible to cool the prepackaged food P to the ambient temperature by leaving it as it is without any process after the primary cooling step X23. In the case of solely depending on the primary cooling process, the temperature falling curve would follow the dotted line in FIG. 5B such that the temperature falling slope from the primary cooling process X23 follows the dotted-line state even at the region corresponding to the secondary cooling process X4.

(6) In the container 1 of the first modification, a locking means for locking a closed state of the cover 4 is not provided. As an altered form, similar to the container 1a of the second embodiment, the container 1 of the first embodiment may be provided with the locking means 36. Thereby, even if the prepackaged food P is heated to 100° C. or higher, open-up of the cover 4 can be prevented. This arrangement eliminates the necessity of cooling the prepackaged food P while pressingly holding the container 1 by the opposing electrode pair 72, which improves sterilizing efficiency of the apparatus 10 of the first embodiment.

(7) In the apparatus 110 of the tenth embodiment, hot water from the hot water source 61 of the preheating mechanism 6 is used as a heating medium for preheating the bottom plate 3 and the cover 4. Alternatively, heated steam or heated air (hot air) may be used in place of hot water.

(8) In the apparatus 111 of the eleventh embodiment, cooling of the prepackaged food Pa at the first and second cooling locations R14, R15 by the upstream and downstream cooling mechanisms 8a, 8b is effected by supplying cooling water from the water source 81 into the bottom plate 3 and the cover 4. Alternatively, drawing cooling water into the chamber 21a for direct heat exchange of the heated prepackaged food Pa with the cooling water may cool the prepackaged food Pa.

(9) In the apparatus 111 of the eleventh embodiment, the bottom plate 3 and the cover 4 are heated by heated steam from the boiler 801 of the external heating mechanism 80. Alternatively, hot water or heated air may be supplied to the bottom plate 3 and the cover 4.

(10) In the apparatus 111 of the eleventh embodiment, heated air from the heater 601 of the pressurizing/preheating mechanism 60 is supplied into the food loading chamber 21a of the container 1a to preheat the prepackaged food Pa. In place of this arrangement, or in addition thereto, a heating medium may be supplied into the bottom plate 3 and the cover 4 to preheat the prepackaged food Pa.

(11) In the apparatuses 110 (111) of the tenth (eleventh) embodiment, the container 1 (1a) is circulatively moved by the conveyor belt 13 (timing belt 130) with an upper and lower belt portion spaced away from each other. Alternatively, the container 1 (1a) may be circulatively moved over one horizontal plane.

(12) In the apparatus 110 (111) of the tenth (eleventh) embodiment, the food take-out mechanism 9 is provided downstream of the cooling mechanism 8 (8a, 8b). The food take-out mechanism 9 has the cooling bath 91 for immersing the prepackaged food P (Pa) in water for cooling. As an altered arrangement, the cooling bath 91 may be omitted, and the prepackaged food P (Pa) may be cooled while transported along the conveyor belt or the like after taken out of the container 1 (1a).

(13) In the container 1f of the seventh modification, the casing 209 and the cover 4c may be set upside down with the bottom plate 3d shielded. In this arrangement, the cover 4c (now functioning as a bottom plate) is normally set in an opened state, which eliminates providing a cover opening mechanism. In this case, it is required to provide a cover closing mechanism. However, the structure of the cover closing mechanism is generally simple compared with the structure of the cover opening mechanism because providing an intervening projection on a transport path for the container 1f for causing the cover to close while passing the same would suffice the cover closing mechanism. This arrangement contributes to installation cost reduction.

Further, the container described in the foregoing embodiments/modifications may have the following features in the case that the container is integrally provided with a construction that enables keeping a closed state thereof:

(I) A prepackaged food loading container used in a prepackaged food sterilizing apparatus provided with a high frequency generating section to supply a high frequency in order to sterilize a prepackaged food by dielectric heating has a holding mechanism for substantially holding a closed state of the container loaded with the prepackaged food while interposed between a pair of opposing electrodes consisting of a first electrode and a second electrode for high frequency application. The holding mechanism has an operating section for switching the state of the container between a closed state and an opened state.

(II) In the container set forth in (I), the holding mechanism has an engaging portion, and the operating section is operated to alter the position of the engaging portion between an engaged position of rendering the first and second electrodes in pressingly held state and a release position of releasing the held state.

(III) In the container set forth in (I), an annular frame is interposed between the first and second electrodes, and a food loading chamber for loading the prepackaged food is defined in a space encased by the annular frame and the first and second electrodes.

(IV) In the container set forth in (III), the food loading chamber has such an inner shape as to substantially match the outer shape of the prepackaged food.

(V) In the container set forth in (III), the food loading chamber is constructed to be sealably closed by pressing contact of the first and second electrodes with the annular frame.

(VI) In the container set forth in (I), the container has a main body for enclosing the opposing electrode pair, and the holding mechanism sets the container main body to a sealably closed state.

EXPLOITATION IN INDUSTRY

According to the prepackaged food sterilizing apparatus and sterilizing method of this invention, the food loading chamber of the food loading container defined by the opposing electrode pair and the annular frame is adapted for loading one prepackaged food. Unlike the conventional case where a large number of prepackaged foods are loaded in a food loading chamber of a large capacity to sterilize the foods by dielectric heating using a pair of opposing electrodes, which may result in a drawback that the heated temperature of the prepackaged foods varies depending on the loaded position and the prepackaged foods with incomplete sterilization may be discharged, according to the inventive apparatus, performing series-process such that a certain number of prepackaged foods are loaded in the respective food loading chambers one after another and taken out therefrom successively after dielectric heating enables reliable sterilization onto the prepackaged foods.

Since the food loading chamber has such an inner shape as to substantially match the outer shape of the prepackaged food, expansion of the food due to dielectric heating is prevented by the inner wall of the food loading chamber which obstructs breaking of the bag/tray constituting the container. This arrangement eliminates a necessity of pressurizing the inside of the food loading chamber on a large scale to prevent burst-out of the food, and contributes to installation cost reduction.

Furthermore, according to an aspect of this invention, a certain number of containers are moved along the transport path as a set by the container moving means, and the dielectric heating section for sterilizing the prepackaged food loaded in the container by dielectric heating is provided at an appropriate position on the transport path. In this arrangement, the plural prepackaged foods are moved along the transport path one set after another to allow sterilization by the dielectric heating section successively. Compared to the conventional arrangement in which a certain number of prepackaged foods are once carried near the dielectric heating section, and then dielectric heating is applied to the foods one by one, this arrangement enables efficient heat sterilization.

In the above case, providing a prepackaged food loading mechanism for loading the prepackaged food in the container upstream of the dielectric heating section and a prepackaged food takeout mechanism for taking out the sterilized prepackaged food from the food loading chamber downstream enables automatic loading of the prepackaged food into the container for dielectric heating and automatic take-out of the sterilized food from the container without manpower. This arrangement contributes to operation cost reduction.

What is claimed is:

1. A prepackaged food sterilizing apparatus, comprising:
   a high frequency generating section for supplying a high frequency voltage;
   a food loading container including a pair of opposing electrodes having a first electrode and a second electrode, respectively, to which the high frequency is applied, said food loading container further including an annular frame interposed between the pair of first and second electrodes;
   a prepackaged food container for containing a food product therein, the food loading container including a food loading chamber in which said prepackaged food container is receivable, said food loading chamber and said prepackaged food container being configured to have respective shapes which are substantially complementary with one another such that said prepackaged food container is conformably accommodated by an interior of said food loading chamber over a substantial outer surface thereof when received in said food loading chamber at a time of sterilization of same, thereby providing support against possible rupturing of said prepackaged food container caused by heat expansion; and
   a holding device operable to maintain a position of the pair of opposing electrodes to retain a shape of the food loading chamber which substantially conforms to a corresponding shape of the prepackaged food container.

2. The prepackaged food sterilizing apparatus according to claim 1, wherein:
   the first electrode and the second electrode are each formed with an opposing plane shaped into a flat surface parallel to each other; and
   the annular frame has such an inner shape as to substantially match a side surface of the prepackaged food container.

3. The prepackaged food sterilizing apparatus according to claim 1, wherein:
   the first electrode and the second electrode are formed with opposing planes, at least one of the opposing planes of the first and second electrodes is formed with a recess of an inner shape substantially matching the outer shape of the prepackaged food container; and
   the annular frame is so shaped as to come into contact with an outer surface of the prepackaged food container.

4. The prepackaged food sterilizing apparatus according to claim 1, wherein;
   the annular frame includes annular frame segments placed one over another; and
   each of the annular frame segments has such an inner shape substantially matching a side surface of the prepackaged food container.

5. The prepackaged food sterilizing apparatus according to claim 1, wherein the holding device includes a pressing device for pressing the first electrode against the second electrode.

6. The prepackaged food sterilizing apparatus according to claim 5, wherein the pressing device includes a cylinder device.

7. The prepackaged food sterilizing apparatus according to claim 1, wherein the holding device includes an engaging device for restricting movement of the first electrode away from the second electrode.

8. The prepackaged food sterilizing apparatus according to claim 7, wherein the engaging device includes an engaging portion and an operable tab to alter the position of the engaging portion between an engaged position of rendering the first and second electrodes in a pressingly held state and a release position of releasing the held state.

9. The prepackaged food sterilizing apparatus according to claim 7, wherein the engaging device includes a band member for fastening the first and second electrodes.

10. The prepackaged food sterilizing apparatus according to claim 1, further comprising a heater to promote heating of the prepackaged food container.

11. The prepackaged food sterilizing apparatus according to claim 1, further comprising a cooler for cooling the prepackaged food container after heated sterilization thereof.

12. The prepackaged food sterilizing apparatus according to claim 1, further comprising:
- a transport path for transporting the prepackaged food container; and
- a high frequency apply section provided on the way of the transport path to apply a high frequency from the high frequency generating section to the first and second electrodes with respect to at least one prepackaged food container transported along the transport path.

13. The prepackaged food sterilizing apparatus according to claim 12, wherein the transport path is constituted by a conveyor belt that circulatively moves between a pair of rollers.

14. The prepackaged food sterilizing apparatus according to claim 12, further comprising a prepackaged food loading mechanism provided upstream of the transport path from the high frequency apply section for loading the prepackaged food container into the food loading container.

15. The prepackaged food sterilizing apparatus according to claim 12, further comprising a prepackaged food takeout mechanism provided downstream of the transport path from the high frequency apply section for taking out the prepackaged food container from the food loading container.

16. A prepackaged food sterilizing apparatus, comprising:
- a high frequency generating section for supplying a high frequency voltage;
- a food loading container including a pair of opposing electrodes having a first electrode and a second electrode, respectively, to which the high frequency is applied, said food loading container further including an annular frame interposed between the pair of first and second electrodes;
- a prepackaged food container for containing a food product therein, the food loading container including a food loading chamber in which said prepackaged food container is receivable, said food loading chamber and said prepackaged food container being configured to have respective shapes which are substantially complementary with one another such that said prepackaged food container is conformably accommodated by an interior of said food loading chamber over a substantial outer surface thereof when received in said food loading chamber at a time of sterilization of same, thereby providing support against possible rupturing of said prepackaged food container caused by heat expansion; and
- means for maintaining a position of the pair of opposing electrodes to retain a shape of the food loading chamber which substantially conforms to a corresponding shape of the prepackaged food container.

17. A method of sterilizing a container of prepackaged food, comprising:
- providing a food loading container which defines a food loading chamber presenting an inner shape which is substantially equal to a shape of the container of prepackaged food, the food loading chamber being defined by a pair of opposing electrodes and a frame member comprised of an insulating material for holding the electrode pair in a spaced relation;
- loading the container of prepackaged food into the food loading chamber such that said container is oriented therein in corresponding substantial conformance with the inner shape of the food loading chamber;
- applying a high frequency from a high frequency generating section to a space defined by the opposing electrode pair while holding the container of prepackaged food in the food loading chamber to sterilize the container of prepackaged food by dielectric heating; and
- maintaining a position of the pair of opposing electrodes to retain a shape of the food loading chamber defined at least in part by the opposing electrode pair which substantially conforms to a corresponding shape of the prepackaged food container at least during said step of applying.

18. The method according to claim 17, further comprising applying a high frequency to the second electrodes with respect to the container of prepackaged food while circulatively moving the container of prepackaged food along a transport path.

* * * * *

UNITED STATES PATENT AND TRADEMARK OFFICE
CERTIFICATE OF CORRECTION

PATENT NO. : 6,323,473 B1
DATED : November 27, 2001
INVENTOR(S) : Yasuji Yamamoto et al.

It is certified that error appears in the above-identified patent and that said Letters Patent is hereby corrected as shown below:

Title page, Item [54], and Column 1, line 1,
The Title reading "PACKED FOOD PASTEURIZING DEVICE AND PASTEURIZING METHOD" should read:

-- APPARATUS FOR PASTEURIZING PREPACKED FOOD UTILIZING HIGH FREQUENCY DIELECTRIC HEATING AND PASTEURIZING METHOD --

Signed and Sealed this

Nineteenth Day of March, 2002

*Attest:*

JAMES E. ROGAN
*Director of the United States Patent and Trademark Office*

*Attesting Officer*